(12) United States Patent
Asami et al.

US011567307B2

(10) Patent No.: US 11,567,307 B2
(45) Date of Patent: Jan. 31, 2023

(54) VARIABLE MAGNIFICATION OPTICAL SYSTEM AND IMAGING APPARATUS

(71) Applicant: FUJIFILM Corporation, Tokyo (JP)

(72) Inventors: Taro Asami, Saitama (JP); Toshihiro Aoi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 201 days.

(21) Appl. No.: 17/094,288

(22) Filed: Nov. 10, 2020

(65) Prior Publication Data

US 2021/0141198 A1 May 13, 2021

(30) Foreign Application Priority Data

Nov. 12, 2019 (JP) .............................. JP2019-205022

(51) Int. Cl.
 *G02B 15/14* (2006.01)
 *G02B 15/16* (2006.01)
 *G02B 13/14* (2006.01)
(52) U.S. Cl.
 CPC ...... *G02B 15/144113* (2019.08); *G02B 13/14* (2013.01); *G02B 15/143105* (2019.08); *G02B 15/144105* (2019.08); *G02B 15/16* (2013.01)
(58) Field of Classification Search
 None
 See application file for complete search history.

(56) References Cited

U.S. PATENT DOCUMENTS

| 2013/0003168 A1* | 1/2013 | Kawaguchi ............ G02B 13/14 359/356 |
| 2016/0139376 A1 | 5/2016 | Saiga et al. |
| 2018/0259752 A1 | 9/2018 | Aoi |
| 2019/0391368 A1* | 12/2019 | Miyagishima ........... G02B 9/64 |
| 2020/0026094 A1* | 1/2020 | Miwa ...................... G02B 9/64 |

FOREIGN PATENT DOCUMENTS

| JP | 2016-095448 A | 5/2016 |
| JP | 2018-146855 A | 9/2018 |

OTHER PUBLICATIONS

An Office Action; "Notice of Reasons for Refusal," mailed by the Japanese Patent Office dated Oct. 4, 2022, which corresponds to Japanese Patent Application No. 2019-205022 and is related to U.S. Appl. No. 17/094,288; with English language translation.

* cited by examiner

*Primary Examiner* — Darryl J Collins
(74) *Attorney, Agent, or Firm* — Studebaker & Brackett PC

(57) ABSTRACT

A variable magnification optical system consists of, in order from an object side to an image side, a first lens group, a second lens group, and a subsequent lens group. The variable magnification optical system satisfies a predetermined conditional expression for a partial dispersion ratio related to F line, C line, and a wavelength of 1970.09 nm, a d-line back focus of the variable magnification optical system at a telephoto end, a back focus in any one wavelength from a wavelength of 1300 nm to a wavelength of 2325.42 nm at the telephoto end, and a d-line focal length of the variable magnification optical system at the telephoto end.

17 Claims, 24 Drawing Sheets

EXAMPLE 1

EXAMPLE 1

EXAMPLE 1

WIDE

MIDDLE

TELE

EXAMPLE 1

EXAMPLE 2

EXAMPLE 2

EXAMPLE 3

EXAMPLE 3

EXAMPLE 4

EXAMPLE 4

EXAMPLE 5

EXAMPLE 5

EXAMPLE 6

EXAMPLE 6

EXAMPLE 7

EXAMPLE 7

EXAMPLE 8

EXAMPLE 8

EXAMPLE 9

EXAMPLE 9

EXAMPLE 10

EXAMPLE 10

EXAMPLE 11

EXAMPLE 11

VARIABLE MAGNIFICATION OPTICAL SYSTEM AND IMAGING APPARATUS

CROSS-REFERENCE TO RELATED APPLICATIONS

The present application claims priority under 35 U.S.C. § 119 to Japanese Patent Application No. 2019-205022, filed on Nov. 12, 2019. The above application is hereby expressly incorporated by reference, in its entirety, into the present application.

BACKGROUND OF THE INVENTION

1. Field of the Invention

The technology of the present disclosure relates to a variable magnification optical system and an imaging apparatus.

2. Description of the Related Art

In the related art, a variable magnification optical system has been used for a distant monitoring camera at a national border, a forest, a harbor, and the like. In such an application, near-infrared light is used for imaging at night-time and imaging in a poor visibility state such as fog or smoke.

For example, a lens system disclosed in JP2016-095448A below is known as a variable magnification optical system in which near-infrared light is considered. In JP2016-095448A, a zoom lens composed of, in order from an object side to an image side, a first lens group having a positive refractive power, a second lens group having a negative refractive power, a third lens group having a negative refractive power, and a fourth lens group having a positive refractive power is disclosed.

SUMMARY OF THE INVENTION

In the near-infrared light, short wave infra-red (SWIR) light that may be classified as a spectrum of a wavelength of 1000 nm to 2500 nm has high usability. In recent years, there has been an increasing demand for a lens system in which chromatic aberration is corrected across a wavelength range of a visible range to an SWIR range. In a case where favorable maintenance of other optical characteristics while implementing correction of the chromatic aberration in such a wide spectrum is desired, a size of the lens system is likely to be increased. However, in recent years, there is also a high demand for compactness of an apparatus.

The present disclosure is conceived in view of the above matter, and an object thereof is to provide a variable magnification optical system that has favorable characteristics and in which chromatic aberration is corrected in a wavelength range of a visible range to an SWIR range while an increase in size of a lens system is suppressed, and an imaging apparatus comprising the variable magnification optical system.

A variable magnification optical system according to a first aspect of the present disclosure consists of, in order from an object side to an image side, a first lens group, a second lens group, and a subsequent lens group, in which all intervals between adjacent lens groups are changed during zooming, and in a case where a d-line back focus in an air-conversion distance of an entire system at a telephoto end is denoted by Bfd, a back focus in any one wavelength from a wavelength of 1300 nm to a wavelength of 2325.42 nm in the air-conversion distance of the entire system at the telephoto end is denoted by BfIR, a d-line focal length of the entire system at the telephoto end is denoted by ft, a refractive index in F line is denoted by nF, a refractive index in C line is denoted by nC, a refractive index in a wavelength of 1970.09 nm is denoted by n1970, and a partial dispersion ratio $\theta$ is defined as $\theta=(nC-n1970)/(nF-nC)$ for each lens of all lens groups, and an average of $\theta$ of all lenses of the first lens group is denoted by $\theta1ave$, Conditional Expressions (1) and (2) are satisfied.

$$-0.0022 < (Bfd-BfIR)/ft \qquad (1)$$

$$1.3 < \theta1ave \qquad (2)$$

A variable magnification optical system according to a second aspect of the present disclosure consists of, in order from an object side to an image side, a first lens group, a second lens group, and a subsequent lens group, in which all intervals between adjacent lens groups are changed during zooming, and in a case where a d-line back focus in an air-conversion distance of an entire system at a telephoto end is denoted by Bfd, a back focus in any one wavelength from a wavelength of 1300 nm to a wavelength of 2325.42 nm in the air-conversion distance of the entire system at the telephoto end is denoted by BfIR, a d-line focal length of the entire system at the telephoto end is denoted by ft, a refractive index in F line is denoted by nF, a refractive index in C line is denoted by nC, a refractive index in a wavelength of 1970.09 nm is denoted by n1970, and a partial dispersion ratio $\theta$ is defined as $\theta=(nC-n1970)/(nF-nC)$ for each lens of all lens groups, an average of $\theta$ of all positive lenses of the first lens group is denoted by $\theta1Pave$, and an average of $\theta$ of all negative lenses of the first lens group is denoted by $\theta1Nave$, Conditional Expressions (1) and (3) are satisfied.

$$-0.0022 < (Bfd-BfIR)/ft \qquad (1)$$

$$-0.8 < \theta1Pave - \theta1Nave < 0.8 \qquad (3)$$

In a variable magnification optical system according to a third aspect of the present disclosure, the variable magnification optical system comprises the first lens group, the second lens group, a third lens group, and a fourth lens group consecutively in order from the object side to the image side, as the lens groups, all intervals between adjacent lens groups are changed during zooming, and in a case where a d-line back focus in an air-conversion distance of an entire system at a telephoto end is denoted by Bfd, a back focus in any one wavelength from a wavelength of 1300 nm to a wavelength of 2325.42 nm in the air-conversion distance of the entire system at the telephoto end is denoted by BfIR, a d-line focal length of the entire system at the telephoto end is denoted by ft, a refractive index in F line is denoted by nF, a refractive index in C line is denoted by nC, a refractive index in a wavelength of 1970.09 nm is denoted by n1970, and a partial dispersion ratio $\theta$ is defined as $\theta=(nC-n1970)/(nF-nC)$ for each lens of all lens groups, and an average of $\theta$ of all lenses of the third lens group is denoted by $\theta3ave$, Conditional Expressions (1) and (4) are satisfied.

$$-0.0022 < (Bfd-BfIR)/ft \qquad (1)$$

$$1.4 < \theta3ave \qquad (4)$$

It is preferable that the variable magnification optical system according to the first, second, and third aspects satisfies at least one of Conditional Expression (5), (6), or (10) to (13) below.

$$0.3 < ft/TL \qquad (5)$$

$$0.3 < \theta1\text{ave}/\theta2\text{ave} < 2 \tag{6}$$

$$1.2 < \theta2\text{ave} \tag{10}$$

$$1.6 < \theta1P\text{ave} < 2.3 \tag{11}$$

$$\theta1N\text{ave} < 2.3 \tag{12}$$

$$-2 < \theta2P\text{ave} - \theta2N\text{ave} \tag{13}$$

where ft: d-line focal length of entire system at telephoto end

TL: sum of distance on optical axis from lens surface of variable magnification optical system closest to object side to lens surface of variable magnification optical system closest to image side at telephoto end, and d-line back focus in air-conversion distance of entire system at telephoto end θ1ave: average of θ of all lenses of first lens group θ1Pave: average of θ of all positive lenses of first lens group θ1Nave: average of θ of all negative lenses of first lens group θ2ave: average of θ of all lenses of second lens group θ2Pave: average of θ of all positive lenses of second lens group θ2Nave: average of θ of all negative lenses of second lens group It is preferable that in the variable magnification optical system according to the first, second, and third aspects, the variable magnification optical system comprises the first lens group, the second lens group, a third lens group, and a fourth lens group consecutively in order from the object side to the image side, as the lens groups, and satisfies at least one of Conditional Expression (7), (9), (14), or (15) below.

$$0.3 < \theta3\text{ave}/\theta2\text{ave} < 2 \tag{7}$$

$$1.3 < \theta4\text{ave} \tag{9}$$

$$\theta3P\text{ave} - \theta3N\text{ave} < 2 \tag{14}$$

$$-2 < \theta4P\text{ave} - \theta4N\text{ave} < 2 \tag{15}$$

where

θ2ave: average of θ of all lenses of second lens group

θ3ave: average of θ of all lenses of third lens group

θ4ave: average of θ of all lenses of fourth lens group

θ3Pave: average of θ of all positive lenses of third lens group

θ3Nave: average of θ of all negative lenses of third lens group

θ4Pave: average of θ of all positive lenses of fourth lens group

θ4Nave: average of θ of all negative lenses of fourth lens group

It is preferable that in a case where a refractive index in d line is denoted by nd, a refractive index in F line is denoted by nF, a refractive index in C line is denoted by nC, and an Abbe number ν is defined as ν=(nd−1)/(nF−nC) for each lens of all lens groups, the variable magnification optical system according to the first, second, and third aspects satisfies at least one of Conditional Expression (8) or (16) below.

$$50 < \nu1\text{ave} \tag{8}$$

$$15 < \nu1P\text{ave} - \nu1N\text{ave} \tag{16}$$

where

ν1ave: average of ν of all lenses of first lens group

ν1Pave: average of ν of all positive lenses of first lens group

ν1Nave: average of ν of all negative lenses of first lens group

It is preferable that in the variable magnification optical system according to the first, second, and third aspects, the variable magnification optical system comprises only four lens groups consisting of the first lens group, the second lens group, a third lens group, and a fourth lens group in order from the object side to the image side, as the lens groups, and the first lens group has a positive refractive power, the second lens group has a negative refractive power, the third lens group has a positive refractive power, and the fourth lens group has a positive or negative refractive power.

An imaging apparatus according to another aspect of the present disclosure comprises the variable magnification optical system according to the aspect of the present disclosure.

In the present specification, "consists of . . . " and "consisting of . . . " intend to include a lens substantially not having a refractive power, an optical element other than a lens like a stop, a filter, and cover glass, a mechanism part such as a lens flange, a lens barrel, an imaging element, and a camera shake correction mechanism besides example constituents.

In the present specification, a "lens group" refers to a set of lenses that are moved or fixed in units of lens groups during zooming and in which an interval between lenses in the group is not changed. A " . . . group having a positive refractive power" means that the group as a whole has a positive refractive power. Similarly, a " . . . group having a negative refractive power" means that the group as a whole has a negative refractive power. A "lens having a positive refractive power" and a "positive lens" have the same meaning. A "lens having a negative refractive power" and a "negative lens" have the same meaning. A " . . . lens group" is not limited to a configuration consisting of a plurality of lenses and may have a configuration consisting of only one lens.

A compound aspherical lens (lens in which a spherical lens and a film of an aspherical shape formed on the spherical lens are configured to be integrated and that, as a whole, functions as one aspherical lens) is not regarded as a cemented lens and is treated as one lens. A sign of a refractive power and a surface shape related to a lens having an aspherical surface are considered in a paraxial region.

In the present specification, the "entire system" means the "variable magnification optical system". The "back focus" is a distance on the optical axis from a lens surface closest to the image side to a focal position on the image side. The "focal length" used in the conditional expressions is a paraxial focal length. Values used in the conditional expressions are values in a state where an object at infinity is focused. In the present specification, "d line", "C line", "F line", "g line", and "t line" are bright lines. A wavelength of d line is 587.56 nm. A wavelength of C line is 656.27 nm. A wavelength of F line is 486.13 nm. A wavelength of g line is 435.83 nm. A wavelength of t line is 1013.98 nm. In the present specification, "near-infrared" means a spectrum of a wavelength of 700 nm to 2500 nm, and "SWIR" means a spectrum of a wavelength of 1000 nm to 2500 nm. In addition, "nm" used as a unit of wavelength is nanometer.

According to the technology of the present disclosure, a variable magnification optical system that has favorable characteristics and in which chromatic aberration is corrected in a wavelength range of a visible range to an SWIR range while an increase in size of a lens system is suppressed, and an imaging apparatus comprising the variable magnification optical system can be provided.

DESCRIPTION OF THE PREFERRED EMBODIMENTS

Figure 1:
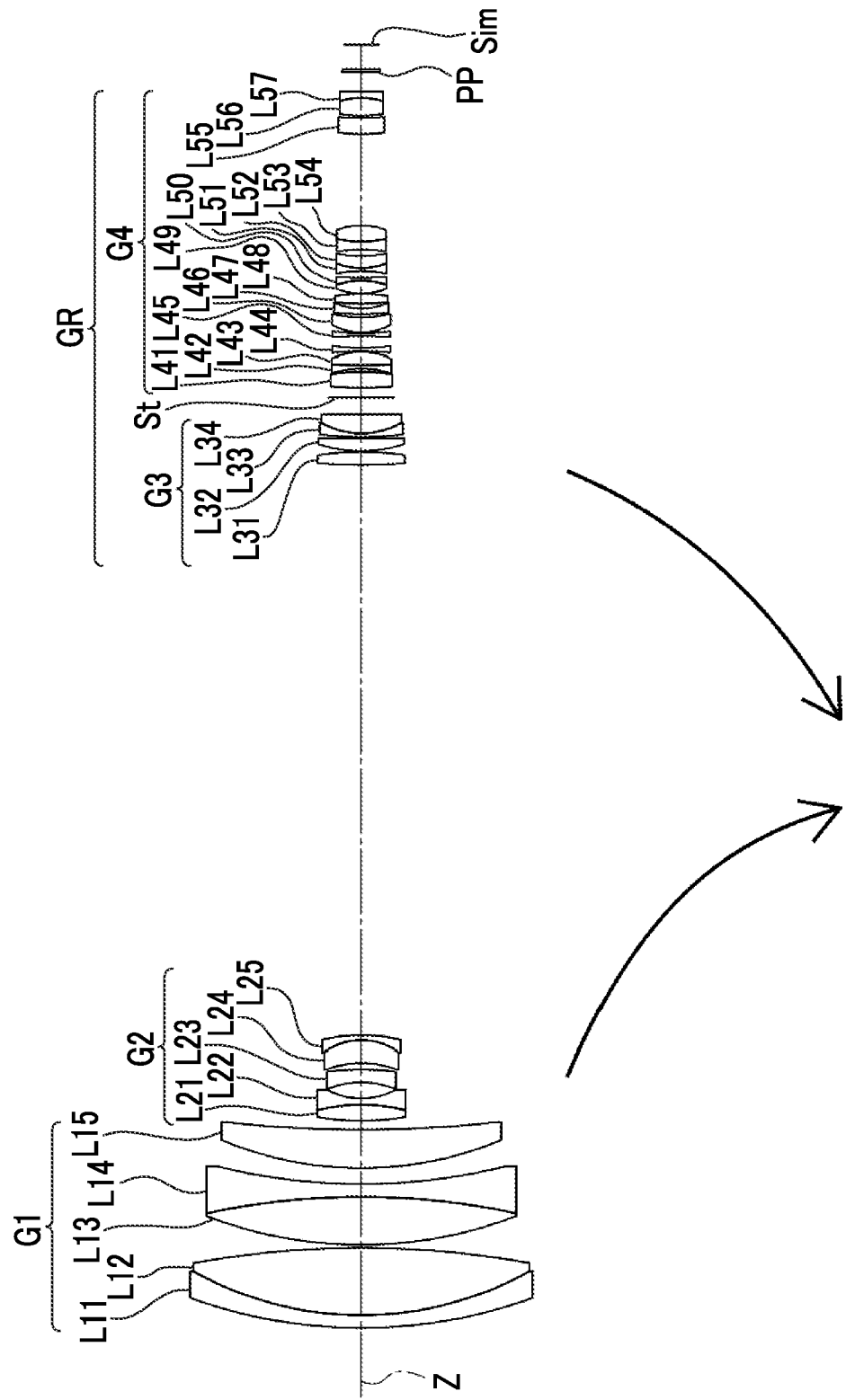
FIG. 1 is a cross-sectional view of a configuration of a variable magnification optical system according to one embodiment of the present disclosure and a diagram illustrating a movement trajectory, the variable magnification optical system corresponding to a variable magnification optical system of Example 1 of the present disclosure.
Figure 2:
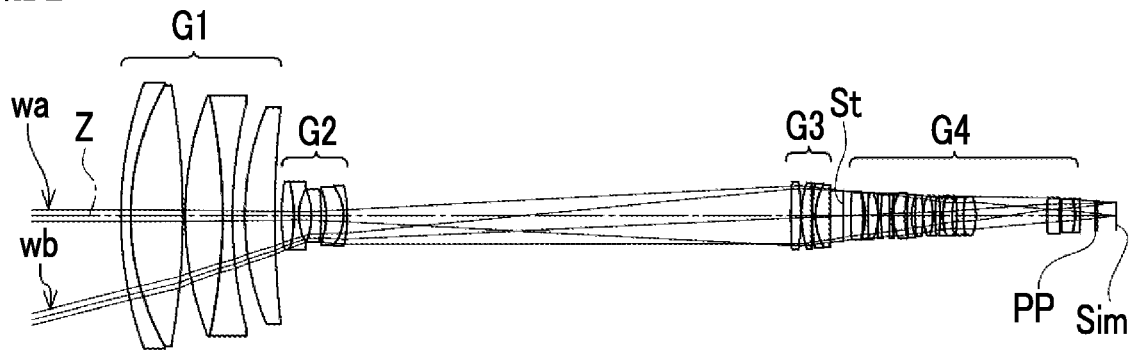
FIG. 2 is a cross-sectional view illustrating the configuration and luminous flux of the variable magnification optical system illustrated in FIG. 1.
Figure 2:
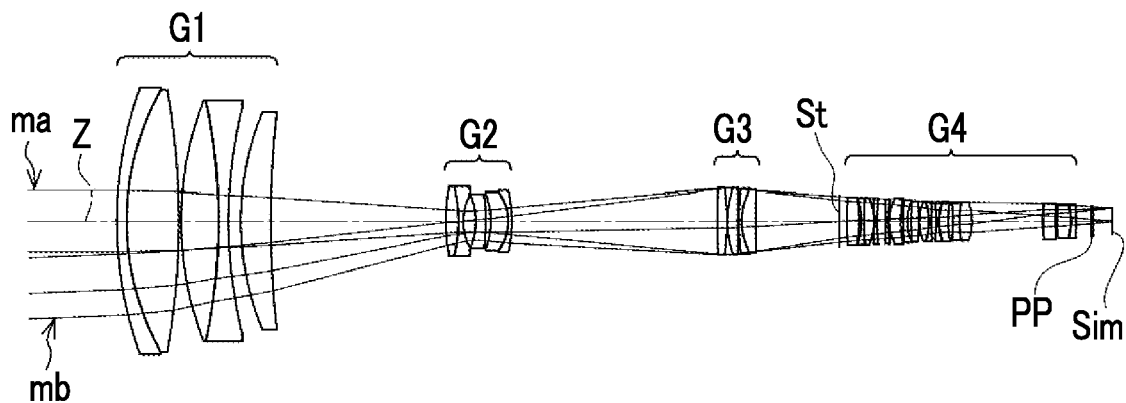
Figure 2:
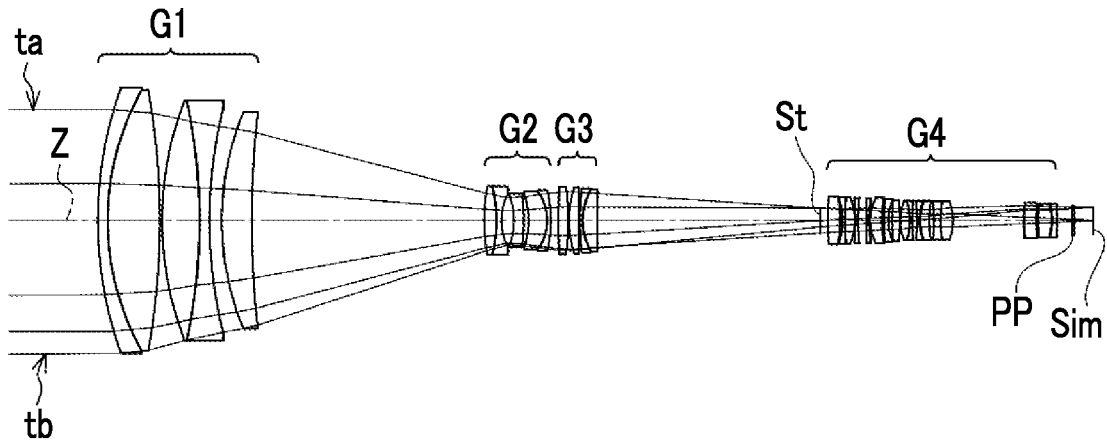

Hereinafter, an embodiment according to the technology of the present disclosure will be described with reference to the drawings. FIG. 1 is a cross-sectional view illustrating a configuration at a wide angle end of a variable magnification optical system according to one embodiment of the present disclosure and a diagram illustrating a movement trajectory. FIG. 2 is a cross-sectional view illustrating the configuration and luminous flux of the variable magnification optical system. Examples illustrated in FIG. 1 and FIG. 2 correspond to a variable magnification optical system of Example 1 described later. In the cross-sectional view of FIG. 1 and FIG. 2, a state where an object at infinity is focused is illustrated. A left side is an object side, and a right side is an image side. In FIG. 2, a wide angle end state is illustrated in an upper part denoted by "WIDE". A middle focal length state is illustrated in a middle part denoted by "MIDDLE". A telephoto end state is illustrated in a lower part denoted by "TELE". In FIG. 2, axial luminous flux wa and luminous flux wb of the maximum angle of view in the wide angle end state, axial luminous flux ma and luminous flux mb of the maximum angle of view in the middle focal length state, and axial luminous flux to and luminous flux tb of the maximum angle of view in the telephoto end state are illustrated as the luminous flux. Hereinafter, description will be mainly provided with reference to FIG. 1.

In FIG. 1, an example in which an optical member PP having a parallel flat plate shape is arranged between the variable magnification optical system and an image plane Sim is illustrated by considering application of the variable magnification optical system to an imaging apparatus. The optical member PP is a member considered to include various filters and/or cover glass and the like. For example, various filters include a low-pass filter, an infrared cut-off filter, and a filter that cuts off a specific wavelength range.

The optical member PP is a member not having a refractive power. It can also be configured that the optical member PP is omitted.

The variable magnification optical system of the example illustrated in FIG. 1 consists of, in order from the object side to the image side, a first lens group G1, a second lens group G2, and a subsequent lens group GR. The subsequent lens group GR of the example illustrated in FIG. 1 consists of, in order from the object side to the image side, a third lens group G3, an aperture stop St, and a fourth lens group G4. That is, the variable magnification optical system comprises, consecutively in order from the object side to the image side, the first lens group G1, the second lens group G2, the third lens group G3, and the fourth lens group G4 as lens groups. Using the variable magnification optical system having a four-group configuration is advantageous for favorable correction of chromatic aberration and maintenance of favorable characteristics in a wavelength range of a visible range to an SWIR range even during zooming. The aperture stop St in FIG. 1 does not indicate a shape and indicates a position on an optical axis.

For example, each lens group can be configured such that the first lens group G1 has a positive refractive power, the second lens group G2 has a negative refractive power, the third lens group G3 has a positive refractive power, and the fourth lens group G4 has a positive or negative refractive power. Using the first lens group G1 having a positive refractive power is advantageous for decreasing a total length of a lens system. Using the second lens group G2 having a negative refractive power is advantageous for obtaining a high magnification. Using the third lens group G3 having a positive refractive power is advantageous for decreasing the total length of the lens system. In a case where the fourth lens group G4 has a positive refractive power, an advantage for decreasing the total length of the lens system is achieved. In a case where the fourth lens group G4 has a negative refractive power, an advantage for securing a long back focus is achieved.

In the example in FIG. 1, during zooming, the first lens group G1 and the fourth lens group G4 are fixed with respect to the image plane Sim, and the second lens group G2 and the third lens group G3 are moved along an optical axis Z by changing an interval between each other. In FIG. 1, a movement trajectory of each lens group during zooming from a wide angle end to a telephoto end is schematically illustrated by a solid line arrow below each of the second lens group G2 and the third lens group G3. A configuration in which a distance from a lens surface closest to the object side to a lens surface closest to the image side is not changed during zooming as in the example illustrated in FIG. 1 is advantageous in terms of dust-proofness.

For example, in the variable magnification optical system in FIG. 1, the first lens group G1 consists of, in order from the object side to the image side, five lenses including lenses L11 to L15. The second lens group G2 consists of, in order from the object side to the image side, five lenses including lenses L21 to L25. The third lens group G3 consists of, in order from the object side to the image side, four lenses including lenses L31 to L34. The fourth lens group G4 consists of, in order from the object side to the image side, 17 lenses including lenses L41 to L57. Each lens group of the example in FIG. 1 is configured to include at least one positive lens and at least one negative lens.

The variable magnification optical system according to the embodiment of the technology of the present disclosure is configured to satisfy Conditional Expression (1) below.

$$-0.0022 < (Bfd - BfIR)/ft \quad (1)$$

where

Bfd: d-line back focus in air-conversion distance of entire system at telephoto end BfIR: back focus in air-conversion distance of entire system at telephoto end in any one wavelength from wavelength of 1300 nm to wavelength of 2325.42 nm ft: d-line focal length of entire system at telephoto end The variable magnification optical system according to the embodiment of the technology of the present disclosure may satisfy Conditional Expression (1) for BfIR related to at least one wavelength from a wavelength of 1300 nm to a wavelength of 2325.42 nm.

Materials of lenses of the variable magnification optical system according to the embodiment of the technology of the present disclosure are selected by considering the wavelength range including the visible range and the SWIR range. In the technology of the present disclosure, an Abbe number and a partial dispersion ratio are defined as follows. That is, for each lens of all lens groups, a d-line refractive index is denoted by nd. An F-line refractive index is denoted by nF. A C-line refractive index is denoted by nC. A refractive index in a wavelength of 1970.09 nm is denoted by n1970. An abbe number ν and a partial dispersion ratio θ are defined as $\nu = (nd-1)/(nF-nC)$ and $\theta = (nC-n1970)/(nF-nC)$, respectively. Here, ν is an Abbe number based on d line. In addition, θ is a partial dispersion ratio between C line and a wavelength of 1970.09 nm.

It is preferable that the variable magnification optical system according to the embodiment of the technology of the present disclosure satisfies at least one of Conditional Expressions (2) to (31) below including conditional expressions related to ν or θ defined above.

$$1.3 < \theta 1ave \quad (2)$$

$$-0.8 < \theta 1Pave - \theta 1Nave < 0.8 \quad (3)$$

$$1.4 < \theta 3ave \quad (4)$$

$$0.3 < ft/TL \quad (5)$$

$$0.3 < \theta 1ave/\theta 2ave < 2 \quad (6)$$

$$0.3 < \theta 3ave/\theta 2ave < 2 \quad (7)$$

$$50 < \nu 1ave \quad (8)$$

$$1.3 < \theta 4ave \quad (9)$$

$$1.2 < \theta 2ave \quad (10)$$

$$1.6 < \theta 1Pave < 2.3 \quad (11)$$

$$\theta 1Nave < 2.3 \quad (12)$$

$$-2 < \theta 2Pave - \theta 2Nave \quad (13)$$

$$\theta 3Pave - \theta 3Nave < 2 \quad (14)$$

$$-2 < \theta 4Pave - \theta 4Nave < 2 \quad (15)$$

$$15 < \nu 1Pave - \nu 1Nave \quad (16)$$

$$\nu 2Pave - \nu 2Nave < -5 \quad (17)$$

$$15 < \nu 3Pave - \nu 3Nave \quad (18)$$

$$20 < \nu 2ave < 65 \quad (19)$$

$30 < \nu 3ave$ (20)

$30 < \nu 4ave$ (21)

$\theta 2Pave < 2.2$ (22)

$1.35 < \theta 2Nave$ (23)

$\theta 4Pave < 2.2$ (24)

$0.3 < ft/f1$ (25)

$1 < ft/f1Pmax$ (26)

$-10 < f2/fw < -0.1$ (27)

$-10 < f2Nmax/fw$ (28)

$f1/f2 < -0.5$ (29)

$-10 < f3/f2 < -0.1$ (30)

$0.3 < TL/f31$ (31)

where

θ1ave: average of θ of all lenses of first lens group
θ1Pave: average of θ of all positive lenses of first lens group
θ1Nave: average of θ of all negative lenses of first lens group
θ2ave: average of θ of all lenses of second lens group
θ3ave: average of θ of all lenses of third lens group
θ4ave: average of θ of all lenses of fourth lens group
θ2Pave: average of θ of all positive lenses of second lens group
θ2Nave: average of θ of all negative lenses of second lens group
θ3Pave: average of θ of all positive lenses of third lens group
θ3Nave: average of θ of all negative lenses of third lens group
θ4Pave: average of θ of all positive lenses of fourth lens group
θ4Nave: average of θ of all negative lenses of fourth lens group
ν1ave: average of ν of all lenses of first lens group
ν2ave: average of ν of all lenses of second lens group
ν3ave: average of ν of all lenses of third lens group
ν4ave: average of ν of all lenses of fourth lens group
ν1Pave: average of ν of all positive lenses of first lens group
ν1Nave: average of ν of all negative lenses of first lens group
ν2Pave: average of ν of all positive lenses of second lens group
ν2Nave: average of ν of all negative lenses of second lens group
ν3Pave: average of ν of all positive lenses of third lens group
ν3Nave: average of ν of all negative lenses of third lens group fw: d-line focal length of entire system at wide angle end
ft: d-line focal length of entire system at telephoto end
TL: sum of distance on optical axis from lens surface of variable magnification optical system closest to object side to lens surface of variable magnification optical system closest to image side at telephoto end, and d-line back focus in air-conversion distance of entire system at telephoto end f1: focal length of first lens group
f2: focal length of second lens group
f3: focal length of third lens group
f31: focal length of lens of third lens group closest to object side
f1Pmax: focal length of positive lens having highest refractive power among all positive lenses of first lens group
f2Nmax: focal length of negative lens having highest refractive power among all negative lenses of second lens group Hereinafter, the above conditional expressions will be described. By satisfying Conditional Expression (1), it is easy to correct axial chromatic aberration from the visible range to the SWIR range.

Here, (Bfd−BfIR)/ft is preferably greater than −0.002, more preferably greater than −0.00125, further preferably greater than −0.001, and further more preferably greater than −0.0008.

It is preferable that (Bfd−BfIR)/ft is less than 0.005. In this case, it is easy to correct the axial chromatic aberration from the visible range to the SWIR range.

Here, (Bfd−BfIR)/ft is more preferably less than 0.0022, further preferably less than 0.002, further more preferably less than 0.00125, still more preferably less than 0.001, and yet still more preferably less than 0.0008.

By satisfying Conditional Expression (2), it is easy to correct the axial chromatic aberration from the visible range to the SWIR range. Here, θ1ave is more preferably greater than 1.5, further preferably greater than 1.6, further more preferably greater than 1.7, still more preferably greater than 1.8, and yet still more preferably greater than 1.9.

In addition, θ1ave is preferably less than 2.4. In this case, it is easy to use a large number of lenses having a high refractive index in the first lens group G1, and it is easy to reduce a size of the first lens group G1. Here, θ1ave is more preferably less than 2.35, further preferably less than 2.3, further more preferably less than 2.2, and still more preferably less than 2.15.

By satisfying Conditional Expression (3), it is easy to decrease an absolute value of a difference between a partial dispersion ratio of a positive lens and a partial dispersion ratio of a negative lens, and it is easy to correct a second-order spectrum of the axial chromatic aberration from the visible range to the SWIR range. Here, θ1Pave−θ1Nave is more preferably greater than −0.5, further preferably greater than −0.4, further more preferably greater than −0.3, still more preferably greater than −0.2, yet still more preferably greater than −0.1, and further still more preferably greater than 0.

In addition, θ1Pave−θ1Nave is more preferably less than 0.5, further preferably less than 0.4, further more preferably less than 0.3, and still more preferably less than 0.2.

By satisfying Conditional Expression (4), it is easy to correct the axial chromatic aberration from the visible range to the SWIR range. Here, θ3ave is more preferably greater than 1.5, further preferably greater than 1.6, and further more preferably greater than 1.7.

In addition, θ3ave is preferably less than 2.3. In this case, it is easy to use a large number of lenses having a high refractive index in the third lens group G3, and it is easy to reduce a size of the third lens group G3. Here, θ3ave is more preferably less than 2.2, further preferably less than 2.1, and further more preferably less than 2.

In Conditional Expression (5), TL is the d-line total length of the lens system. By satisfying Conditional Expression (5), it is easy to suppress an increase in total length of the lens system. Here, ft/TL is more preferably greater than 0.5, further preferably greater than 1, further more preferably greater than 1.1, still more preferably greater than 1.5, yet still more preferably greater than 1.6, and further still more preferably greater than 1.7.

In addition, ft/TL is preferably less than 30. In this case, the total length of the lens system is not excessively decreased. Thus, it is easy to increase a magnification. Here, ft/TL is more preferably less than 20, further preferably less than 10, further more preferably less than 8, and still more preferably less than 5.

By satisfying Conditional Expression (6), balance between second-order spectrums of the first lens group G1 and the second lens group G2 can be appropriately maintained, and it is easy to correct the axial chromatic aberration at the telephoto end. Here, θ1ave/θ2ave is more preferably greater than 0.5, further preferably greater than 0.7, further more preferably greater than 0.8, and still more preferably greater than 0.9.

In addition, θ1ave/θ2ave is more preferably less than 1.8, further preferably less than 1.7, and further more preferably less than 1.6.

By satisfying Conditional Expression (7), balance between second-order spectrums of the second lens group G2 and the third lens group G3 can be appropriately maintained, and it is easy to correct the axial chromatic aberration at the telephoto end. Here, θ3ave/θ2ave is more preferably greater than 0.5, further preferably greater than 0.7, further more preferably greater than 0.8, and still more preferably greater than 0.9.

In addition, θ3ave/θ2ave is more preferably less than 1.8, further preferably less than 1.7, further more preferably less than 1.6, and still more preferably less than 1.5.

By satisfying Conditional Expression (8), an Abbe number of a positive lens and an Abbe number of a negative lens constituting the first lens group G1 can be appropriately distributed. Thus, it is easy to correct the axial chromatic aberration. More specifically, by satisfying Conditional Expression (8), a decrease in Abbe number of a lens of the first lens group G1 can be prevented. Thus, in the first lens group G1, it is easy to secure a difference between the Abbe number of the positive lens and the Abbe number of the negative lens while decreasing an absolute value of a difference between a partial dispersion ratio of the positive lens and a partial dispersion ratio of the negative lens. Accordingly, it is easy to correct the second-order spectrum of the axial chromatic aberration. Here, ν1ave is more preferably greater than 55, further preferably greater than 60, further more preferably greater than 65, and still more preferably greater than 69.

In addition, in order to appropriately distribute the Abbe numbers, ν1ave is preferably less than 95. In this case, an excessive increase in Abbe number of the lens of the first lens group G1 can be suppressed. Thus, in the first lens group G1, it is easy to increase the absolute value of the difference between the Abbe number of the positive lens and the Abbe number of the negative lens, and it is easy to correct the axial chromatic aberration. Here, ν1ave is more preferably less than 90, and further preferably less than 85.

By satisfying Conditional Expression (9), it is easy to correct the axial chromatic aberration from the visible range to the SWIR range. Here, θ4ave is more preferably greater than 1.4, further preferably greater than 1.5, further more preferably greater than 1.6, and still more preferably greater than 1.7.

In addition, θ4ave is preferably less than 2.3. In this case, it is easy to use a large number of lenses having a high refractive index in the fourth lens group G4, and it is easy to reduce a size of the fourth lens group G4. Here, θ4ave is more preferably less than 2.2, further preferably less than 2.1, further more preferably less than 2, and still more preferably less than 1.95.

By satisfying Conditional Expression (10), it is easy to correct the axial chromatic aberration from the visible range to the SWIR range. Here, θ2ave is more preferably greater than 1.4, further preferably greater than 1.5, and further more preferably greater than 1.6.

In addition, θ2ave is preferably less than 2.3. In this case, it is easy to use a large number of lenses having a high refractive index in the second lens group G2, and it is easy to reduce a size of the second lens group G2. Here, θ2ave is more preferably less than 2.2, further preferably less than 2.1, further more preferably less than 2, and still more preferably less than 1.95.

By satisfying Conditional Expression (11) not to be below a lower limit thereof, it is easy to correct the axial chromatic aberration. Here, θ1Pave is more preferably greater than 1.7, further preferably greater than 1.8, and further more preferably greater than 1.9.

In addition, by satisfying Conditional Expression (11) not to be above an upper limit thereof, it is easy to use a large number of lenses having a high refractive index as the positive lens of the first lens group G1, and it is easy to reduce the size of the first lens group G1. Here, θ1Pave is more preferably less than 2.25, further preferably less than 2.2, and further more preferably less than 2.15.

By satisfying Conditional Expression (12), it is easy to decrease the absolute value of the difference between the partial dispersion ratio of the positive lens and the partial dispersion ratio of the negative lens in the first lens group G1, and it is easy to correct the second-order spectrum of the axial chromatic aberration. Here, θ1Nave is more preferably less than 2.25, and further more preferably less than 2.2.

In addition, θ1Nave is preferably greater than 1.5. In this case, it is easy to secure the difference between the Abbe number of the positive lens and the Abbe number of the negative lens while decreasing the absolute value of the difference between the partial dispersion ratio of the positive lens and the partial dispersion ratio of the negative lens in the first lens group G1, and it is easy to correct the axial chromatic aberration. Here, θ1Nave is more preferably greater than 1.6, further preferably greater than 1.7, and further more preferably greater than 1.8.

By satisfying Conditional Expression (13), it is easy to suppress an increase in absolute value of a difference between a partial dispersion ratio of a positive lens and a partial dispersion ratio of a negative lens in the second lens group G2, and it is easy to correct the second-order spectrum of the axial chromatic aberration. Here, θ2Pave−θ2Nave is more preferably greater than −1.5, further preferably greater than −1, further more preferably greater than −0.8, and still more preferably greater than −0.7.

In addition, θ2Pave−θ2Nave is preferably less than 0. In this case, the partial dispersion ratio of the positive lens in the second lens group G2 can be set to be less than the partial dispersion ratio of the negative lens, and it is easy to correct the second-order spectrum of the axial chromatic aberration by combining the first lens group G1 with the second lens group G2. Here, θ2Pave−θ2Nave is more preferably less than −0.01, further more preferably less than −0.03, and still more preferably less than −0.05.

By satisfying Conditional Expression (14), it is easy to decrease an absolute value of a difference between a partial dispersion ratio of a positive lens and a partial dispersion ratio of a negative lens in the third lens group G3, and it is easy to correct the second-order spectrum of the axial chromatic aberration. Here, θ3Pave−θ3Nave is more preferably less than 1.5, further preferably less than 1, further more preferably less than 0.8, and still more preferably less than 0.7.

In addition, θ3Pave−θ3Nave is preferably greater than 0. In this case, the partial dispersion ratio of the positive lens in the third lens group G3 can be set to be greater than the partial dispersion ratio of the negative lens, and it is easy to correct the second-order spectrum of the axial chromatic aberration by combining the third lens group G3 with other lens groups. Here, θ3Pave−θ3Nave is more preferably greater than 0.01, further preferably greater than 0.05, and further more preferably greater than 0.1.

By satisfying Conditional Expression (15), it is easy to decrease an absolute value of a difference between a partial dispersion ratio of a positive lens and a partial dispersion ratio of a negative lens in the fourth lens group G4, and it is easy to correct the second-order spectrum of the axial chromatic aberration. Here, θ4Pave−θ4Nave is more preferably greater than −1, further preferably greater than −0.8, and further more preferably greater than −0.6.

In addition, θ4Pave−θ4Nave is more preferably less than 1, further preferably less than 0.5, and further more preferably less than 0.3.

By satisfying Conditional Expression (16), it is easy to secure the difference between the Abbe number of the positive lens and the Abbe number of the negative lens in the first lens group G1, and it is easy to correct the axial chromatic aberration from the visible range to the SWIR range. Here, ν1Pave−ν1Nave is more preferably greater than 18, further preferably greater than 20, and further more preferably greater than 25.

In addition, ν1Pave−ν1Nave is preferably less than 50. In this case, the absolute value of the difference between the partial dispersion ratio of the positive lens and the partial dispersion ratio of the negative lens can be decreased, and it is easy to suppress the second-order spectrum of the axial chromatic aberration from the visible range to the SWIR range. Generally, in a case where the absolute value of the difference between the Abbe number of the positive lens and the Abbe number of the negative lens is increased, the partial dispersion ratio of the positive lens tends to be increased, and the partial dispersion ratio of the negative lens tends to be decreased. Then, it is difficult to perform achromatization by combining a positive lens and a negative lens having similar partial dispersion ratios, and the second-order spectrum is increased. Here, ν1Pave−ν1Nave is more preferably less than 40, and further preferably less than 38.

By satisfying Conditional Expression (17), it is easy to secure a difference between an Abbe number of a positive lens and an Abbe number of a negative lens in the second lens group G2, and it is easy to correct the axial chromatic aberration from the visible range to the SWIR range. Here, ν2Pave−ν2Nave is more preferably less than −8, further preferably less than −10, and further more preferably less than −13.

In addition, ν2Pave−ν2Nave is preferably greater than −50. In this case, it is easy to decrease the absolute value of the difference between the partial dispersion ratio of the positive lens and the partial dispersion ratio of the negative lens, and it is easy to correct the second-order spectrum of the axial chromatic aberration. Here, ν2Pave−ν2Nave is more preferably greater than −40, and further preferably greater than −30.

By satisfying Conditional Expression (18), it is easy to secure a difference between an Abbe number of a positive lens and an Abbe number of a negative lens in the third lens group G3, and it is easy to correct the axial chromatic aberration from the visible range to the SWIR range. Here, ν3Pave−ν3Nave is more preferably greater than 20, and further preferably greater than 25.

In addition, ν3Pave−ν3Nave is preferably less than 65. In this case, as in a case of an upper limit of Conditional Expression (16), the absolute value of the difference between the partial dispersion ratio of the positive lens and the partial dispersion ratio of the negative lens can be decreased, and it is easy to suppress the second-order spectrum of the axial chromatic aberration from the visible range to the SWIR range. Here, ν3Pave−ν3Nave is more preferably less than 60, and further preferably less than 50.

By satisfying Conditional Expression (19), the Abbe number of the positive lens and the Abbe number of the negative lens constituting the second lens group G2 can be appropriately distributed. Thus, it is easy to correct the axial chromatic aberration. More specifically, by satisfying Conditional Expression (19) not to be below a lower limit thereof, a decrease in Abbe number of a lens of the second lens group G2 can be prevented. Thus, in the second lens group G2, it is easy to secure a difference between the Abbe number of the positive lens and the Abbe number of the negative lens while decreasing the absolute value of the difference between the partial dispersion ratio of the positive lens and the partial dispersion ratio of the negative lens. Accordingly, it is easy to correct the second-order spectrum of the axial chromatic aberration. Here, ν2ave is more preferably greater than 25, further preferably greater than 28, and further more preferably greater than 35.

By satisfying Conditional Expression (19) not to be above an upper limit thereof, an excessive increase in Abbe number of the lens of the second lens group G2 can be suppressed. Thus, in the second lens group G2, it is easy to increase an absolute value of the difference between the Abbe number of the positive lens and the Abbe number of the negative lens in the second lens group G2, and it is easy to correct the axial chromatic aberration. Here, ν2ave is more preferably less than 60, and further preferably less than 57.

By satisfying Conditional Expression (20), the Abbe number of the positive lens and the Abbe number of the negative lens constituting the third lens group G3 can be appropriately distributed. Thus, it is easy to correct the axial chromatic aberration. More specifically, by satisfying Conditional Expression (20), a decrease in Abbe number of a lens of the third lens group G3 can be prevented. Thus, in the third lens group G3, it is easy to secure a difference between the Abbe number of the positive lens and the Abbe number of the negative lens while decreasing the absolute value of the difference between the partial dispersion ratio of the positive lens and the partial dispersion ratio of the negative lens. Accordingly, it is easy to correct the second-order spectrum of the axial chromatic aberration. Here, ν3ave is more preferably greater than 40, further preferably greater than 50, further more preferably greater than 55, and still more preferably greater than 60.

In addition, in order to appropriately distribute the Abbe numbers, ν3ave is preferably less than 80. In this case, an excessive increase in Abbe number of the lens of the third lens group G3 can be suppressed. Thus, in the third lens group G3, it is easy to increase an absolute value of the difference between the Abbe number of the positive lens and the Abbe number of the negative lens, and it is easy to correct the axial chromatic aberration. Here, ν3ave is more preferably less than 75, and further preferably less than 73.

By satisfying Conditional Expression (21), an Abbe number of the positive lens and an Abbe number of the negative lens constituting the fourth lens group G4 can be appropriately distributed. Thus, it is easy to correct the axial chromatic aberration. More specifically, by satisfying Conditional Expression (21), a decrease in Abbe number of a lens of the fourth lens group G4 can be prevented. Thus, in the fourth lens group G4, it is easy to secure a difference between the Abbe number of the positive lens and the Abbe number of the negative lens while decreasing the absolute value of the difference between the partial dispersion ratio of the positive lens and the partial dispersion ratio of the negative lens. Accordingly, it is easy to correct the second-order spectrum of the axial chromatic aberration. Here, ν4ave is more preferably greater than 35, further preferably greater than 40, and further more preferably greater than 43.

In addition, in order to appropriately distribute the Abbe numbers, ν4ave is preferably less than 80. In this case, an excessive increase in Abbe number of the lens of the fourth lens group G4 can be suppressed. Thus, in the fourth lens group G4, it is easy to increase an absolute value of the difference between the Abbe number of the positive lens and the Abbe number of the negative lens, and it is easy to correct the axial chromatic aberration. Here, ν4ave is more preferably less than 70, and further preferably less than 60.

By satisfying Conditional Expression (22), the Abbe number of the positive lens of the second lens group G2 can be decreased, and it is easy to correct the axial chromatic aberration from the visible range to the SWIR range. Optical glass generally has a tendency such that ν is decreased in a case where θ is decreased. Here, θ2Pave is more preferably less than 2.05, further preferably less than 2, and further more preferably less than 1.9.

In addition, θ2Pave is preferably greater than 1. In this case, it is easy to decrease the absolute value of the difference between the partial dispersion ratio of the positive lens and the partial dispersion ratio of the negative lens in the second lens group G2, and it is easy to correct the second-order spectrum of the axial chromatic aberration. Here, θ2Pave is more preferably greater than 1.1, and further preferably greater than 1.2.

By satisfying Conditional Expression (23), it is easy to increase the Abbe number of the negative lens of the second lens group G2, and it is easy to correct the axial chromatic aberration from the visible range to the SWIR range. Here, θ2Nave is more preferably greater than 1.5, and further preferably greater than 1.7.

In addition, θ2Nave is preferably less than 2.3. In this case, it is easy to use a large number of lenses having a high refractive index as the negative lens of the second lens group G2, and it is easy to reduce the size of the second lens group G2. Here, θ2Nave is more preferably less than 2.2, and further preferably less than 2.15.

By satisfying Conditional Expression (24), it is easy to use a large number of lenses having a high refractive index as the positive lens of the fourth lens group G4, and it is easy to reduce the size of the fourth lens group G4. Here, θ4Pave is more preferably less than 2.1, further preferably less than 2, and further more preferably less than 1.95.

In addition, θ4Pave is preferably greater than 1.35. In this case, the Abbe number of the positive lens can be increased, and it is easy to correct the chromatic aberration from the visible range to the SWIR range. Here, θ4Pave is more preferably greater than 1.5, and further preferably greater than 1.6.

Conditional Expression (25) is a conditional expression that is preferably satisfied in a case where the first lens group G1 has a positive refractive power. By satisfying Conditional Expression (25), it is easy to suppress a decrease in positive refractive power of the first lens group G1. Thus, it is easy to decrease the total length of the lens system. Here, ft/f1 is more preferably greater than 0.5, further preferably greater than 1, further more preferably greater than 1.5, and still more preferably greater than 2.

In addition, ft/f1 is preferably less than 20. In this case, it is easy to suppress an excessive increase in positive refractive power of the first lens group G1. Thus, it is easy to correct various types of aberration. Here, ft/f1 is more preferably less than 10, further preferably less than 8, and further more preferably less than 6.

Conditional Expression (26) is a conditional expression that is preferably satisfied in a case where the first lens group G1 has a positive refractive power. By satisfying Conditional Expression (26), the refractive power of the positive lens having the highest refractive power among the positive lenses of the first lens group G1 can be increased. Thus, it is easy to reduce the size of the first lens group G1 and decrease the total length of the lens system. Here, ft/f1Pmax is more preferably greater than 1.2, further preferably greater than 1.4, and further more preferably greater than 1.6.

In addition, ft/f1Pmax is preferably less than 20. In this case, it is possible that the refractive power of the positive lens having the highest refractive power among the positive lenses of the first lens group G1 is not excessively increased. Thus, it is easy to suppress various types of aberration. Here, ft/f1Pmax is more preferably less than 12, and further preferably less than 10.

Conditional Expression (27) is a conditional expression that is preferably satisfied in a case where the second lens group G2 has a negative refractive power. By satisfying Conditional Expression (27) not to be below a lower limit thereof, it is easy to suppress a decrease in negative refractive power of the second lens group G2. Thus, it is easy to increase an angle of view at the wide angle end. Here, f2/fw is more preferably greater than −8, further preferably greater than −5, further more preferably greater than −3, and still more preferably greater than −2.5.

By satisfying Conditional Expression (27) not to be above an upper limit thereof, it is easy to suppress an excessive increase in negative refractive power of the second lens group G2, and it is easy to correct various types of aberration. Here, f2/fw is more preferably less than −0.2, further preferably less than −0.3, further more preferably less than −0.4, and still more preferably less than −0.5.

Conditional Expression (28) is a conditional expression that is preferably satisfied in a case where the second lens group G2 has a negative refractive power. By satisfying Conditional Expression (28), the refractive power of the negative lens having the highest refractive power among the negative lenses of the second lens group G2 can be increased. Thus, it is easy to reduce the size of the second lens group G2. Here, f2Nmax/fw is more preferably greater than −5, further preferably greater than −4, and further more preferably greater than −3.

In addition, f2Nmax/fw is preferably less than −0.1. In this case, it is possible that the refractive power of the negative lens having the highest refractive power among the negative lenses of the second lens group G2 is not excessively increased. Thus, it is easy to suppress various types of aberration. Here, f2Nmax/fw is more preferably less than −0.2, and further preferably less than −0.3.

Conditional Expression (29) is a conditional expression that is preferably satisfied in a case where the first lens group G1 has a positive refractive power and the second lens group G2 has a negative refractive power. By satisfying Conditional Expression (29), it is easy to suppress a decrease in negative refractive power of the second lens group G2. Thus, it is easy to increase the angle of view at the wide angle end. Here, f1/f2 is more preferably less than −2.5, further preferably less than −3, and further more preferably less than −5.

In addition, f1/f2 is preferably greater than −100. In this case, it is easy to suppress an excessive decrease in positive refractive power of the first lens group G1. Thus, it is easy to correct various types of aberration, and an advantage for decreasing the total length of the lens system is achieved. Here, f1/f2 is more preferably greater than −20, and further preferably greater than −12.5.

Conditional Expression (30) is a conditional expression that is preferably satisfied in a case where the second lens group G2 has a negative refractive power and the third lens group G3 has a positive refractive power. By satisfying Conditional Expression (30) not to be below a lower limit thereof, it is easy to suppress an excessive increase in negative refractive power of the second lens group G2. Thus, an advantage for decreasing the total length of the lens system is achieved. Alternatively, it is easy to suppress an excessive decrease in positive refractive power of the third lens group G3. Thus, an advantage for decreasing the total length of the lens system is achieved. Here, f3/f2 is more preferably greater than −5, and further preferably greater than −3.

By satisfying Conditional Expression (30) not to be above an upper limit thereof, it is easy to suppress a decrease in negative refractive power of the second lens group G2. Thus, it is easy to increase the angle of view at the wide angle end. Alternatively, it is easy to suppress an increase in positive refractive power of the third lens group G3. Thus, it is easy to increase the back focus. Here, f3/f2 is more preferably less than −0.5, further preferably less than −1, and further more preferably less than −1.5.

Conditional Expression (31) is a conditional expression that is preferably satisfied in a case where the lens of the third lens group G3 closest to the object side is a positive lens. By satisfying Conditional Expression (31), it is easy to increase a refractive power of a positive lens of the third lens group G3 closest to the object side, and it is easy to reduce the size of the third lens group G3. Here, TL/f31 is more preferably greater than 1, further preferably greater than 1.5, and further more preferably greater than 2.

In addition, TL/f31 is preferably less than 100. In this case, it is easy to suppress an increase in total length of the lens system. Here, TL/f31 is more preferably less than 20, and further preferably less than 10.

Conditional Expressions (1-1) to (30-1), (1-2) to (5-2), (25-2), (1-3), and (25-3) below are illustrated as examples of preferred conditional expressions obtained by combining the upper limits and the lower limits described above. Conditional expressions preferably satisfied by the variable magnification optical system are not limited to the conditional expressions described below and include all conditional expressions obtained by any combination of the preferred lower limits and the preferred upper limits described above for each conditional expression.

$-0.0022 < (Bfd - BfIR)/ft < 0.005$ (1-1)

$-0.00125 < (Bfd - BfIR)/ft < 0.0022$ (1-2)

$-0.001 < (Bfd - BfIR)/ft < 0.001$ (1-3)

$1.3 < \theta 1\text{ave} < 2.4$ (2-1)

$1.6 < \theta 1\text{ave} < 2.35$ (2-2)

$-0.5 < \theta 1P\text{ave} - \theta 1N\text{ave} < 0.5$ (3-1)

$-0.4 < \theta 1P\text{ave} - \theta 1N\text{ave} < 0.4$ (3-2)

$1.4 < \theta 3\text{ave} < 2.3$ (4-1)

$1.5 < \theta 3\text{ave} < 2.2$ (4-2)

$0.3 < ft/TL < 20$ (5-1)

$0.1 < ft/TL < 8$ (5-2)

$0.7 < \theta 1\text{ave}/\theta 2\text{ave} < 1.7$ (6-1)

$0.7 < \theta 3\text{ave}/\theta 2\text{ave} < 2$ (7-1)

$50 < \nu 1\text{ave} < 95$ (8-1)

$1.3 < \theta 4\text{ave} < 2.3$ (9-1)

$1.2 < \theta 2\text{ave} < 2.3$ (10-1)

$1.8 < \theta 1P\text{ave} < 2.2$ (11-1)

$1.5 < \theta 1N\text{ave} < 2.3$ (12-1)

$-2 < \theta 2P\text{ave} - \theta 2N\text{ave} < 0$ (13-1)

$0.05 < \theta 3P\text{ave} - \theta 3N\text{ave} < 1.5$ (14-1)

$-1 < \theta 4P\text{ave} - \theta 4N\text{ave} < 1$ (15-1)

$20 < \nu 1P\text{ave} - \nu 1N\text{ave} < 40$ (16-1)

$-50 < \nu 2P\text{ave} - \nu 2N\text{ave} < -13$ (17-1)

$15 < \nu 3P\text{ave} - \nu 3N\text{ave} < 65$ (18-1)

$25 < \nu 2\text{ave} < 60$ (19-1)

$30 < \nu 3\text{ave} < 80$ (20-1)

$30 < \nu 4\text{ave} < 80$ (21-1)

$1 < \theta 2P\text{ave} < 2.2$ (22-1)

$1.35 < \theta 2N\text{ave} < 2.3$ (23-1)

$1.35 < \theta 4P\text{ave} < 2.2$ (24-1)

$0.5 < ft/f1 < 20$ (25-1)

$2 < ft/f1 < 10$ (25-2)

$1 < ft/f1 < 8$ (25-3)

$1 < ft/f1P\max < 20$ (26-1)

$-8 < f2/fw < -0.2$ (27-1)

$-10 < f2N\max/fw < -0.1$ (28-1)

$-100 < f1/f2 < -0.5$ (29-1)

$-10 < f3/f2 < -0.5$ (30-1)

$0.3 < TL/f31 < 100$ (31-1)

Next, three preferred aspects in which the above configurations and conditional expressions are considered will be described. A first aspect is the variable magnification optical system that consists of, in order from the object side to the image side, the first lens group G1, the second lens group G2, and the subsequent lens group, in which all intervals between adjacent lens groups are changed during zooming, and Conditional Expressions (1) and (2) are satisfied. According to the first aspect, an advantage for favorable correction of the chromatic aberration in the wavelength range of the visible range to the SWIR range and maintenance of favorable characteristics is achieved. In addition, accordingly, the number of lenses constituting the variable magnification optical system can be further decreased. Thus, an advantage for suppressing an increase in size of the lens system is achieved.

A second aspect is the variable magnification optical system that consists of, in order from the object side to the image side, the first lens group G1, the second lens group G2, and the subsequent lens group, in which all intervals between adjacent lens groups are changed during zooming, and Conditional Expression (1) and Conditional Expression (3) are satisfied. According to the second aspect, an advantage for favorable correction of the chromatic aberration in the wavelength range of the visible range to the SWIR range and maintenance of favorable characteristics is achieved. In addition, accordingly, the number of lenses constituting the variable magnification optical system can be further decreased. Thus, an advantage for suppressing an increase in size of the lens system is achieved.

A third aspect is the variable magnification optical system that consists of, consecutively in order from the object side to the image side, the first lens group G1, the second lens group G2, the third lens group G3, and the fourth lens group G4, in which all intervals between adjacent lens groups are changed during zooming, and Conditional Expression (1) and Conditional Expression (4) are satisfied. According to the third aspect, an advantage for favorable correction of the chromatic aberration in the wavelength range of the visible range to the SWIR range, maintenance of favorable characteristics, and suppression of an increase in size of the lens system is achieved.

The example in FIG. 1 is one example and can be subjected to various modifications without departing from the gist of the technology of the present disclosure. For example, while the subsequent lens group GR of the example in FIG. 1 comprises only two lens groups as lens groups, a configuration in which the number and refractive powers of lens groups constituting the subsequent lens group GR are different from the example illustrated in FIG. 1 is also available. Similarly, the number of lenses constituting each lens group can be set to a different number from the example illustrated in FIG. 1. A fixed lens group and a moving lens group during zooming can have different configurations from the example illustrated in FIG. 1. The aperture stop St may be arranged at a different position from the example in FIG. 1. For example, the aperture stop St may be arranged in the third lens group or may be arranged in the fourth lens group.

An example in which the optical member PP including various filters and the like is arranged between the lens system and the image plane Sim is illustrated in FIG. 1. However, instead of arranging the optical member PP between the lens system and the image plane Sim, the optical member PP may be arranged in any group, or the optical member PP may be arranged between groups. Alternatively, a coating having the same effect as various filters and the like may be applied to a lens surface of any lens.

It is preferable that an anti-reflection coating that prevents reflection of light is applied to a lens surface of each lens. While the anti-reflection coating is preferably configured to reduce reflectance in the entire range of the visible range to the SWIR range, the anti-reflection coating may be configured to reduce reflectance in the visible range and a part of the SWIR range depending on applications.

The variable magnification optical system may comprise a focusing function. Focusing may be performed by moving the entire lens system. Alternatively, focusing may be performed by moving only a part of lenses of the lens system. For example, focusing may be performed by moving only a part of lenses of the first lens group G1. Alternatively, focusing may be performed using a floating focus method of moving a plurality of lenses such that an interval between each other is changed during focusing.

The variable magnification optical system may comprise a vibration-proof function. Vibration proofing may be performed by moving a specific lens group. Alternatively, vibration proofing may be performed by moving only a part of lenses of the lens group. For example, vibration proofing may be performed by moving only a part of lenses or all lenses of the first lens group G1, or vibration proofing may be performed by moving only a part of lenses or all lenses of the fourth lens group G4.

The above preferred configurations and available configurations including configurations related to the conditional expressions can be used in any combination thereof and are preferably appropriately selectively employed depending on required specifications. According to the variable magnification optical system of the embodiment of the present disclosure, it is possible to implement favorable characteristics by correcting the chromatic aberration in the wavelength range of the visible range to the SWIR range while suppressing an increase in size of the lens system.

Next, examples of the variable magnification optical system according to the embodiment of the present disclosure will be described.

EXAMPLE 1

A cross-sectional view of a configuration of the variable magnification optical system of Example 1 is illustrated in FIG. 1, and an illustration method thereof is described above. Thus, duplicate descriptions will be partially omitted here. The variable magnification optical system of Example 1 is a zoom lens that consists of, in order from the object side to the image side, the first lens group G1 having a positive refractive power, the second lens group G2 having a negative refractive power, the third lens group G3 having a positive refractive power, the aperture stop St, and the fourth lens group G4 having a positive refractive power. During zooming, the first lens group G1, the aperture stop St, and the fourth lens group G4 are fixed with respect to the image plane Sim, and the second lens group G2 and the third lens group G3 are moved along the optical axis Z by changing an interval between each other. The first lens group G1 consists of the lenses L11 to L15. The second lens group G2 consists of the lenses L21 to L25. The third lens group G3 consists of the lenses L31 to L34. The fourth lens group G4 consists of the lenses L41 to L57.

For the variable magnification optical system of Example 1, basic lens data is shown in Table 1A and Table 1B, specifications and a variable surface interval are shown in Table 2, and various data are shown in Table 3 and Table 4. The basic lens data is separately shown in two tables of Table 1A and Table 1B in order to avoid one lengthy table. Table 1A shows the first lens group G1, the second lens group G2, and the third lens group G3. Table 1B shows the aperture stop St, the fourth lens group G4, and the optical member PP.

In Table 1A and Table 1B, a field of Sn shows a surface number in a case where the number is increased by one in a direction of the image side from a first surface denoting a surface closest to the object side. A field of R shows a radius of curvature of each surface. A field of D shows a surface interval on the optical axis between each surface and a surface adjacent thereto on the image side. A field of nd shows a d-line refractive index of each constituent. A field of ν shows a d line-based Abbe number of each constituent. A field of material shows a material name of each constituent. All materials shown in Table 1A and Table 1B are manufactured by OHARA INC.

In Table 1A and Table 1B, a sign of a radius of curvature of a surface having a shape of a convex surface toward the object side is positive, and a sign of a radius of curvature of a surface having a surface of a convex surface toward the image side is negative. In Table 1A, a symbol DD[ ] is used for the variable surface interval during zooming and is written in the field of D by writing a surface number on the object side of this interval in [ ]. In Table 1B, a surface number and a word (St) are written in the field of a surface number of a surface corresponding to the aperture stop St. A value in the lowermost field of D in Table 1B is an interval between a surface closest to the image side in the table and the image plane Sim.

Table 2 shows a magnification Zr, a focal length f, an F number FNo., and a maximum total angle of view 2ω as the specifications. In a field of 2ω, (°) means a unit of degrees. In addition, Table 2 shows the variable surface interval during zooming. In Table 2, values of the wide angle end state, the middle focal length state, and the telephoto end state are shown in fields of WIDE, MIDDLE, and TELE, respectively.

Table 3 shows TL, f1, f2, f3, and f31 used in the above conditional expressions and a focal length f4 of the fourth lens group G4. Values shown in Table 1A, Table 1B, Table 2, and Table 3 are d-line data in a state where the object at infinity is focused.

Table 4 shows a back focus in each wavelength. In Table 4, Bfd is the d-line back focus in the air-conversion distance of the entire system at the telephoto end. In a left field of Table 4, a numerical value after "Bf_" is a wavelength in units of nanometers (nm), and "Bf_numerical value" means the back focus in the wavelength of the numerical value in the air-conversion distance of the entire system at the telephoto end. A value of the corresponding back focus is shown in a right field in units of millimeters (mm).

In the data of each table, unless otherwise specified, degree is used as a unit of angle, and millimeter (mm) is used as a unit of length. However, since the optical system can be used by proportionally enlarging or proportionally reducing the optical system, other appropriate units can also be used. In each table shown below, numerical values rounded to a predetermined digit are written.

TABLE 1A

Example 1

| Sn | R | D | nd | ν | Material |
|---|---|---|---|---|---|
| 1 | 166.0458 | 4.0000 | 1.51633 | 64.14 | S-BSL7 |
| 2 | 112.9379 | 21.0000 | 1.49700 | 81.54 | S-FPL51 |
| 3 | −312.9580 | 1.0000 | | | |
| 4 | 142.3417 | 15.0000 | 1.49700 | 81.54 | S-FPL51 |
| 5 | −242.3717 | 4.0000 | 1.79952 | 42.22 | S-LAH52 |
| 6 | 195.9686 | 5.0000 | | | |
| 7 | 119.7940 | 12.0000 | 1.49700 | 81.54 | S-FPL51 |

TABLE 1A-continued

Example 1

| Sn | R | D | nd | ν | Material |
|---|---|---|---|---|---|
| 8 | 411.8138 | DD[8] | | | |
| 9 | 82.4139 | 5.0000 | 1.96300 | 24.11 | S-TIH57 |
| 10 | −59.2378 | 2.0100 | 1.80610 | 40.93 | S-LAH53V |
| 11 | 24.0543 | 5.0000 | | | |
| 12 | −28.6661 | 4.0000 | 1.71300 | 53.87 | S-LAL8 |
| 13 | −86.4771 | 2.0000 | | | |
| 14 | −32.6016 | 7.0000 | 1.67270 | 32.10 | S-TIM25 |
| 15 | −20.7725 | 1.5100 | 1.60311 | 60.64 | S-BSM14 |
| 16 | −57.4517 | DD[16] | | | |
| 17 | 251.1119 | 4.0000 | 1.49700 | 81.54 | S-FPL51 |
| 18 | −96.3510 | 0.2000 | | | |
| 19 | 43.0848 | 4.0000 | 1.49700 | 81.54 | S-FPL51 |
| 20 | 3803.5690 | 0.5000 | | | |
| 21 | 117.0905 | 1.1211 | 1.80400 | 46.58 | S-LAH65V |
| 22 | 26.9661 | 5.8211 | 1.53775 | 74.70 | S-FPM3 |
| 23 | 1164.6058 | DD[23] | | | |

TABLE 1B

Example 1

| Sn | R | D | nd | ν | Material |
|---|---|---|---|---|---|
| 24 (St) | ∞ | 3.0532 | | | |
| 25 | 118.9011 | 5.0000 | 1.74400 | 44.79 | S-LAM2 |
| 26 | −59.1209 | 1.0000 | | | |
| 27 | −29.7531 | 1.0000 | 1.83400 | 37.21 | S-LAH60V |
| 28 | 147.8947 | 4.0100 | 1.51742 | 52.43 | S-NSL36 |
| 29 | −24.5000 | 0.2000 | | | |
| 30 | −103.8858 | 1.0000 | 1.69680 | 55.53 | S-LAL14 |
| 31 | 67.6286 | 3.6522 | | | |
| 32 | −166.1516 | 1.0000 | 1.69680 | 55.53 | S-LAL14 |
| 33 | 78.1349 | 0.2000 | | | |
| 34 | 20.0226 | 4.6950 | 1.80000 | 29.84 | S-NBH55 |
| 35 | 42.1333 | 1.0000 | | | |
| 36 | 89.2272 | 1.7764 | 1.60300 | 65.44 | S-PHM53 |
| 37 | 21.5538 | 1.5000 | | | |
| 38 | 67.3255 | 3.0465 | 1.65412 | 39.68 | S-NBH5 |
| 39 | −60.5367 | 0.1000 | | | |
| 40 | 21.0488 | 4.0000 | 1.54814 | 45.78 | S-TIL1 |
| 41 | −26.3658 | 1.0000 | 1.85478 | 24.80 | S-NBH56 |
| 42 | 140.1678 | 2.0000 | | | |
| 43 | −41.8839 | 1.0000 | 1.78800 | 47.37 | S-LAH64 |
| 44 | 23.4749 | 3.7239 | 1.80610 | 40.93 | S-LAH53V |
| 45 | 43.5903 | 2.0000 | | | |
| 46 | −56.0501 | 2.5430 | 1.72916 | 54.09 | S-LAL19 |
| 47 | 37.8153 | 5.0100 | 1.60562 | 43.71 | S-BAM4 |
| 48 | −22.8814 | 28.6055 | | | |
| 49 | 56.7814 | 5.0990 | 1.80000 | 29.84 | S-NBH55 |
| 50 | 124.8251 | 0.7000 | | | |
| 51 | 54.1871 | 5.5415 | 1.51742 | 52.43 | S-NSL36 |
| 52 | −22.1912 | 2.0000 | 1.85478 | 24.80 | S-NBH56 |
| 53 | −178.1521 | 6.0000 | | | |
| 54 | ∞ | 1.0000 | 1.51633 | 64.14 | S-BSL7 |
| 55 | ∞ | 7.6537 | | | |

TABLE 2

Example 1

| | WIDE | MIDDLE | TELE |
|---|---|---|---|
| Zr | 1.0 | 6.2 | 38.0 |
| f | 20.5 | 126.5 | 780.1 |
| FNo. | 4.20 | 5.03 | 8.30 |
| ω (°) | 14.9 | 2.4 | 0.4 |
| DD[8] | 2.7897 | 70.6841 | 93.6903 |
| DD[16] | 178.4195 | 82.3754 | 3.0468 |
| DD[23] | 5.3470 | 33.4967 | 89.8191 |

TABLE 3

| Example 1 | |
| --- | --- |
| TL | 400.5 |
| f1 | 175.0 |
| f2 | −26.0 |
| f3 | 65.0 |
| f4 | 316.3 |
| f31 | 140.6 |

TABLE 4

| Example 1 | |
| --- | --- |
| Bfd | 14.31 |
| Bf_1300 | 14.60 |
| Bf_1426 | 14.71 |
| Bf_1450 | 14.72 |
| Bf_1450 | 14.72 |
| Bf_1460 | 14.73 |
| Bf_1530 | 14.77 |
| Bf_1550 | 14.78 |
| Bf_1570 | 14.79 |
| Bf_1651 | 14.81 |
| Bf_1653 | 14.81 |
| Bf_1696 | 14.80 |
| Bf_1725 | 14.80 |
| Bf_1750 | 14.79 |
| Bf_1870 | 14.71 |
| Bf_1940 | 14.63 |
| Bf_1970 | 14.59 |
| Bf_2050 | 14.44 |
| Bf_2120 | 14.27 |
| Bf_2325 | 13.53 |

Figure 3:
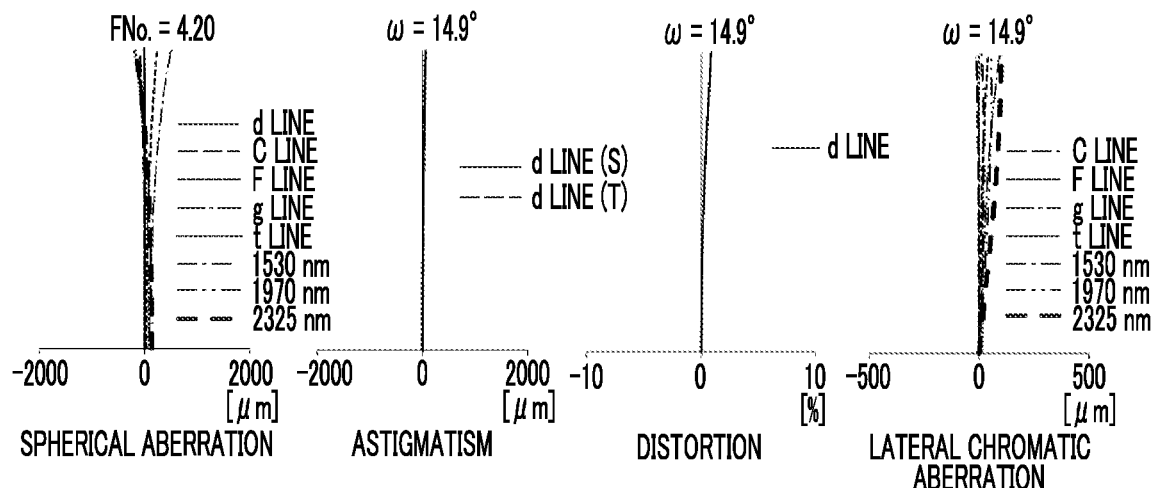
FIG. 3 is each aberration diagram of the variable magnification optical system of Example 1 of the present disclosure.
Figure 3:
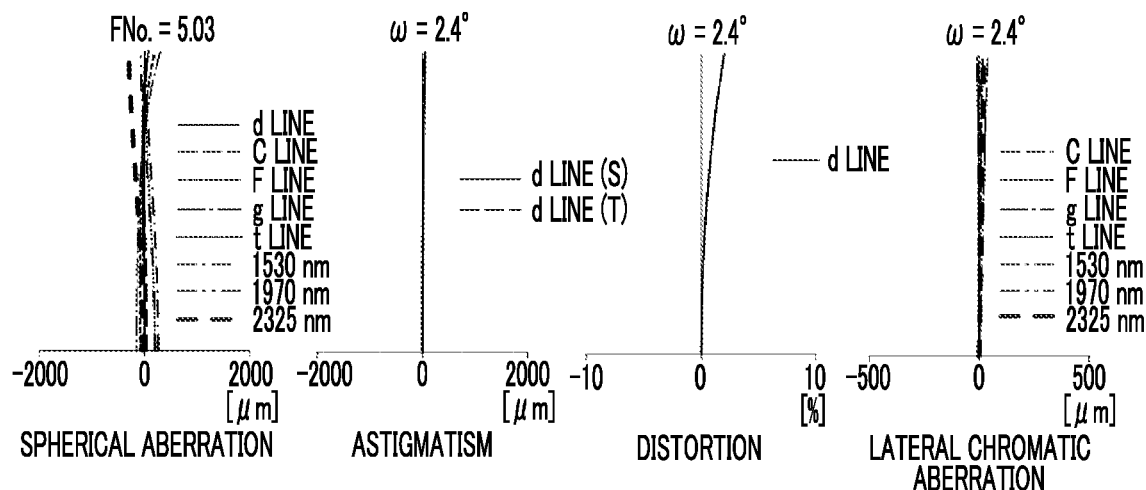
Figure 3:
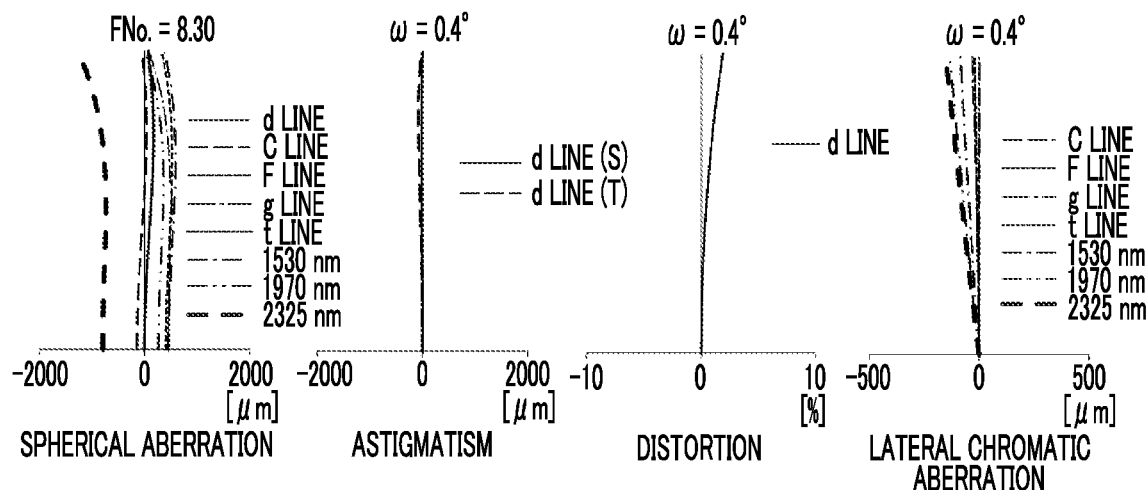

FIG. 3 illustrates each aberration diagram of the variable magnification optical system of Example 1 in a state where the object at infinity is focused. In FIG. 3, spherical aberration, astigmatism, distortion, and lateral chromatic aberration are shown in order from the left. In FIG. 3, aberration in the wide angle end state is illustrated in an upper part denoted by "WIDE". Aberration in the middle focal length state is illustrated in a middle part denoted by "MIDDLE". Aberration in the telephoto end state is illustrated in a lower part denoted by "TELE". In the spherical aberration diagram, aberration in d line, C line, F line, g line, t line, a wavelength of 1530 nm, a wavelength of 1970 nm, and a wavelength of 2325 nm are illustrated by a solid line, a long broken line, a short broken line, a narrow long-dashed line, a dotted line, a thick short-dashed line, a double-dashed line, and a thick long broken line, respectively. In the astigmatism diagram, d-line aberration in a sagittal direction is illustrated by a solid line, and d-line aberration in a tangential direction is illustrated by a long broken line. In the distortion diagram, d-line aberration is illustrated by a solid line. In the lateral chromatic aberration diagram, aberration in C line, F line, g line, t line, a wavelength of 1530 nm, a wavelength of 1970 nm, and a wavelength of 2325 nm are illustrated by a long broken line, a short broken line, a narrow long-dashed line, a dotted line, a thick short-dashed line, a double-dashed line, and a thick long broken line, respectively. In the spherical aberration diagram, FNo. means the F number. In the other aberration diagrams, ω means a half angle of view.

Symbols, meanings, writing methods, and illustration methods of each data related to Example 1 are the same in the following examples unless otherwise specified. Thus, duplicate descriptions will be omitted below.

EXAMPLE 2

Figure 4:
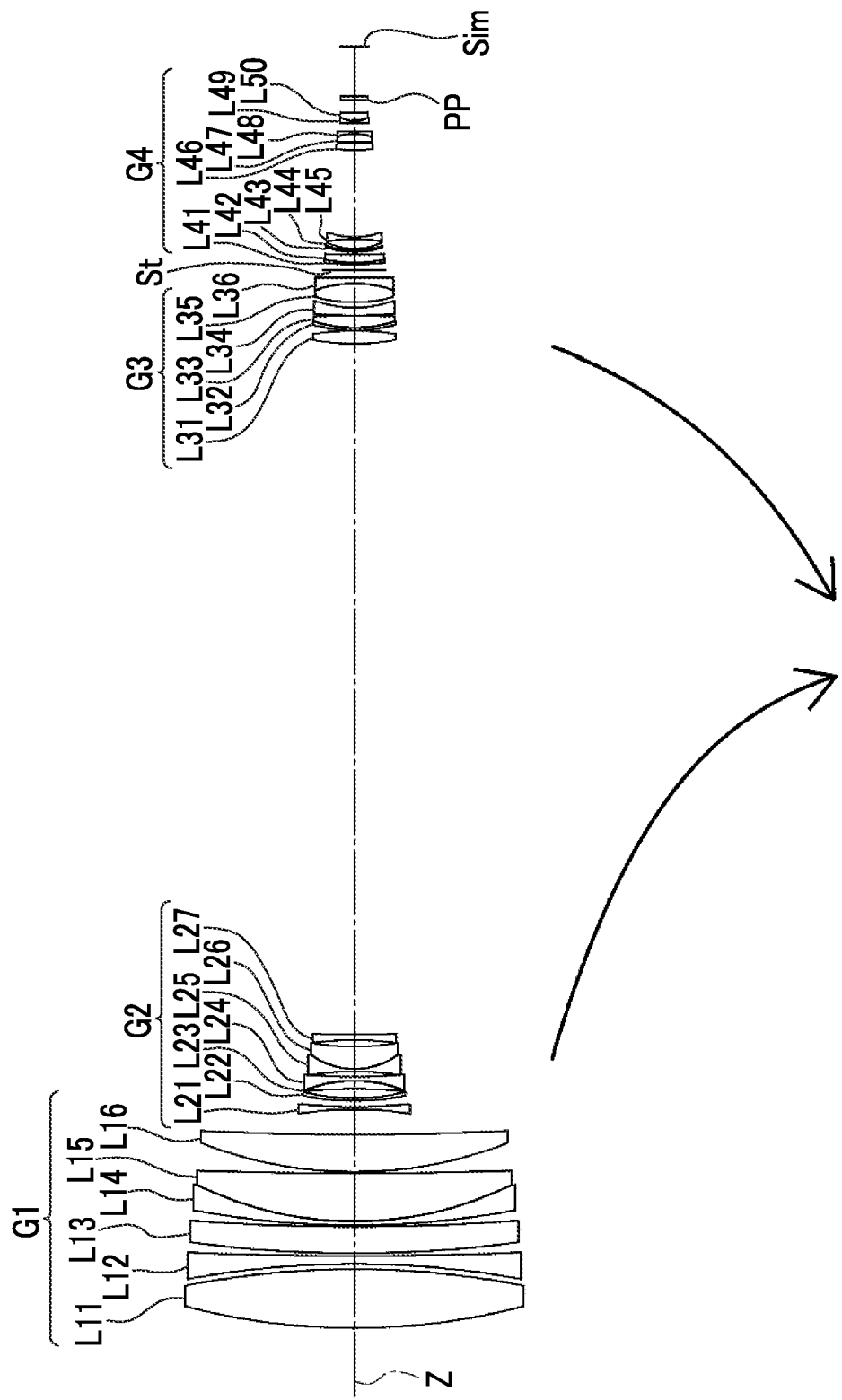
FIG. 4 is a cross-sectional view of a configuration of a variable magnification optical system of Example 2 of the present disclosure and a diagram illustrating a movement trajectory.
Figure 5:
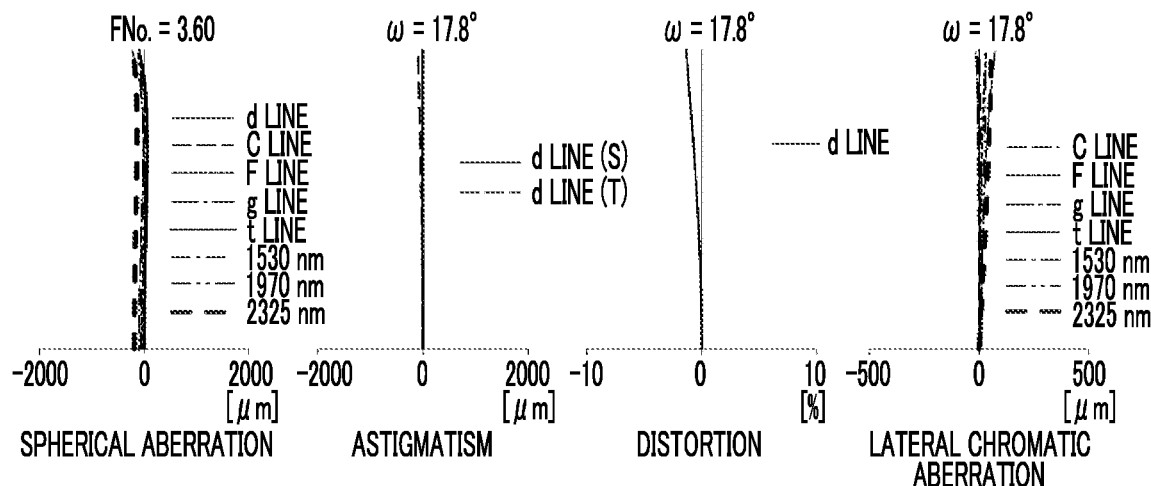
FIG. 5 is each aberration diagram of the variable magnification optical system of Example 2 of the present disclosure.
Figure 5:
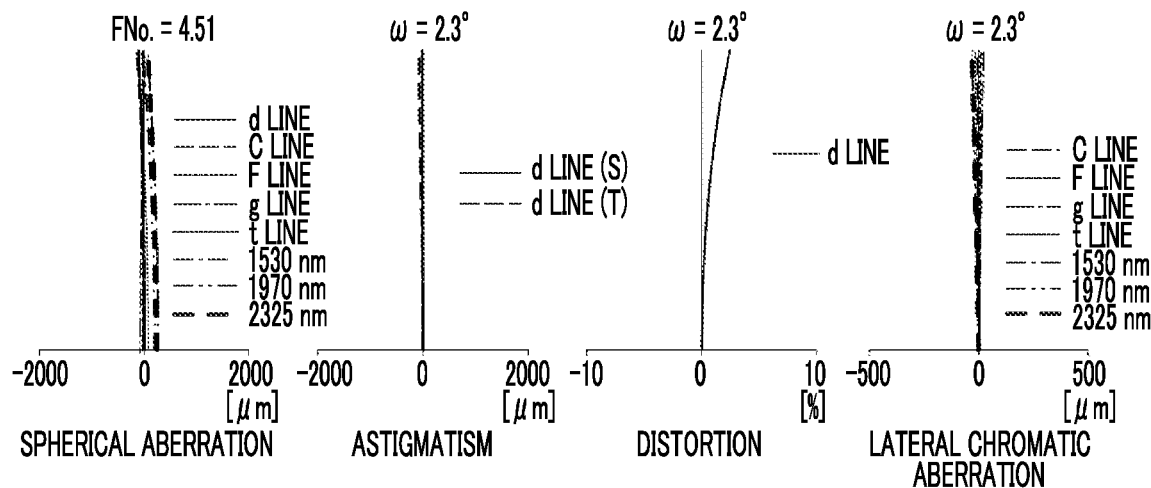
Figure 5:
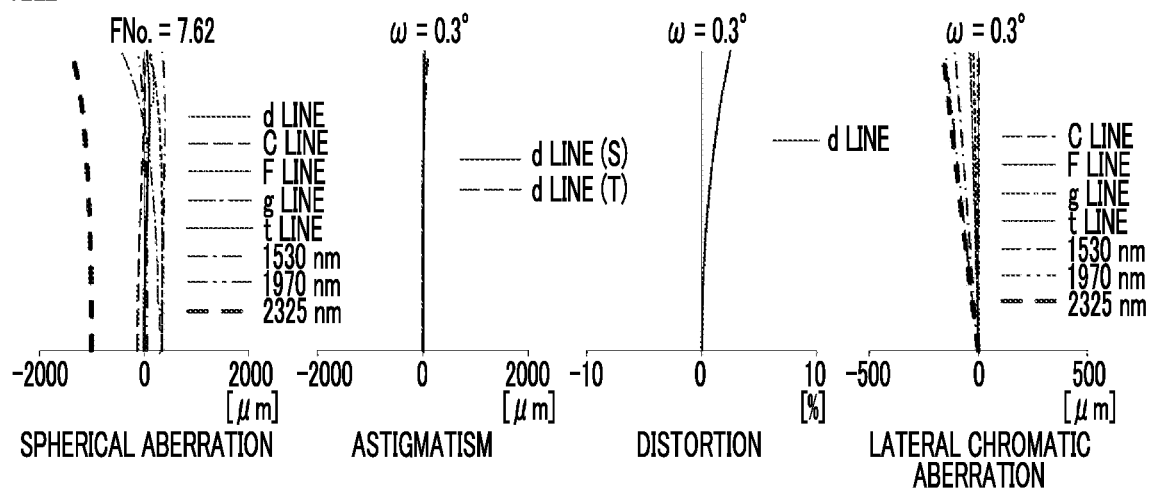

A configuration of a variable magnification optical system of Example 2 and a movement trajectory are illustrated in FIG. 4. The variable magnification optical system of Example 2 consists of, in order from the object side to the image side, the first lens group G1 having a positive refractive power, the second lens group G2 having a negative refractive power, the third lens group G3 having a positive refractive power, the aperture stop St, and the fourth lens group G4 having a negative refractive power. During zooming, the first lens group G1, the aperture stop St, and the fourth lens group G4 are fixed with respect to the image plane Sim, and the second lens group G2 and the third lens group G3 are moved along the optical axis Z by changing an interval between each other. The first lens group G1 consists of lenses L11 to L16. The second lens group G2 consists of lenses L21 to L27. The third lens group G3 consists of lenses L31 to L36. The fourth lens group G4 consists of lenses L41 to L50. For the variable magnification optical system of Example 2, basic lens data is shown in Table 5A and Table 5B, and specifications and a variable surface interval are shown in Table 6. Various data are shown in Table 7 and Table 8, and each aberration diagram is illustrated in FIG. 5. All materials shown in Table 5A and Table 5B are manufactured by OHARA INC.

TABLE 5A

Example 2

| Sn | R | D | nd | ν | Material |
| --- | --- | --- | --- | --- | --- |
| 1 | 262.6800 | 22.0000 | 1.43875 | 94.94 | S-FPL53 |
| 2 | −346.4618 | 2.0000 | | | |
| 3 | −362.4394 | 3.0000 | 1.51633 | 64.14 | S-BSL7 |
| 4 | 1520.2617 | 1.0000 | | | |
| 5 | 474.9879 | 10.0000 | 1.61800 | 63.33 | S-PHM52 |
| 6 | 882.9586 | 0.5000 | | | |
| 7 | 334.8998 | 1.5000 | 1.70154 | 41.24 | S-BAH27 |
| 8 | 139.8976 | 18.0000 | 1.43875 | 94.94 | S-FPL53 |
| 9 | 1891.3228 | 0.5000 | | | |
| 10 | 164.5283 | 13.9776 | 1.43875 | 94.94 | S-FPL53 |
| 11 | 1210.3325 | DD[11] | | | |
| 12 | −140.4581 | 1.0000 | 1.56384 | 60.67 | S-BAL41 |
| 13 | 188.5298 | 2.2000 | | | |
| 14 | 98.1201 | 1.0000 | 1.58913 | 61.13 | S-BAL35 |
| 15 | 77.5904 | 3.5000 | | | |
| 16 | −242.2980 | 3.0000 | 1.92286 | 18.90 | S-NPH2 |
| 17 | −53.7526 | 1.5000 | 1.54814 | 45.78 | S-TIL1 |
| 18 | 173.2388 | 2.0000 | | | |
| 19 | −113.3766 | 1.0000 | 1.49700 | 81.54 | S-FPL51 |
| 20 | 28.4989 | 8.0000 | 1.51633 | 64.14 | S-BSL7 |
| 21 | 86.9686 | 2.5000 | | | |
| 22 | −119.3128 | 2.0000 | 1.74100 | 52.64 | S-LAL61 |
| 23 | 367.1919 | DD[23] | | | |
| 24 | 89.6955 | 4.8214 | 1.43875 | 94.94 | S-FPL53 |
| 25 | −107.4861 | 0.1202 | | | |
| 26 | 59.7089 | 1.0000 | 1.90366 | 31.34 | S-LAH95 |
| 27 | 51.6163 | 4.5000 | 1.43875 | 94.94 | S-FPL53 |
| 28 | −518.2264 | 0.1200 | | | |
| 29 | 184.9380 | 3.0000 | 1.69680 | 55.53 | S-LAL14 |
| 30 | 46.0342 | 2.0000 | | | |
| 31 | 59.2152 | 7.0000 | 1.63854 | 55.38 | S-BSM18 |
| 32 | −44.5143 | 2.0000 | 1.72000 | 41.98 | S-LAM58 |
| 33 | 1477.9789 | DD[33] | | | |

TABLE 5B

Example 2

| Sn | R | D | nd | ν | Material |
| --- | --- | --- | --- | --- | --- |
| 34 (St) | ∞ | 2.1937 | | | |
| 35 | 113.8589 | 0.6000 | 1.88300 | 40.76 | S-LAH58 |
| 36 | 52.6534 | 3.0000 | 1.74000 | 28.30 | S-TIH3 |
| 37 | 204.8380 | 1.0000 | | | |
| 38 | 34.9439 | 0.8000 | 1.65100 | 56.16 | S-LAL54 |

TABLE 5B-continued

Example 2

| Sn | R | D | nd | v | Material |
|---|---|---|---|---|---|
| 39 | 38.8128 | 0.5000 | | | |
| 40 | 25.3979 | 3.5100 | 1.43875 | 94.94 | S-FPL53 |
| 41 | −77.8040 | 0.8000 | 1.71300 | 53.87 | S-LAL8 |
| 42 | 30.2211 | 32.6140 | | | |
| 43 | 49.3977 | 3.0000 | 1.67270 | 32.10 | S-TIM25 |
| 44 | −28.9922 | 0.1000 | | | |
| 45 | 283.1228 | 3.0000 | 1.48749 | 70.24 | S-FSL5 |
| 46 | −18.8563 | 1.0000 | 1.88300 | 40.76 | S-LAH58 |
| 47 | −92.9167 | 3.0000 | | | |
| 48 | 298.2509 | 0.8000 | 1.75500 | 52.32 | S-YGH51 |
| 49 | 9.8855 | 3.0000 | 1.43875 | 94.94 | S-FPL53 |
| 50 | 56.8278 | 5.0000 | | | |
| 51 | ∞ | 1.2000 | 1.51633 | 64.14 | S-BSL7 |
| 52 | ∞ | 18.8081 | | | |

TABLE 6

Example 2

| | WIDE | MIDDLE | TELE |
|---|---|---|---|
| Zr | 1.0 | 7.6 | 57.0 |
| f | 17.3 | 130.9 | 988.3 |
| FNo. | 3.60 | 4.51 | 7.62 |
| ω (°) | 17.8 | 2.3 | 0.3 |
| DD[11] | 9.4493 | 126.6970 | 163.4178 |
| DD[23] | 258.7170 | 109.8837 | 3.1512 |
| DD[33] | 2.9649 | 34.5504 | 104.5621 |

TABLE 7

Example 2

| TL | 479.4 |
|---|---|
| f1 | 255.2 |
| f2 | −33.8 |
| f3 | 74.4 |
| f4 | −128.2 |
| f31 | 112.3 |

TABLE 8

Example 2

| Bfd | 24.60 |
|---|---|
| Bf_1300 | 24.83 |
| Bf_1426 | 24.91 |
| Bf_1450 | 24.92 |
| Bf_1450 | 24.92 |
| Bf_1460 | 24.92 |
| Bf_1530 | 24.95 |
| Bf_1550 | 24.95 |
| Bf_1570 | 24.95 |
| Bf_1651 | 24.95 |
| Bf_1653 | 24.95 |
| Bf_1696 | 24.94 |
| Bf_1725 | 24.93 |
| Bf_1750 | 24.91 |
| Bf_1870 | 24.81 |
| Bf_1940 | 24.71 |
| Bf_1970 | 24.66 |
| Bf_2050 | 24.50 |
| Bf_2120 | 24.33 |
| Bf_2325 | 23.61 |

EXAMPLE 3

Figure 6:
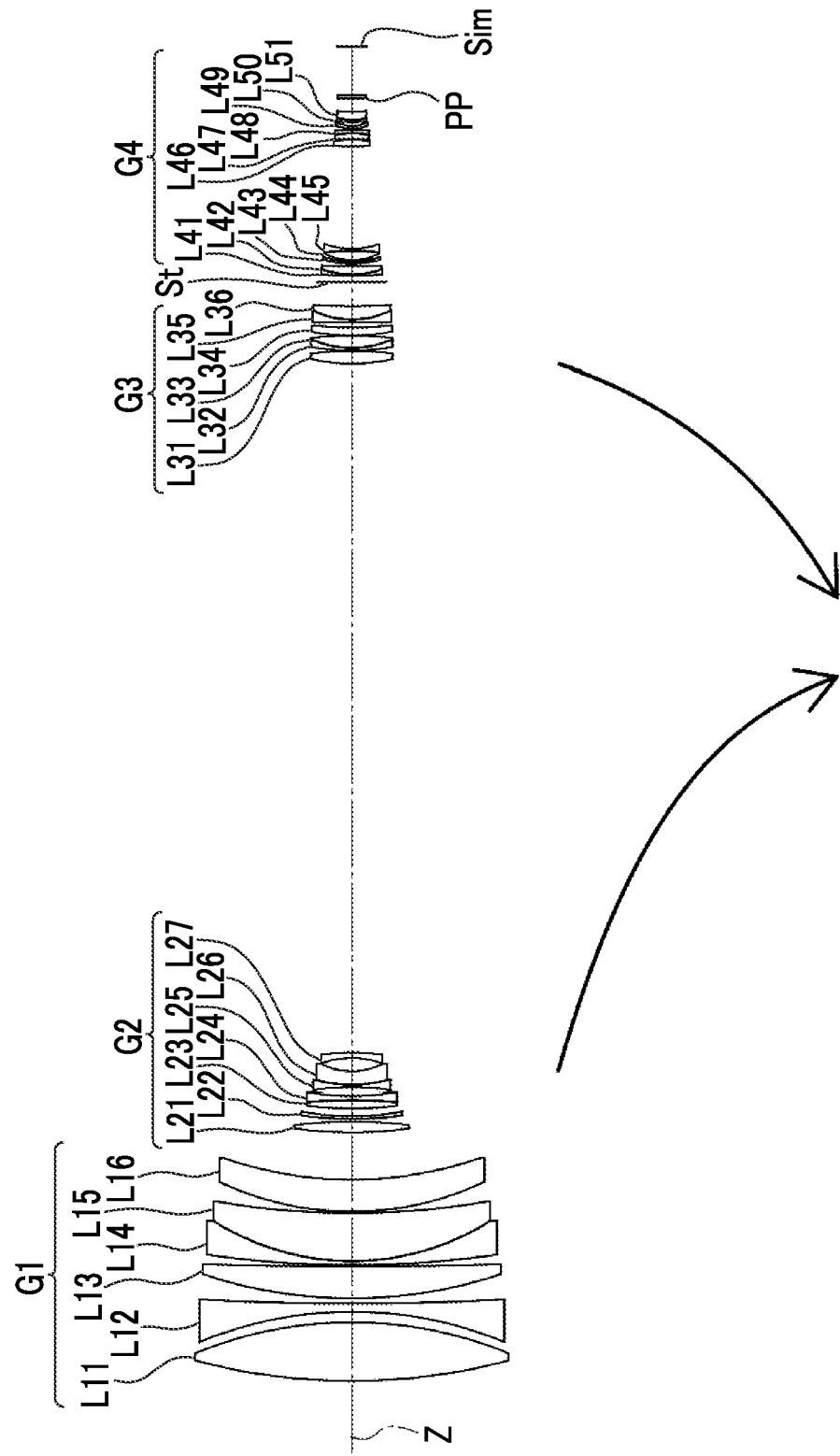
FIG. 6 is a cross-sectional view of a configuration of a variable magnification optical system of Example 3 of the present disclosure and a diagram illustrating a movement trajectory.
Figure 7:
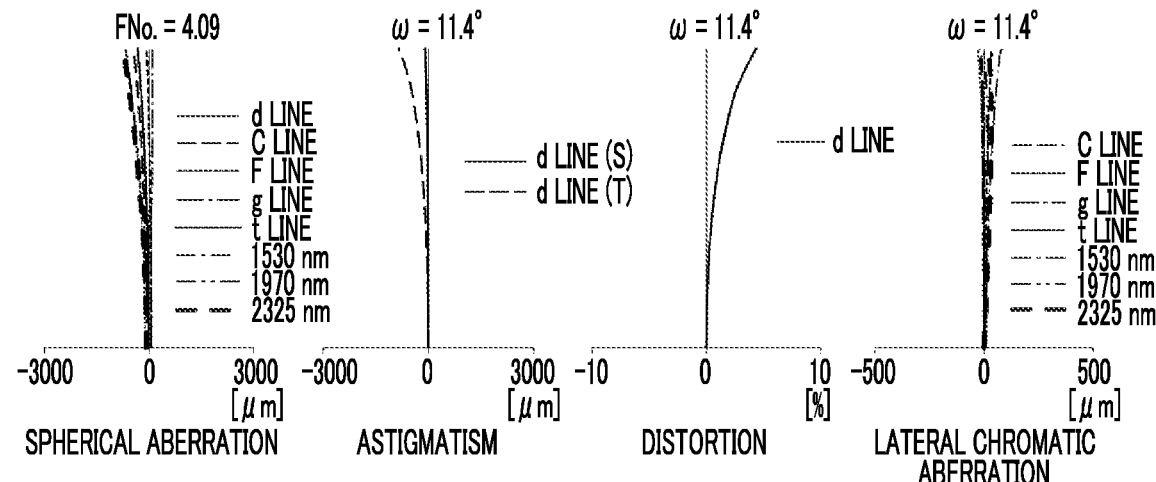
FIG. 7 is each aberration diagram of the variable magnification optical system of Example 3 of the present disclosure.
Figure 7:
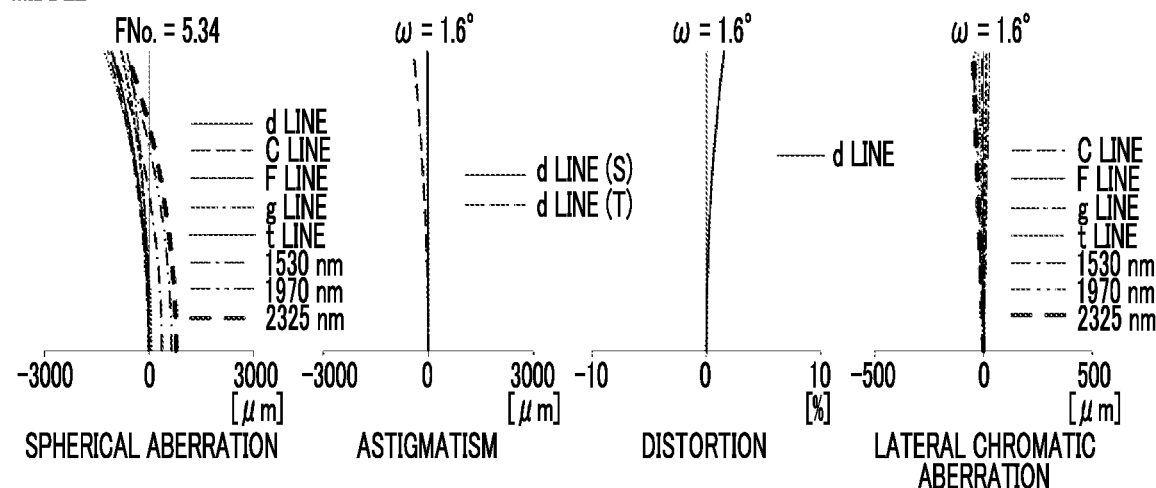
Figure 7:
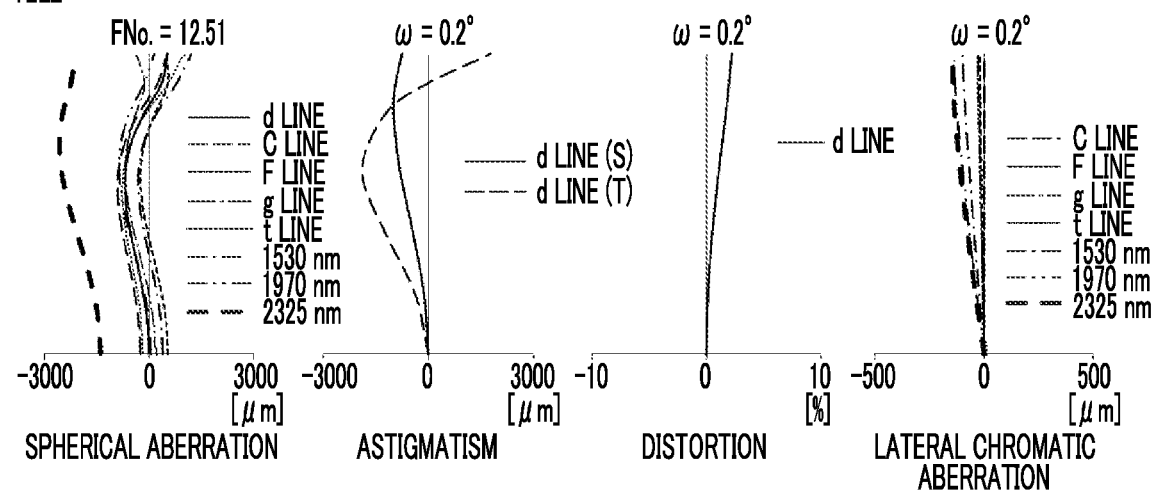

A configuration of a variable magnification optical system of Example 3 and a movement trajectory are illustrated in FIG. 6. The variable magnification optical system of Example 3 consists of, in order from the object side to the image side, the first lens group G1 having a positive refractive power, the second lens group G2 having a negative refractive power, the third lens group G3 having a positive refractive power, the aperture stop St, and the fourth lens group G4 having a negative refractive power. During zooming, the first lens group G1, the aperture stop St, and the fourth lens group G4 are fixed with respect to the image plane Sim, and the second lens group G2 and the third lens group G3 are moved along the optical axis Z by changing an interval between each other. The first lens group G1 consists of the lenses L11 to L16. The second lens group G2 consists of the lenses L21 to L27. The third lens group G3 consists of the lenses L31 to L36. The fourth lens group G4 consists of lenses L41 to L51. For the variable magnification optical system of Example 3, basic lens data is shown in Table 9A and Table 9B, and specifications and a variable surface interval are shown in Table 10. Various data are shown in Table 11 and Table 12, and each aberration diagram is illustrated in FIG. 7. All materials shown in Table 9A and Table 9B are manufactured by OHARA INC.

TABLE 9A

Example 3

| Sn | R | D | nd | v | Material |
|---|---|---|---|---|---|
| 1 | 238.3732 | 22.0000 | 1.43875 | 94.94 | S-FPL53 |
| 2 | −161.2457 | 4.0000 | | | |
| 3 | −155.4722 | 3.0000 | 1.51633 | 64.14 | S-BSL7 |
| 4 | 1036.2284 | 2.0000 | | | |
| 5 | 184.5109 | 12.0000 | 1.69680 | 55.53 | S-LAL14 |
| 6 | 2243.9702 | 0.5000 | | | |
| 7 | 398.9216 | 1.5000 | 1.67003 | 47.23 | S-BAH10 |
| 8 | 101.2520 | 18.0000 | 1.43875 | 94.94 | S-FPL53 |
| 9 | 319.2713 | 0.5000 | | | |
| 10 | 121.6904 | 12.0000 | 1.43875 | 94.94 | S-FPL53 |
| 11 | 153.3566 | DD[11] | | | |
| 12 | 163.9393 | 4.0000 | 1.67790 | 55.34 | S-LAL12 |
| 13 | −181.8297 | 1.0000 | | | |
| 14 | 152.1124 | 1.0000 | 1.58913 | 61.13 | S-BAL35 |
| 15 | 102.2663 | 3.0000 | | | |
| 16 | 150.9846 | 3.0000 | 1.92286 | 18.90 | S-NPH2 |
| 17 | −199.4882 | 1.5000 | 1.54814 | 45.78 | S-TIL1 |
| 18 | 85.3113 | 3.0000 | | | |
| 19 | −113.7129 | 1.0000 | 1.49700 | 81.54 | S-FPL51 |
| 20 | 51.2189 | 5.0000 | 1.51633 | 64.14 | S-BSL7 |
| 21 | 25.1968 | 5.0000 | | | |
| 22 | −32.5218 | 2.0000 | 1.74100 | 52.64 | S-LAL61 |
| 23 | −97.8041 | DD[23] | | | |
| 24 | 68.4997 | 4.8214 | 1.43875 | 94.94 | S-FPL53 |
| 25 | −115.5670 | 0.1202 | | | |
| 26 | 85.6450 | 1.0000 | 1.90366 | 31.34 | S-LAH95 |
| 27 | 38.8286 | 4.5000 | 1.43875 | 94.94 | S-FPL53 |
| 28 | −151.9851 | 0.1200 | | | |
| 29 | 84.8198 | 3.0000 | 1.69680 | 55.53 | S-LAL14 |
| 30 | 147.0620 | 2.0000 | | | |
| 31 | −4008.0448 | 1.0000 | 1.63854 | 55.38 | S-BSM18 |
| 32 | 33.4654 | 5.0000 | 1.72000 | 41.98 | S-LAM58 |
| 33 | 231.1693 | DD[33] | | | |

TABLE 9B

Example 3

| Sn | R | D | nd | ν | Material |
|---|---|---|---|---|---|
| 34 (St) | | 2.1937 | | | |
| 35 | 107.0101 | 0.6000 | 1.88300 | 40.76 | S-LAH58 |
| 36 | 35.2650 | 3.0000 | 1.74000 | 28.30 | S-TIH3 |
| 37 | 226.4375 | 1.0000 | | | |
| 38 | 39.0957 | 0.8000 | 1.65100 | 56.16 | S-LAL54 |
| 39 | 34.7135 | 0.5000 | | | |
| 40 | 22.1005 | 3.5100 | 1.43875 | 94.94 | S-FPL53 |
| 41 | −84.1553 | 0.8000 | 1.71300 | 53.87 | S-LAL8 |
| 42 | 30.1678 | 38.3445 | | | |
| 43 | 71.0745 | 2.5000 | 1.67270 | 32.10 | S-TIM25 |
| 44 | −34.7544 | 0.1000 | | | |
| 45 | 2066.7097 | 2.5000 | 1.48749 | 70.24 | S-FSL5 |
| 46 | −21.1670 | 1.0000 | 1.88300 | 40.76 | S-LAH58 |
| 47 | −99.1392 | 0.5000 | | | |
| 48 | 15.1632 | 1.0000 | 1.71300 | 53.87 | S-LAL8 |
| 49 | 11.5637 | 1.5000 | | | |
| 50 | 84.7449 | 0.8000 | 1.75500 | 52.32 | S-YGH51 |
| 51 | 20.6994 | 3.0000 | 1.43875 | 94.94 | S-FPL53 |
| 52 | 47.2681 | 5.0000 | | | |
| 53 | ∞ | 1.2000 | 1.51633 | 64.14 | S-BSL7 |
| 54 | ∞ | 18.3942 | | | |

TABLE 10

Example 3

| | WIDE | MIDDLE | TELE |
|---|---|---|---|
| Zr | 1.0 | 7.6 | 57.0 |
| f | 26.0 | 196.5 | 1483.3 |
| FNo. | 4.09 | 5.34 | 12.51 |
| ω (°) | 11.4 | 1.6 | 0.2 |
| DD[11] | 17.7462 | 139.2476 | 178.2565 |
| DD[23] | 257.9358 | 107.5640 | 2.6487 |
| DD[33] | 9.1484 | 38.0188 | 103.9252 |

TABLE 11

Example 3

| TL | 499.4 |
|---|---|
| f1 | 313.7 |
| f2 | −35.3 |
| f3 | 69.4 |
| f4 | −72.7 |
| f31 | 98.8 |

TABLE 12

Example 3

| Bfd | 24.19 |
|---|---|
| Bf_1300 | 24.38 |
| Bf_1426 | 24.52 |
| Bf_1450 | 24.54 |
| Bf_1450 | 24.54 |
| Bf_1460 | 24.54 |
| Bf_1530 | 24.59 |
| Bf_1550 | 24.60 |
| Bf_1570 | 24.60 |
| Bf_1651 | 24.61 |
| Bf_1653 | 24.61 |
| Bf_1696 | 24.60 |
| Bf_1725 | 24.59 |
| Bf_1750 | 24.57 |
| Bf_1870 | 24.44 |
| Bf_1940 | 24.31 |
| Bf_1970 | 24.25 |
| Bf_2050 | 24.03 |
| Bf_2120 | 23.80 |
| Bf_2325 | 22.81 |

EXAMPLE 4

Figure 8:
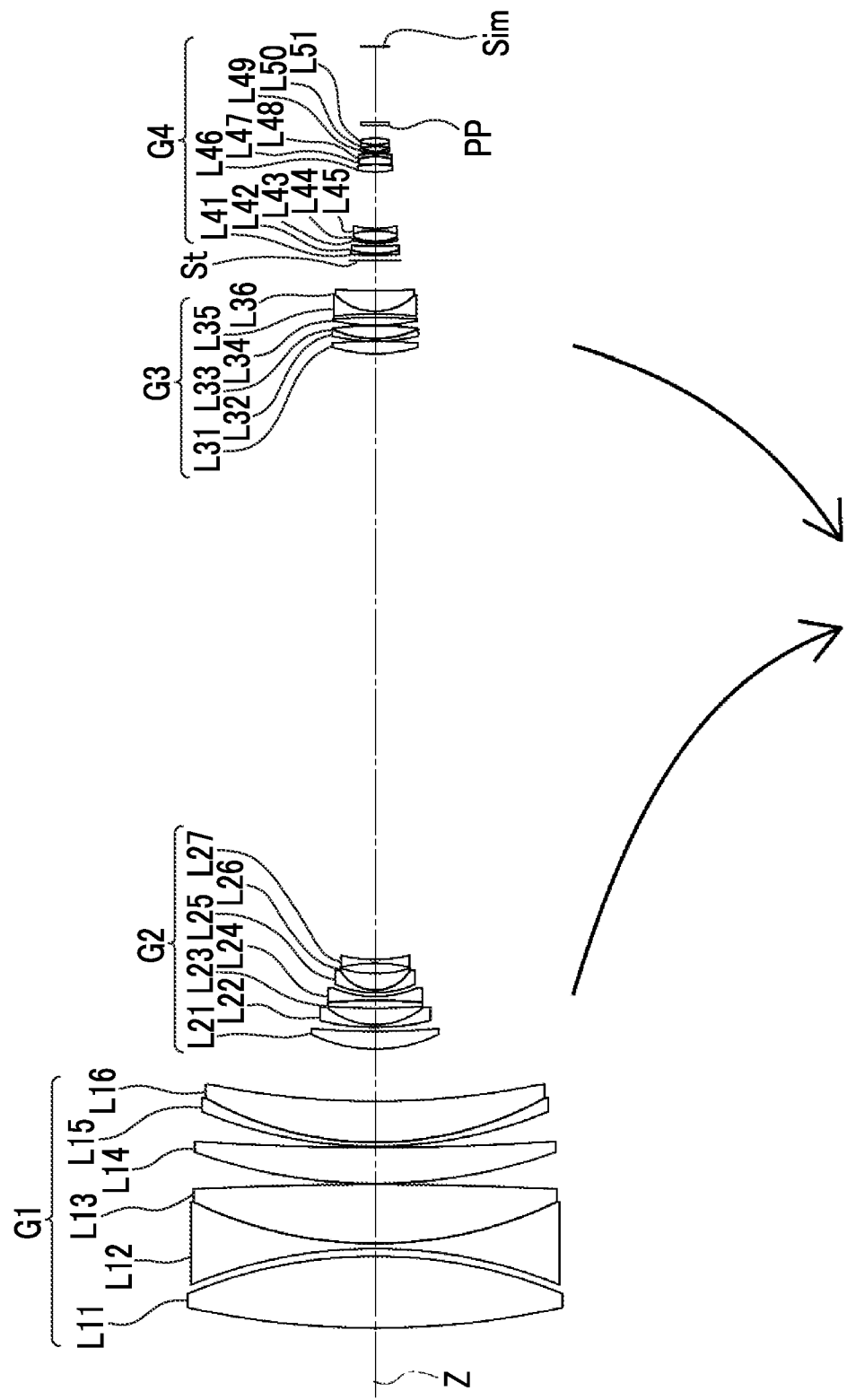
FIG. 8 is a cross-sectional view of a configuration of a variable magnification optical system of Example 4 of the present disclosure and a diagram illustrating a movement trajectory.
Figure 9:
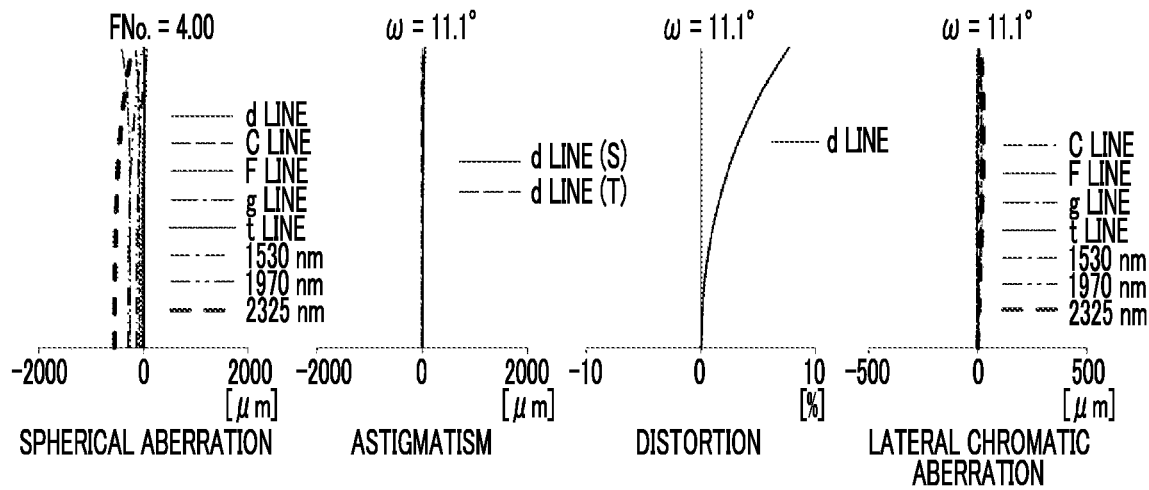
FIG. 9 is each aberration diagram of the variable magnification optical system of Example 4 of the present disclosure.
Figure 9:
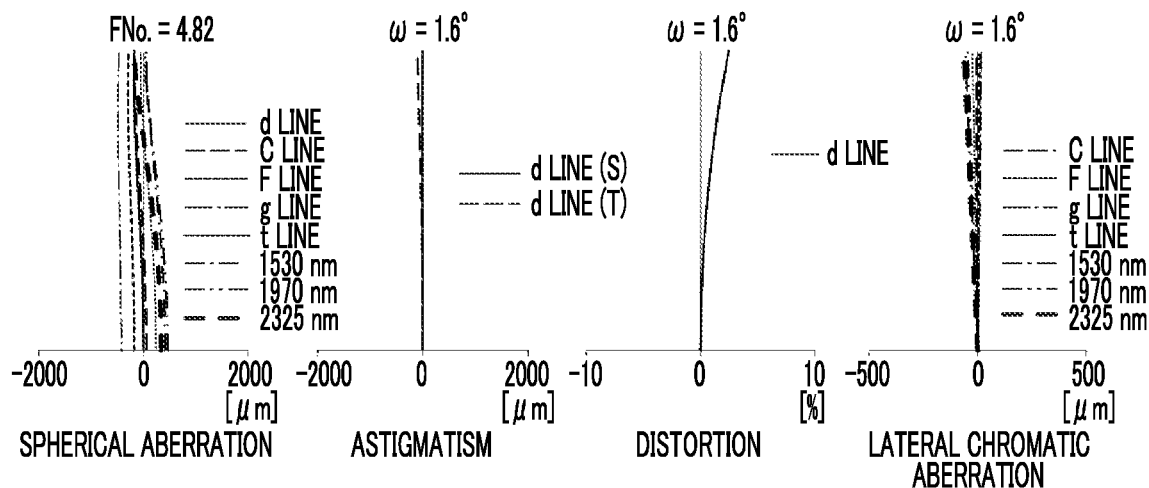
Figure 9:
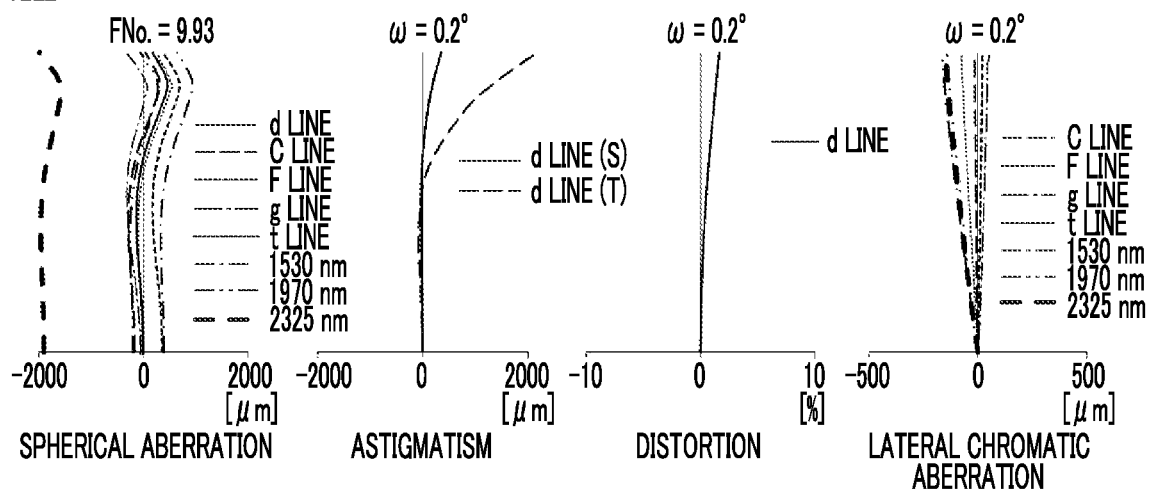

A configuration of a variable magnification optical system of Example 4 and a movement trajectory are illustrated in FIG. 8. The variable magnification optical system of Example 4 consists of, in order from the object side to the image side, the first lens group G1 having a positive refractive power, the second lens group G2 having a negative refractive power, the third lens group G3 having a positive refractive power, the aperture stop St, and the fourth lens group G4 having a negative refractive power. During zooming, the first lens group G1, the aperture stop St, and the fourth lens group G4 are fixed with respect to the image plane Sim, and the second lens group G2 and the third lens group G3 are moved along the optical axis Z by changing an interval between each other. The first lens group G1 consists of the lenses L11 to L16. The second lens group G2 consists of the lenses L21 to L27. The third lens group G3 consists of the lenses L31 to L36. The fourth lens group G4 consists of the lenses L41 to L51. For the variable magnification optical system of Example 4, basic lens data is shown in Table 13A and Table 13B, and specifications and a variable surface interval are shown in Table 14. Various data are shown in Table 15 and Table 16, and each aberration diagram is illustrated in FIG. 9. All materials shown in Table 13A and Table 13B are manufactured by OHARA INC.

TABLE 13A

Example 4

| Sn | R | D | nd | ν | Material |
|---|---|---|---|---|---|
| 1 | 354.4124 | 28.0000 | 1.43875 | 94.94 | S-FPL53 |
| 2 | −198.7344 | 3.0000 | | | |
| 3 | −198.9426 | 2.0000 | 1.53996 | 59.46 | S-BAL12 |
| 4 | 170.6499 | 23.0000 | 1.43875 | 94.94 | S-FPL53 |
| 5 | −1489.7161 | 0.5000 | | | |
| 6 | 220.0292 | 14.0000 | 1.61800 | 63.33 | S-PHM52 |
| 7 | 1102.0610 | 0.5000 | | | |
| 8 | 184.3961 | 1.5000 | 1.67003 | 47.23 | S-BAH10 |
| 9 | 141.3399 | 16.0000 | 1.43875 | 94.94 | S-FPL53 |
| 10 | 334.3144 | DD[10] | | | |
| 11 | 57.5771 | 7.0000 | 1.77250 | 49.60 | S-LAH66 |
| 12 | 338.3425 | 1.5000 | | | |
| 13 | 93.3552 | 1.0000 | 1.51633 | 64.14 | S-BSL7 |
| 14 | 30.0525 | 6.5000 | | | |
| 15 | 280.1305 | 3.0000 | 1.92286 | 18.90 | S-NPH2 |
| 16 | −212.7253 | 1.5000 | 1.51742 | 52.43 | S-NSL36 |
| 17 | 42.3543 | 1.5000 | | | |
| 18 | 39.4746 | 1.0000 | 1.49700 | 81.54 | S-FPL51 |
| 19 | 16.1131 | 6.5000 | 1.51633 | 64.14 | S-BSL7 |
| 20 | 45.4957 | 4.0000 | | | |
| 21 | −57.3257 | 1.5000 | 1.88300 | 40.76 | S-LAH58 |
| 22 | 61.2044 | DD[22] | | | |
| 23 | 58.2651 | 4.8214 | 1.43875 | 94.94 | S-FPL53 |
| 24 | −205.4930 | 0.1202 | | | |
| 25 | 77.7181 | 1.0000 | 1.90366 | 31.34 | S-LAH95 |
| 26 | 41.6050 | 5.0000 | 1.43875 | 94.94 | S-FPL53 |
| 27 | −135.2612 | 0.1200 | | | |
| 28 | 80.4224 | 3.0000 | 1.69680 | 55.53 | S-LAL14 |
| 29 | −279.5500 | 1.5000 | | | |
| 30 | −141.8574 | 1.0000 | 1.69100 | 54.82 | S-LAL9 |
| 31 | 22.3833 | 8.0000 | 1.67003 | 47.23 | S-BAH10 |
| 32 | 275.8818 | DD[32] | | | |

TABLE 13B

Example 4

| Sn | R | D | nd | v | Material |
|---|---|---|---|---|---|
| 33 (St) | ∞ | 2.1937 | | | |
| 34 | 216.6916 | 0.6000 | 1.88300 | 40.76 | S-LAH58 |
| 35 | 35.8329 | 3.0000 | 1.78470 | 26.29 | S-TIH23 |
| 36 | 242.3271 | 1.0000 | | | |
| 37 | 41.3933 | 0.8000 | 1.65160 | 58.55 | S-LAL7 |
| 38 | 32.5808 | 0.0200 | | | |
| 39 | 21.6789 | 4.0100 | 1.43875 | 94.94 | S-FPL53 |
| 40 | −35.7917 | 0.8000 | 1.77250 | 49.60 | S-LAH66 |
| 41 | 31.8185 | 22.1788 | | | |
| 42 | 33.7876 | 3.0000 | 1.67270 | 32.10 | S-TIM25 |
| 43 | −31.3415 | 0.1000 | | | |
| 44 | 165.1396 | 3.0000 | 1.48749 | 70.24 | S-FSL5 |
| 45 | −18.7941 | 1.0000 | 1.88300 | 40.76 | S-LAH58 |
| 46 | −64.5585 | 0.0200 | | | |
| 47 | 14.2943 | 0.8000 | 1.74100 | 52.64 | S-LAL61 |
| 48 | 10.3719 | 2.0000 | | | |
| 49 | −35.1290 | 0.8000 | 1.80400 | 46.53 | S-LAH65VS |
| 50 | 24.0596 | 2.5000 | 1.43875 | 94.94 | S-FPL53 |
| 51 | −23.3141 | 5.0000 | | | |
| 52 | ∞ | 1.2000 | 1.51633 | 64.14 | S-BSL7 |
| 53 | ∞ | 29.6299 | | | |

TABLE 14

Example 4

| | WIDE | MIDDLE | TELE |
|---|---|---|---|
| Zr | 1.0 | 7.6 | 57.0 |
| f | 26.0 | 196.3 | 1482.2 |
| FNo. | 4.00 | 4.82 | 9.93 |
| ω (°) | 11.1 | 1.6 | 0.2 |
| DD[10] | 20.0109 | 135.6393 | 173.4997 |
| DD[22] | 236.1068 | 96.1321 | 1.3915 |
| DD[32] | 11.7659 | 36.1121 | 92.9923 |

TABLE 15

Example 4

| | |
|---|---|
| TL | 499.2 |
| f1 | 295.9 |
| f2 | −33.5 |
| f3 | 60.1 |
| f4 | −97.2 |
| f31 | 104.0 |

TABLE 16

Example 4

| | |
|---|---|
| Bfd | 35.42 |
| Bf_1300 | 35.71 |
| Bf_1426 | 35.80 |
| Bf_1450 | 35.80 |
| Bf_1450 | 35.80 |
| Bf_1460 | 35.81 |
| Bf_1530 | 35.82 |
| Bf_1550 | 35.82 |
| Bf_1570 | 35.82 |
| Bf_1651 | 35.78 |
| Bf_1653 | 35.78 |
| Bf_1696 | 35.75 |
| Bf_1725 | 35.72 |
| Bf_1750 | 35.69 |
| Bf_1870 | 35.49 |
| Bf_1940 | 35.32 |
| Bf_1970 | 35.23 |
| Bf_2050 | 34.97 |

TABLE 16-continued

Example 4

| | |
|---|---|
| Bf_2120 | 34.68 |
| Bf_2325 | 33.53 |

EXAMPLE 5

Figure 10:
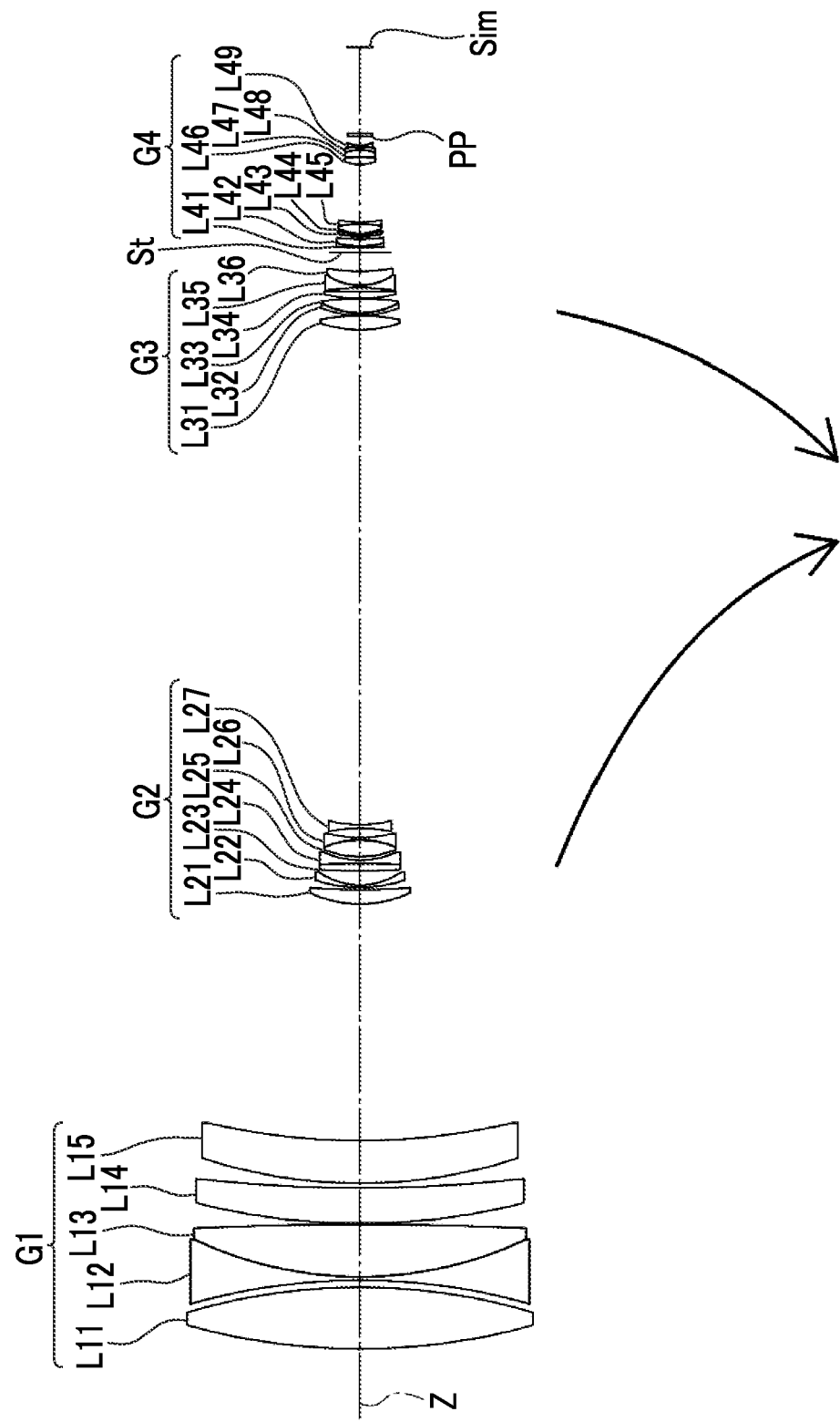
FIG. 10 is a cross-sectional view of a configuration of a variable magnification optical system of Example 5 of the present disclosure and a diagram illustrating a movement trajectory.
Figure 11:
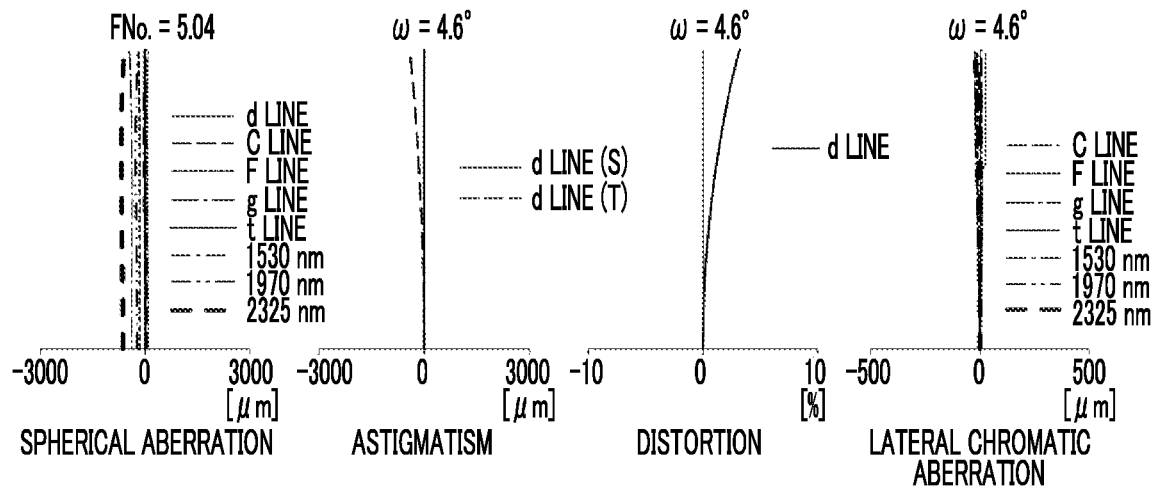
FIG. 11 is each aberration diagram of the variable magnification optical system of Example 5 of the present disclosure.
Figure 11:
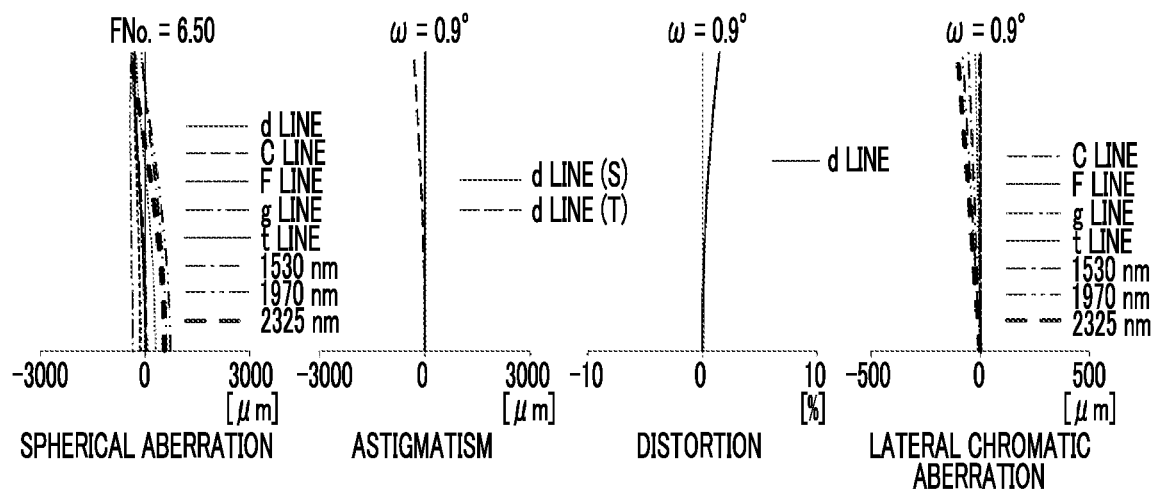
Figure 11:
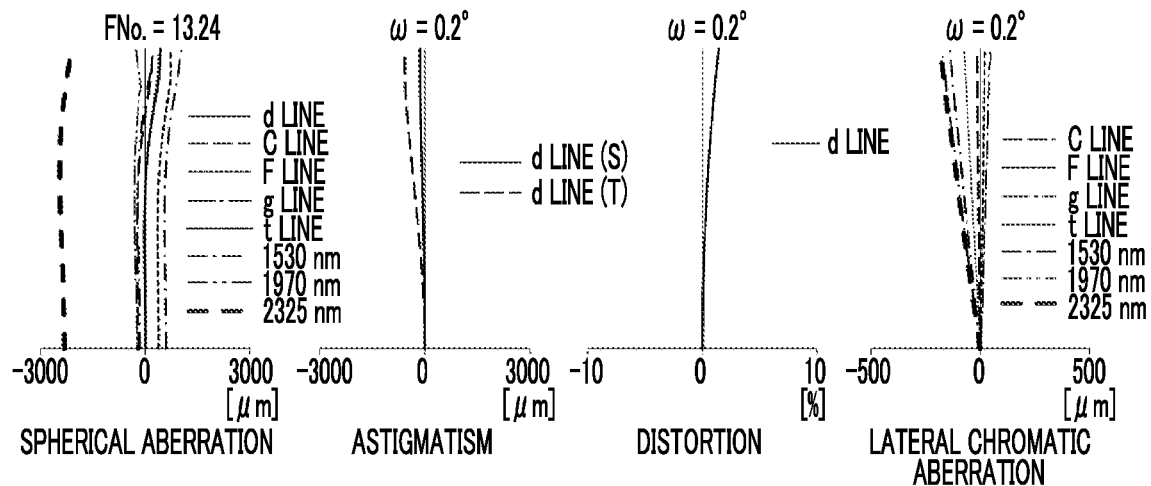

A configuration of a variable magnification optical system of Example 5 and a movement trajectory are illustrated in FIG. 10. The variable magnification optical system of Example 5 consists of, in order from the object side to the image side, the first lens group G1 having a positive refractive power, the second lens group G2 having a negative refractive power, the third lens group G3 having a positive refractive power, the aperture stop St, and the fourth lens group G4 having a negative refractive power. During zooming, the first lens group G1, the aperture stop St, and the fourth lens group G4 are fixed with respect to the image plane Sim, and the second lens group G2 and the third lens group G3 are moved along the optical axis Z by changing an interval between each other. The first lens group G1 consists of the lenses L11 to L15. The second lens group G2 consists of the lenses L21 to L27. The third lens group G3 consists of the lenses L31 to L36. The fourth lens group G4 consists of the lenses L41 to L49. For the variable magnification optical system of Example 5, basic lens data is shown in Table 17A and Table 17B, and specifications and a variable surface interval are shown in Table 18. Various data are shown in Table 19 and Table 20, and each aberration diagram is illustrated in FIG. 11. All materials shown in Table 17A and Table 17B are manufactured by OHARA INC.

TABLE 17A

Example 5

| Sn | R | D | nd | v | Material |
|---|---|---|---|---|---|
| 1 | 285.3397 | 26.0000 | 1.43875 | 94.94 | S-FPL53 |
| 2 | −271.1864 | 3.0000 | | | |
| 3 | −276.7274 | 1.5000 | 1.53996 | 59.46 | S-BAL12 |
| 4 | 173.0361 | 22.0000 | 1.43875 | 94.94 | S-FPL53 |
| 5 | −1754.0451 | 0.5000 | | | |
| 6 | 294.4781 | 15.0000 | 1.61800 | 63.33 | S-PHM52 |
| 7 | 640.1696 | 2.0000 | | | |
| 8 | 227.0029 | 18.0000 | 1.43875 | 94.94 | S-FPL53 |
| 9 | 295.0200 | DD[9] | | | |
| 10 | 53.1029 | 6.0000 | 1.77250 | 49.60 | S-LAH66 |
| 11 | 291.2663 | 1.0000 | | | |
| 12 | 63.3709 | 1.0000 | 1.51633 | 64.14 | S-BSL7 |
| 13 | 31.6812 | 6.0000 | | | |
| 14 | 279.0751 | 3.0000 | 1.92286 | 18.90 | S-NPH2 |
| 15 | −389.6594 | 1.5000 | 1.51742 | 52.43 | S-NSL36 |
| 16 | 38.3318 | 1.5000 | | | |
| 17 | 42.3385 | 7.0000 | 1.51633 | 64.14 | S-BSL7 |
| 18 | −41.9571 | 1.0000 | 1.49700 | 81.54 | S-FPL51 |
| 19 | 55.7579 | 4.0000 | | | |
| 20 | −65.3713 | 1.5000 | 1.88300 | 40.76 | S-LAH58 |
| 21 | 58.9574 | DD[21] | | | |
| 22 | 55.0159 | 6.0000 | 1.43875 | 94.94 | S-FPL53 |
| 23 | −90.8292 | 0.1202 | | | |
| 24 | 47.4574 | 1.0000 | 1.90366 | 31.34 | S-LAH95 |
| 25 | 34.9737 | 6.0000 | 1.43875 | 94.94 | S-FPL53 |
| 26 | −129.9230 | 0.1200 | | | |
| 27 | 68.7785 | 3.0000 | 1.69680 | 55.53 | S-LAL14 |
| 28 | 838.8993 | 1.5000 | | | |
| 29 | −99.2717 | 1.0000 | 1.69100 | 54.82 | S-LAL9 |
| 30 | 25.1557 | 6.0000 | 1.67003 | 47.23 | S-BAH10 |
| 31 | 76.5115 | DD[31] | | | |

TABLE 17B

Example 5

| Sn | R | D | nd | ν | Material |
|---|---|---|---|---|---|
| 32 (St) | ∞ | 2.1937 | | | |
| 33 | 232.5001 | 0.6000 | 1.88300 | 40.76 | S-LAH58 |
| 34 | 39.6194 | 3.0000 | 1.78470 | 26.29 | S-TIH23 |
| 35 | 103.5188 | 1.0000 | | | |
| 36 | 40.9441 | 0.8000 | 1.65160 | 58.55 | S-LAL7 |
| 37 | 29.8330 | 0.5000 | | | |
| 38 | 22.1999 | 4.0100 | 1.43875 | 94.94 | S-FPL53 |
| 39 | −52.2056 | 0.8000 | 1.77250 | 49.60 | S-LAH66 |
| 40 | 47.9704 | 24.4259 | | | |
| 41 | 22.0685 | 3.0000 | 1.67270 | 32.10 | S-TIM25 |
| 42 | −40.2132 | 0.1000 | | | |
| 43 | −99.3795 | 3.0000 | 1.48749 | 70.24 | S-FSL5 |
| 44 | −18.7907 | 1.0000 | 1.88300 | 40.76 | S-LAH58 |
| 45 | −57.0760 | 0.0200 | | | |
| 46 | 84.0523 | 0.8000 | 1.74100 | 52.64 | S-LAL61 |
| 47 | 12.1765 | 4.0486 | | | |
| 48 | ∞ | 1.2000 | 1.51633 | 64.14 | S-BSL7 |
| 49 | ∞ | 36.3965 | | | |

TABLE 18

Example 5

| | WIDE | MIDDLE | TELE |
|---|---|---|---|
| Zr | 1.0 | 5.5 | 30.0 |
| f | 65.0 | 355.8 | 1948.7 |
| FNo. | 5.04 | 6.50 | 13.24 |
| ω (°) | 4.6 | 0.9 | 0.2 |
| DD[9] | 99.5957 | 200.6130 | 241.8335 |
| DD[21] | 208.6796 | 87.2769 | 1.6880 |
| DD[31] | 7.8576 | 28.2431 | 72.6114 |

TABLE 19

Example 5

| | |
|---|---|
| TL | 548.9 |
| f1 | 401.4 |
| f2 | −41.9 |
| f3 | 56.9 |
| f4 | −38.7 |
| f31 | 79.1 |

TABLE 20

Example 5

| | |
|---|---|
| Bfd | 41.24 |
| Bf_1300 | 41.69 |
| Bf_1426 | 41.81 |
| Bf_1450 | 41.82 |
| Bf_1450 | 41.82 |
| Bf_1460 | 41.82 |
| Bf_1530 | 41.84 |
| Bf_1550 | 41.84 |
| Bf_1570 | 41.84 |
| Bf_1651 | 41.80 |
| Bf_1653 | 41.80 |
| Bf_1696 | 41.76 |
| Bf_1725 | 41.72 |
| Bf_1750 | 41.69 |
| Bf_1870 | 41.43 |
| Bf_1940 | 41.21 |
| Bf_1970 | 41.10 |
| Bf_2050 | 40.75 |
| Bf_2120 | 40.39 |
| Bf_2325 | 38.93 |

EXAMPLE 6

Figure 12:
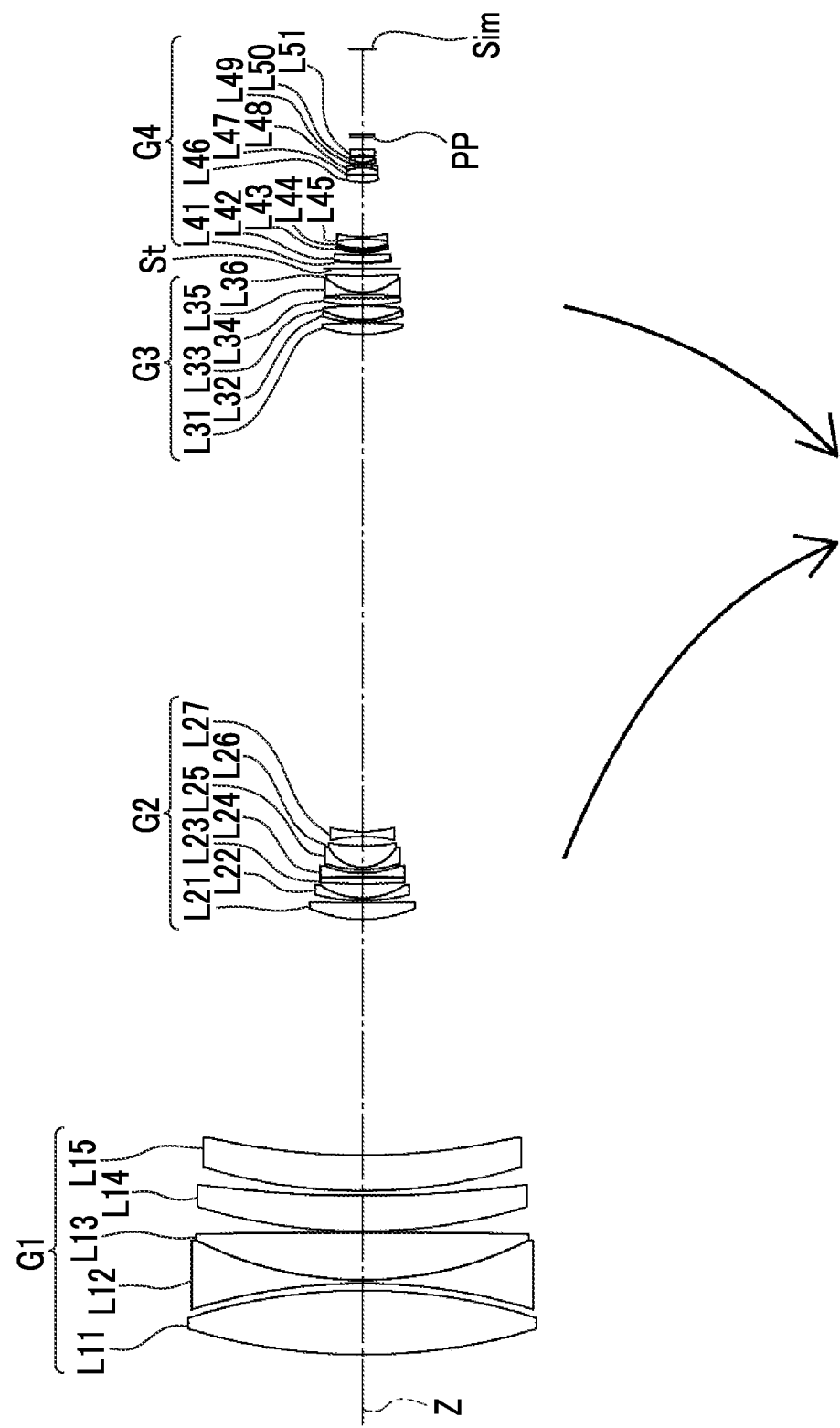
FIG. 12 is a cross-sectional view of a configuration of a variable magnification optical system of Example 6 of the present disclosure and a diagram illustrating a movement trajectory.
Figure 13:
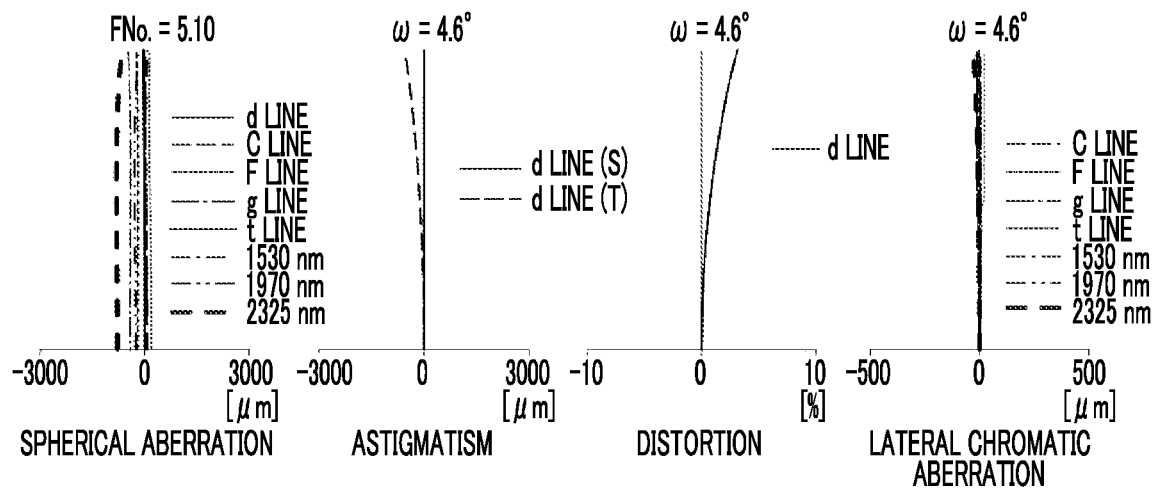
FIG. 13 is each aberration diagram of the variable magnification optical system of Example 6 of the present disclosure.
Figure 13:
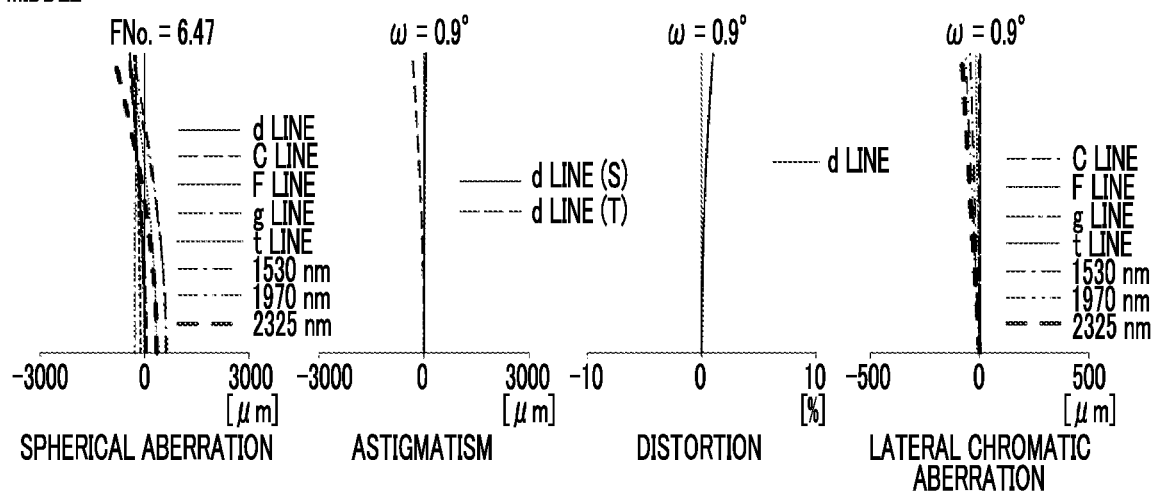
Figure 13:
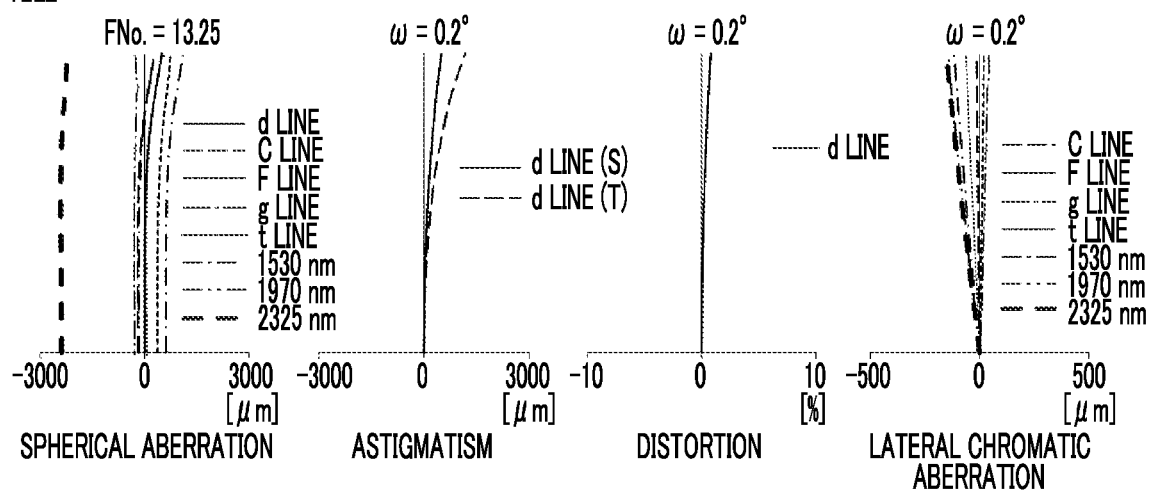

A configuration of a variable magnification optical system of Example 6 and a movement trajectory are illustrated in FIG. 12. The variable magnification optical system of Example 6 consists of, in order from the object side to the image side, the first lens group G1 having a positive refractive power, the second lens group G2 having a negative refractive power, the third lens group G3 having a positive refractive power, the aperture stop St, and the fourth lens group G4 having a negative refractive power. During zooming, the first lens group G1, the aperture stop St, and the fourth lens group G4 are fixed with respect to the image plane Sim, and the second lens group G2 and the third lens group G3 are moved along the optical axis Z by changing an interval between each other. The first lens group G1 consists of the lenses L11 to L15. The second lens group G2 consists of the lenses L21 to L27. The third lens group G3 consists of the lenses L31 to L36. The fourth lens group G4 consists of the lenses L41 to L51. For the variable magnification optical system of Example 6, basic lens data is shown in Table 21A and Table 21B, and specifications and a variable surface interval are shown in Table 22. Various data are shown in Table 23 and Table 24, and each aberration diagram is illustrated in FIG. 13. All materials shown in Table 21A and Table 21B are manufactured by OHARA INC.

TABLE 21A

Example 6

| Sn | R | D | nd | ν | Material |
|---|---|---|---|---|---|
| 1 | 264.5194 | 27.0000 | 1.43875 | 94.94 | S-FPL53 |
| 2 | −250.2853 | 3.0000 | | | |
| 3 | −251.6786 | 1.5000 | 1.53996 | 59.46 | S-BAL12 |
| 4 | 162.2748 | 20.0000 | 1.43875 | 94.94 | S-FPL53 |
| 5 | −3374.8099 | 0.5000 | | | |
| 6 | 249.7240 | 15.0000 | 1.61800 | 63.33 | S-PHM52 |
| 7 | 535.8382 | 2.0000 | | | |
| 8 | 238.1637 | 15.0000 | 1.43875 | 94.94 | S-FPL53 |
| 9 | 295.0791 | DD[9] | | | |
| 10 | 56.3269 | 7.0000 | 1.77250 | 49.60 | S-LAH66 |
| 11 | 1021.3101 | 1.0000 | | | |
| 12 | 85.3713 | 1.0000 | 1.51633 | 64.14 | S-BSL7 |
| 13 | 32.3783 | 6.0000 | | | |
| 14 | 295.7935 | 3.0000 | 1.92286 | 18.90 | S-NPH2 |
| 15 | −368.9432 | 1.5000 | 1.51742 | 52.43 | S-NSL36 |
| 16 | 43.5365 | 1.5000 | | | |
| 17 | 49.9417 | 1.0000 | 1.49700 | 81.54 | S-FPL51 |
| 18 | 16.6525 | 9.0000 | 1.51633 | 64.14 | S-BSL7 |
| 19 | 88.3843 | 4.0000 | | | |
| 20 | −55.1887 | 2.0000 | 1.88300 | 40.76 | S-LAH58 |
| 21 | 55.5032 | DD[21] | | | |
| 22 | 53.6069 | 4.8214 | 1.43875 | 94.94 | S-FPL53 |
| 23 | −209.3065 | 0.1202 | | | |
| 24 | 59.6751 | 1.0000 | 1.90366 | 31.34 | S-LAH95 |
| 25 | 35.4842 | 6.0000 | 1.43875 | 94.94 | S-FPL53 |
| 26 | −146.6139 | 0.1200 | | | |
| 27 | 75.1191 | 3.0000 | 1.69680 | 55.53 | S-LAL14 |
| 28 | 586.1434 | 1.5000 | | | |
| 29 | −190.2983 | 1.0000 | 1.69100 | 54.82 | S-LAL9 |
| 30 | 22.2260 | 7.0000 | 1.67003 | 47.23 | S-BAH10 |
| 31 | 303.6294 | DD[31] | | | |

TABLE 21B

Example 6

| Sn | R | D | nd | ν | Material |
|---|---|---|---|---|---|
| 32 (St) | ∞ | 2.1937 | | | |
| 33 | 91.4457 | 0.6000 | 1.88300 | 40.76 | S-LAH58 |
| 34 | 71.4219 | 3.0000 | 1.78470 | 26.29 | S-TIH23 |
| 35 | 167.9605 | 1.0000 | | | |
| 36 | 36.6878 | 0.8000 | 1.65160 | 58.55 | S-LAL7 |
| 37 | 31.0475 | 1.0000 | | | |
| 38 | 35.4957 | 4.0100 | 1.43875 | 94.94 | S-FPL53 |
| 39 | -53.9402 | 0.8000 | 1.77250 | 49.60 | S-LAH66 |
| 40 | 43.8164 | 23.0881 | | | |
| 41 | 26.3851 | 3.0000 | 1.67270 | 32.10 | S-TIM25 |
| 42 | -43.5851 | 0.1000 | | | |
| 43 | -193.9217 | 3.0000 | 1.48749 | 70.24 | S-FSL5 |
| 44 | -19.0747 | 1.0000 | 1.88300 | 40.76 | S-LAH58 |
| 45 | -50.1084 | 0.5000 | | | |
| 46 | 41.1985 | 0.8000 | 1.74100 | 52.64 | S-LAL61 |
| 47 | 11.4276 | 2.0000 | | | |
| 48 | -41.2045 | 0.8000 | 1.80400 | 46.53 | S-LAH65VS |
| 49 | -50.5723 | 2.5000 | 1.43875 | 94.94 | S-FPL53 |
| 50 | -495.6157 | 5.0000 | | | |
| 51 | ∞ | 1.2000 | 1.51633 | 64.14 | S-BSL7 |
| 52 | ∞ | 36.1575 | | | |

TABLE 22

Example 6

| | WIDE | MIDDLE | TELE |
|---|---|---|---|
| Zr | 1.0 | 5.5 | 30.0 |
| f | 65.2 | 357.2 | 1956.8 |
| FNo. | 5.10 | 6.47 | 13.25 |
| ω (°) | 4.6 | 0.9 | 0.2 |
| DD[9] | 98.9661 | 199.3827 | 240.0178 |
| DD[21] | 209.1510 | 87.6268 | 1.6258 |
| DD[31] | 3.0347 | 24.1423 | 69.5083 |

TABLE 23

Example 6

| TL | 548.9 |
|---|---|
| f1 | 400.8 |
| f2 | -41.0 |
| f3 | 58.7 |
| f4 | -37.2 |
| f31 | 97.8 |

TABLE 24

Example 6

| Bfd | 41.95 |
|---|---|
| Bf_1300 | 42.43 |
| Bf_1426 | 42.54 |
| Bf_1450 | 42.55 |
| Bf_1450 | 42.55 |
| Bf_1460 | 42.56 |
| Bf_1530 | 42.58 |
| Bf_1550 | 42.57 |
| Bf_1570 | 42.57 |
| Bf_1651 | 42.53 |
| Bf_1653 | 42.53 |
| Bf_1696 | 42.48 |
| Bf_1725 | 42.44 |
| Bf_1750 | 42.41 |
| Bf_1870 | 42.14 |
| Bf_1940 | 41.91 |
| Bf_1970 | 41.80 |
| Bf_2050 | 41.44 |

TABLE 24-continued

Example 6

| Bf_2120 | 41.07 |
|---|---|
| Bf_2325 | 39.57 |

EXAMPLE 7

Figure 14:
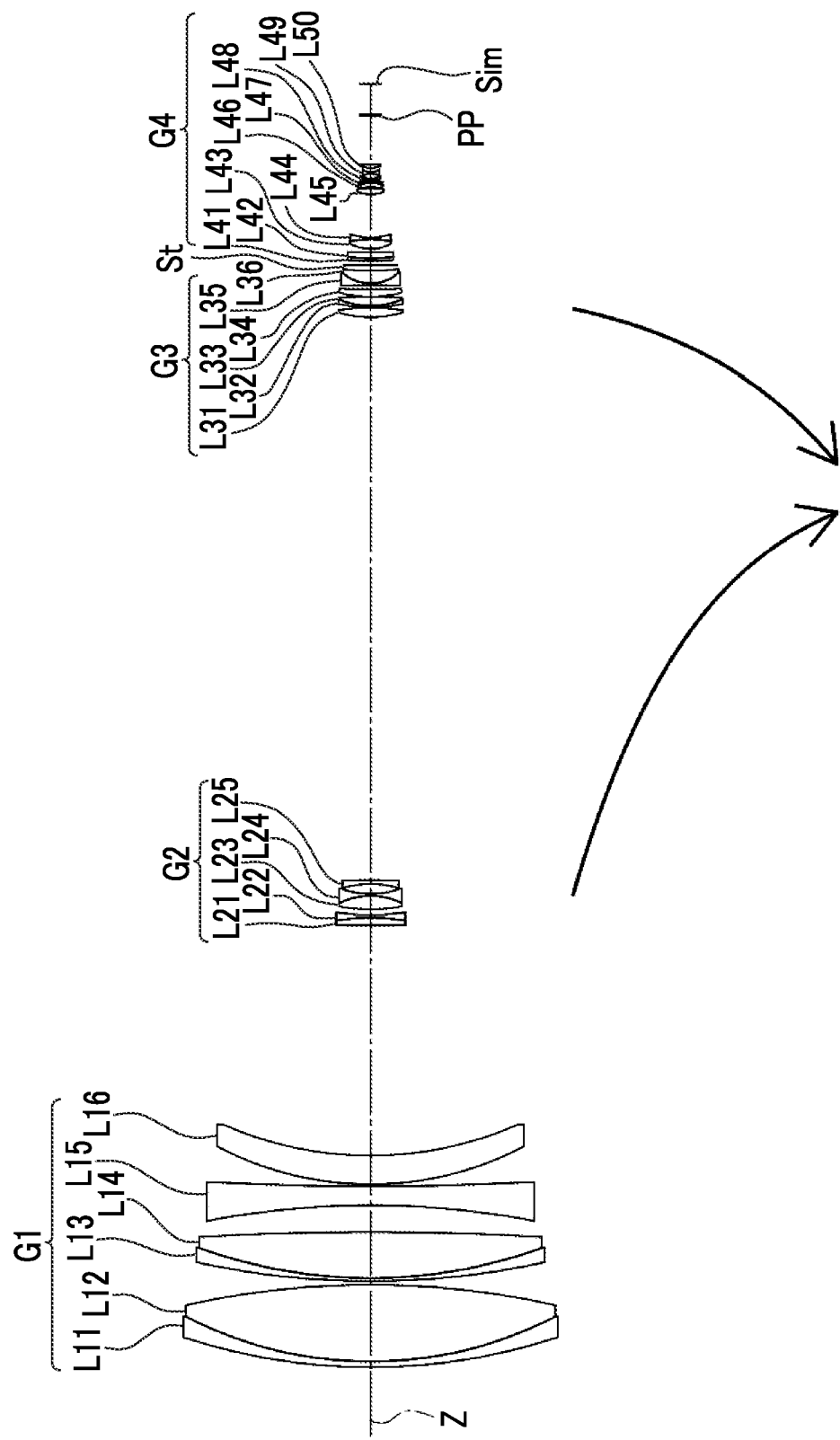
FIG. 14 is a cross-sectional view of a configuration of a variable magnification optical system of Example 7 of the present disclosure and a diagram illustrating a movement trajectory.
Figure 15:
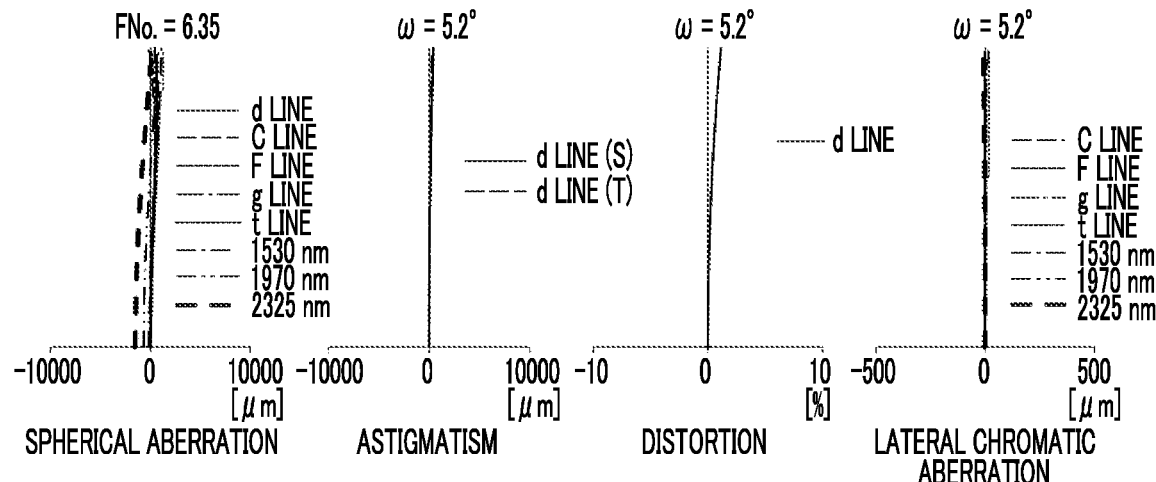
FIG. 15 is each aberration diagram of the variable magnification optical system of Example 7 of the present disclosure.
Figure 15:
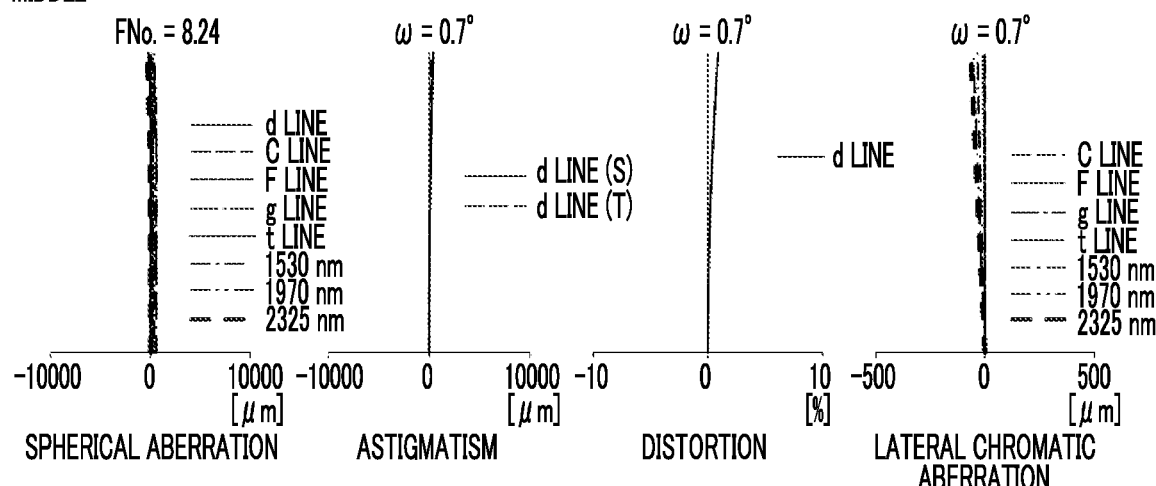
Figure 15:
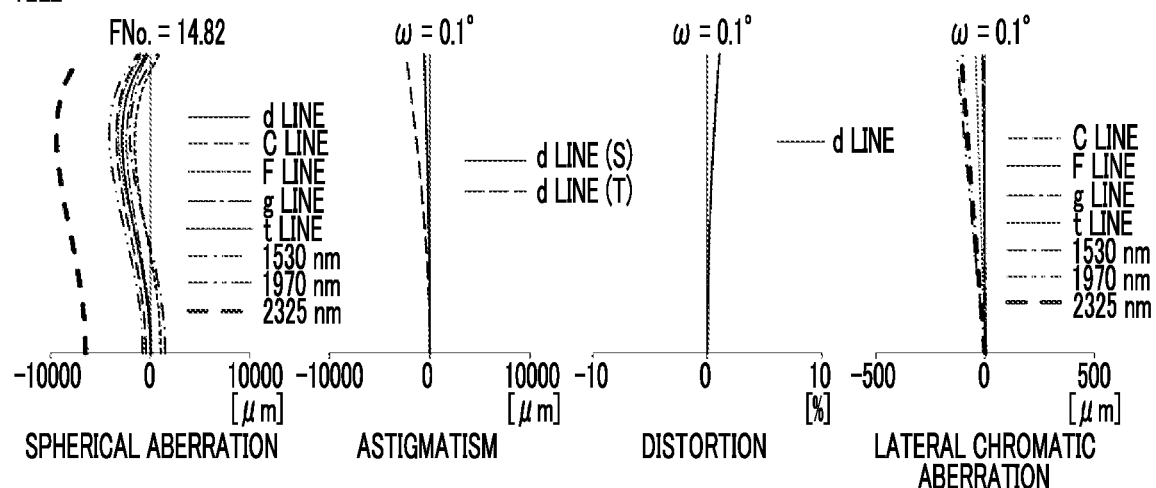

A configuration of a variable magnification optical system of Example 7 and a movement trajectory are illustrated in FIG. 14. The variable magnification optical system of Example 7 consists of, in order from the object side to the image side, the first lens group G1 having a positive refractive power, the second lens group G2 having a negative refractive power, the third lens group G3 having a positive refractive power, the aperture stop St, and the fourth lens group G4 having a negative refractive power. During zooming, the first lens group G1, the aperture stop St, and the fourth lens group G4 are fixed with respect to the image plane Sim, and the second lens group G2 and the third lens group G3 are moved along the optical axis Z by changing an interval between each other. The first lens group G1 consists of the lenses L11 to L16. The second lens group G2 consists of the lenses L21 to L25. The third lens group G3 consists of the lenses L31 to L36. The fourth lens group G4 consists of the lenses L41 to L50. For the variable magnification optical system of Example 7, basic lens data is shown in Table 25A and Table 25B, and specifications and a variable surface interval are shown in Table 26. Various data are shown in Table 27 and Table 28, and each aberration diagram is illustrated in FIG. 15. All materials shown in Table 25A and Table 25B are manufactured by OHARA INC.

TABLE 25A

Example 7

| Sn | R | D | nd | ν | Material |
|---|---|---|---|---|---|
| 1 | 327.7181 | 3.0000 | 1.51633 | 64.14 | S-BSL7 |
| 2 | 219.9715 | 40.0000 | 1.43875 | 94.94 | S-FPL53 |
| 3 | -461.8678 | 2.0000 | | | |
| 4 | 449.0015 | 1.5000 | 1.51633 | 64.14 | S-BSL7 |
| 5 | 272.6623 | 24.0000 | 1.43875 | 94.94 | S-FPL53 |
| 6 | -1642.4371 | 14.0000 | | | |
| 7 | -469.8335 | 10.0000 | 1.67003 | 47.23 | S-BAH10 |
| 8 | 1686.1997 | 1.0000 | | | |
| 9 | 179.5434 | 15.0000 | 1.43875 | 94.94 | S-FPL53 |
| 10 | 199.7426 | DD[10] | | | |
| 11 | 631.0258 | 4.0000 | 1.92286 | 18.90 | S-NPH2 |
| 12 | -116.7586 | 1.5000 | 1.51823 | 58.90 | S-NSL3 |
| 13 | 103.3786 | 3.0000 | | | |
| 14 | 92.3565 | 7.0000 | 1.51633 | 64.14 | S-BSL7 |
| 15 | -37.9424 | 1.0000 | 1.49700 | 81.54 | S-FPL51 |
| 16 | 43.2698 | 5.2000 | | | |
| 17 | -49.2412 | 2.0000 | 1.89190 | 37.13 | S-LAH92 |
| 18 | -1735.8345 | DD[18] | | | |
| 19 | 68.1253 | 4.8214 | 1.43875 | 94.94 | S-FPL53 |
| 20 | -112.7072 | 0.1202 | | | |
| 21 | 74.8115 | 1.0000 | 1.90366 | 31.34 | S-LAH95 |
| 22 | 44.7331 | 4.5000 | 1.43875 | 94.94 | S-FPL53 |
| 23 | -298.7315 | 0.1200 | | | |
| 24 | 64.6328 | 4.0000 | 1.69680 | 55.53 | S-LAL14 |
| 25 | 786.5504 | 2.0000 | | | |
| 26 | -445.4631 | 1.0000 | 1.71300 | 53.87 | S-LAL8 |
| 27 | 22.4752 | 6.5000 | 1.65844 | 50.88 | S-BSM25 |
| 28 | 102.3007 | DD[28] | | | |

TABLE 25B

Example 7

| Sn | R | D | nd | ν | Material |
|---|---|---|---|---|---|
| 29 (St) | ∞ | 2.1937 | | | |
| 30 | 140.9985 | 1.5000 | 1.88300 | 40.76 | S-LAH58 |
| 31 | 94.3166 | 3.0000 | 1.80000 | 29.84 | S-NBH55 |
| 32 | 284.3480 | 1.8000 | | | |
| 33 | 22.1963 | 5.0100 | 1.43875 | 94.94 | S-FPL53 |
| 34 | −60.7235 | 0.8000 | 1.72916 | 54.68 | S-LAL18 |
| 35 | 28.1470 | 22.8200 | | | |
| 36 | 24.5569 | 3.0293 | 1.67270 | 32.10 | S-TIM25 |
| 37 | −47.5999 | 0.5000 | | | |
| 38 | −74.5114 | 2.5000 | 1.48749 | 70.24 | S-FSL5 |
| 39 | −14.5296 | 1.0000 | 1.88300 | 40.76 | S-LAH58 |
| 40 | −22.6725 | 0.2000 | | | |
| 41 | 17.1057 | 0.8000 | 1.72916 | 54.68 | S-LAL18 |
| 42 | 7.7230 | 2.5000 | | | |
| 43 | −12.0452 | 1.0000 | 1.43875 | 94.94 | S-FPL53 |
| 44 | 10.1743 | 2.0000 | | | |
| 45 | 12.6862 | 2.0000 | 1.43875 | 94.94 | S-FPL53 |
| 46 | −91.2525 | 25.0000 | | | |
| 47 | ∞ | 1.2000 | 1.51633 | 64.14 | S-BSL7 |
| 48 | ∞ | 15.7567 | | | |

TABLE 26

Example 7

| | WIDE | MIDDLE | TELE |
|---|---|---|---|
| Zr | 1.0 | 7.1 | 50.0 |
| f | 58.9 | 416.5 | 2945.0 |
| FNo. | 6.35 | 8.24 | 14.82 |
| ω (°) | 5.2 | 0.7 | 0.1 |
| DD[10] | 119.5806 | 273.1604 | 327.0120 |
| DD[18] | 293.5368 | 115.0081 | 2.2805 |
| DD[28] | 2.9992 | 27.9481 | 86.8241 |

TABLE 27

Example 7

| TL | 668.6 |
|---|---|
| f1 | 515.3 |
| f2 | −44.5 |
| f3 | 68.7 |
| f4 | −31.5 |
| f31 | 97.6 |

TABLE 28

Example 7

| Bfd | 41.55 |
|---|---|
| Bf_1300 | 42.73 |
| Bf_1426 | 43.00 |
| Bf_1450 | 43.02 |
| Bf_1450 | 43.02 |
| Bf_1460 | 43.03 |
| Bf_1530 | 43.05 |
| Bf_1550 | 43.04 |
| Bf_1570 | 43.02 |
| Bf_1651 | 42.88 |
| Bf_1653 | 42.87 |
| Bf_1696 | 42.74 |
| Bf_1725 | 42.62 |
| Bf_1750 | 42.50 |
| Bf_1870 | 41.73 |
| Bf_1940 | 41.10 |
| Bf_1970 | 40.79 |
| Bf_2050 | 39.83 |

TABLE 28-continued

Example 7

| Bf_2120 | 38.83 |
|---|---|
| Bf_2325 | 35.07 |

EXAMPLE 8

Figure 16:
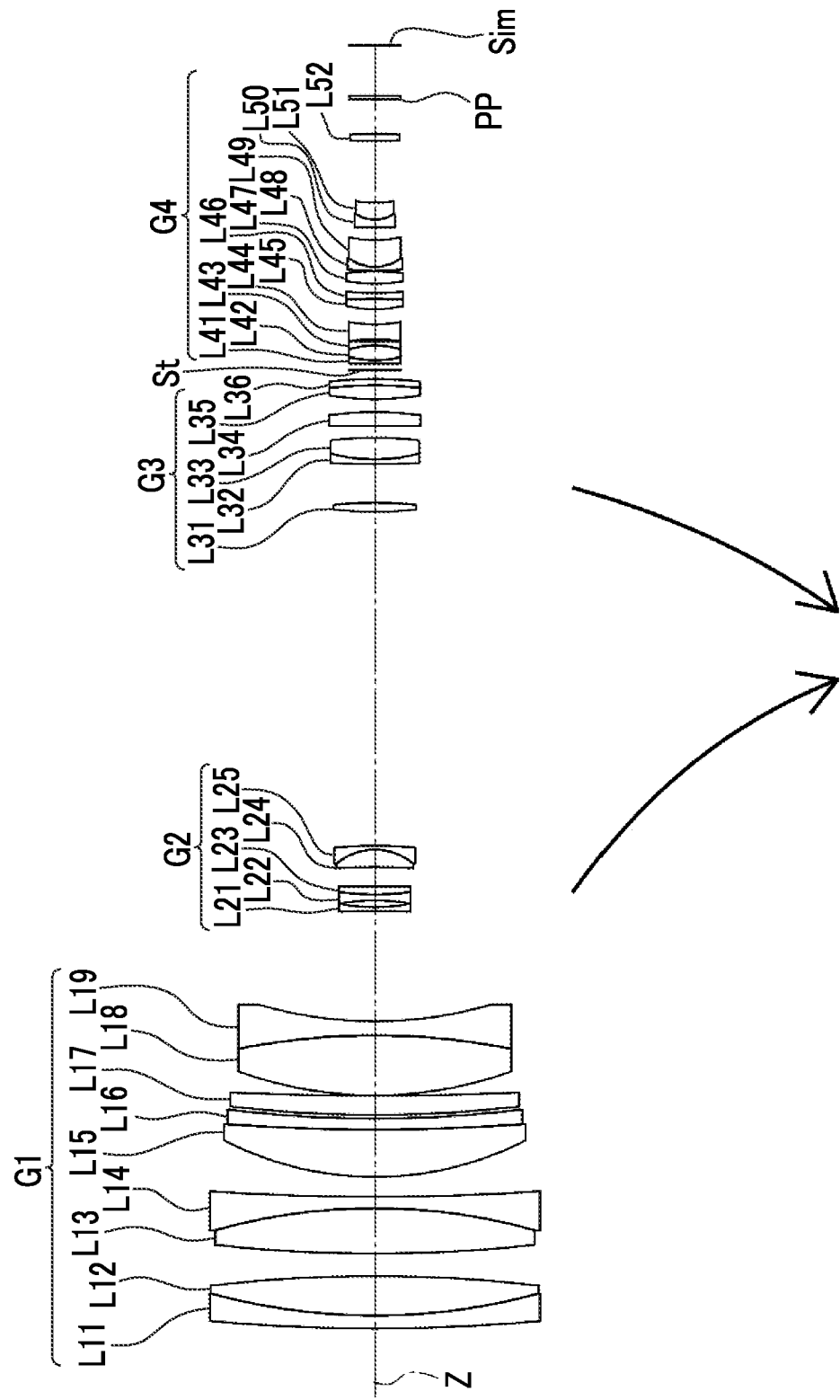
FIG. 16 is a cross-sectional view of a configuration of a variable magnification optical system of Example 8 of the present disclosure and a diagram illustrating a movement trajectory.
Figure 17:
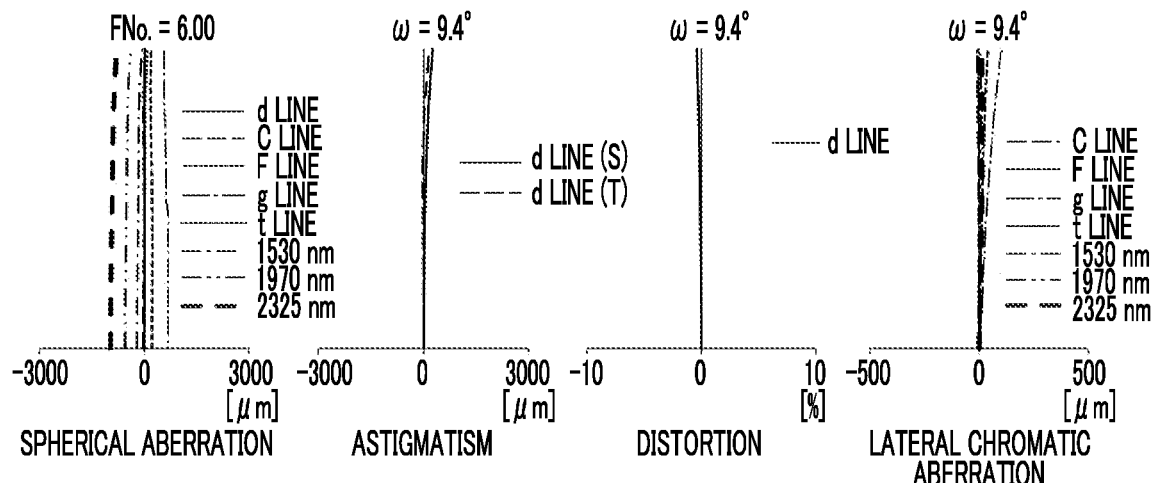
FIG. 17 is each aberration diagram of the variable magnification optical system of Example 8 of the present disclosure.
Figure 17:
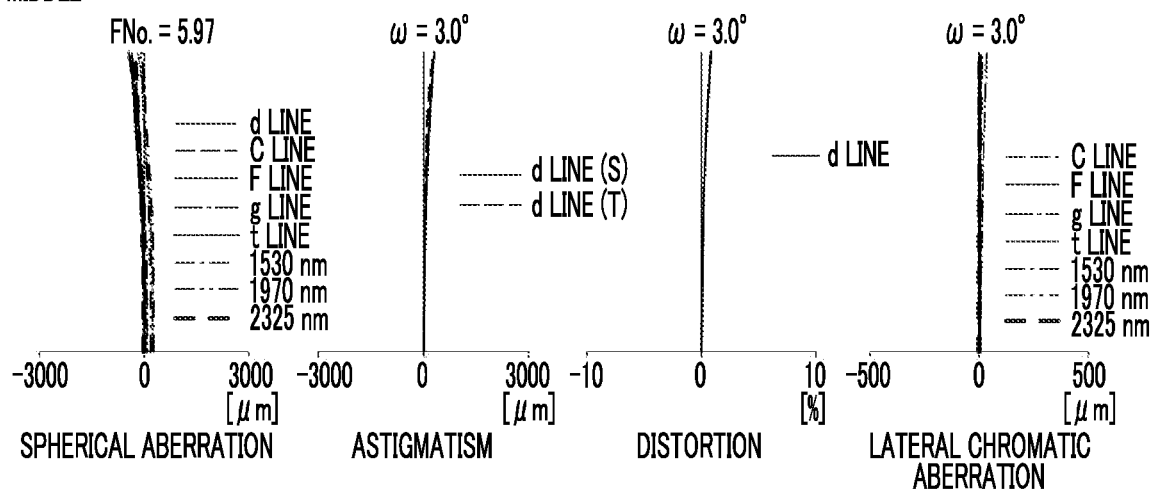
Figure 17:
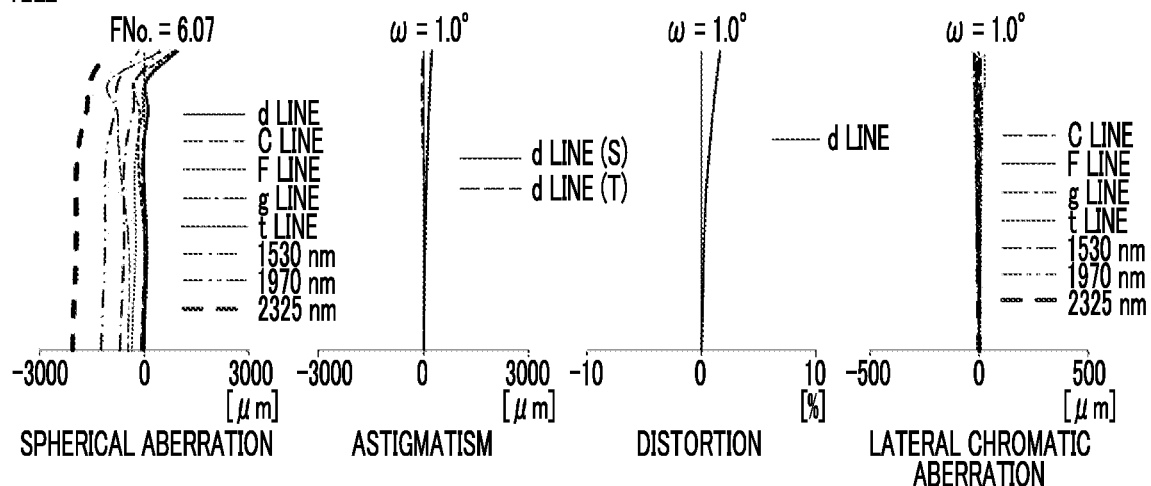

A configuration of a variable magnification optical system of Example 8 and a movement trajectory are illustrated in FIG. 16. The variable magnification optical system of Example 8 consists of, in order from the object side to the image side, the first lens group G1 having a positive refractive power, the second lens group G2 having a negative refractive power, the third lens group G3 having a positive refractive power, the aperture stop St, and the fourth lens group G4 having a negative refractive power. During zooming, the first lens group G1, the aperture stop St, and the fourth lens group G4 are fixed with respect to the image plane Sim, and the second lens group G2 and the third lens group G3 are moved along the optical axis Z by changing an interval between each other. The first lens group G1 consists of lenses L11 to L19. The second lens group G2 consists of the lenses L21 to L25. The third lens group G3 consists of the lenses L31 to L36. The fourth lens group G4 consists of lenses L41 to L52. The variable magnification optical system of Example 8 has an aspherical surface. For the variable magnification optical system of Example 8, basic lens data is shown in Table 29A and Table 29B, and specifications and a variable surface interval are shown in Table 30. Various data are shown in Table 31 and Table 32, and aspherical coefficients are shown in Table 33. Each aberration diagram is illustrated in FIG. 17. All materials shown in Table 29A and Table 29B are manufactured by OHARA INC.

In the table of the basic lens data, a mark * is added to a surface number of the aspherical surface, and a numerical value of a paraxial radius of curvature is written in the field of a radius of curvature of the aspherical surface. In the table of the aspherical coefficient, the field of Sn shows the surface number of the aspherical surface, and fields of KA and Am (m=3, 4, 5, . . . 20) show numerical values of the aspherical coefficient for each aspherical surface. In the numerical value of the aspherical coefficient in Table 33, "E±n" (n: integer) means "×10$^{±n}$". KA and Am are aspherical coefficients in an aspherical expression represented by the following expression.

$$Zd = C \times h^2 / \{1 + (1 - KA \times C^2 \times h^2)^{1/2}\} + \Sigma Am \times h^m$$

where

Zd: aspherical depth (length of perpendicular line drawn from point on aspherical surface at height h to plane that passes through apex of aspherical surface and is perpendicular to optical axis)

h: height (distance from optical axis to lens surface)

C: reciprocal of paraxial radius of curvature

KA, Am: aspherical coefficient

In the aspherical expression, Σ means a total sum related to m. The above writing method related to the aspherical surface is the same in the following examples having aspherical surfaces.

TABLE 29A

Example 8

| Sn | R | D | nd | v | Material |
|---|---|---|---|---|---|
| 1 | 608.0344 | 4.0782 | 1.48749 | 70.24 | S-FSL5 |
| 2 | 206.2500 | 12.4482 | 1.43875 | 94.66 | S-FPL55 |
| 3 | −470.1050 | 7.1152 | | | |
| 4 | 484.6132 | 14.3062 | 1.43875 | 94.66 | S-FPL55 |
| 5 | −197.6232 | 3.6366 | 1.51633 | 64.14 | S-BSL7 |
| 6 | 820.8117 | 6.2716 | | | |
| 7 | 108.8304 | 14.9387 | 1.43875 | 94.66 | S-FPL55 |
| 8 | 665.1004 | 3.5050 | 1.92286 | 18.90 | S-NPH2 |
| 9 | 400.2462 | 1.1648 | | | |
| 10 | 415.0120 | 6.0443 | 1.54814 | 45.78 | S-TIL1 |
| 11 | 1014.1944 | 0.1200 | | | |
| 12 | 133.2757 | 18.6552 | 1.49700 | 81.54 | S-FPL51 |
| 13 | −229.6380 | 4.4585 | 1.53775 | 74.70 | S-FPM3 |
| 14 | 138.8571 | DD[14] | | | |
| *15 | −249.5451 | 1.2091 | 1.95375 | 32.32 | S-LAH98 |
| 16 | 61.9174 | 2.1546 | | | |
| 17 | −65.3189 | 1.8364 | 1.95375 | 32.32 | S-LAH98 |
| 18 | 77.4214 | 2.4858 | 1.80518 | 25.42 | S-TIH6 |
| 19 | 2823.3303 | 6.1492 | | | |
| 20 | −234.7929 | 5.5582 | 1.85896 | 22.73 | S-NPH5 |
| 21 | −19.8177 | 1.2733 | 1.89190 | 37.13 | S-LAH92 |
| 22 | −129.8830 | DD[22] | | | |
| *23 | 112.5168 | 2.9296 | 1.49700 | 81.54 | S-FPL51 |
| 24 | −132.5374 | 12.1681 | | | |
| 25 | 264.7784 | 1.4983 | 1.80518 | 25.42 | S-TIH6 |
| 26 | 56.1658 | 6.8372 | 1.43875 | 94.66 | S-FPL55 |
| 27 | −117.6463 | 3.8124 | | | |
| *28 | −2726.8215 | 4.2521 | 1.49700 | 81.54 | S-FPL51 |
| *29 | −118.2343 | 4.1350 | | | |
| 30 | 92.3756 | 4.2793 | 1.43875 | 94.66 | S-FPL55 |
| 31 | −166.5478 | 2.0895 | 1.96300 | 24.11 | S-TIH57 |
| 32 | −125.2623 | DD[32] | | | |

TABLE 29B

Example 8

| Sn | R | D | nd | v | Material |
|---|---|---|---|---|---|
| 33 (St) | ∞ | 2.0819 | | | |
| 34 | −1340.1396 | 1.2002 | 1.48749 | 70.24 | S-FSL5 |
| 35 | 46.1665 | 4.3082 | 1.51742 | 52.43 | S-NSL36 |
| 36 | −28.4676 | 1.2000 | 1.65100 | 56.24 | S-LAL54Q |
| 37 | 375.2211 | 0.8333 | | | |
| 38 | −55.9944 | 4.5696 | 1.48749 | 70.24 | S-FSL5 |
| 39 | 43.8130 | 4.8035 | | | |
| 40 | 39.8177 | 3.2659 | 1.83400 | 37.21 | S-LAH60V |
| 41 | −409.0846 | 1.8565 | 1.73800 | 32.33 | S-NBH53V |
| 42 | 88.6884 | 2.9906 | | | |
| 43 | 59.9658 | 3.8823 | 1.67300 | 38.26 | S-NBH52V |
| 44 | −78.7700 | 0.1720 | | | |
| 45 | 91.1044 | 1.2404 | 1.48749 | 70.24 | S-FSL5 |
| 46 | 14.3937 | 8.4910 | 1.64769 | 33.79 | S-TIM22 |
| 47 | 43.4392 | 3.9464 | | | |
| 48 | 1177.6843 | 2.5069 | 1.89286 | 20.36 | S-NPH4 |
| 49 | 11.3614 | 5.3491 | 1.53775 | 74.70 | S-FPM3 |
| 50 | 43.8795 | 19.4869 | | | |
| 51 | 251.6672 | 2.1917 | 1.89286 | 20.36 | S-NPH4 |
| 52 | −149.7461 | 11.0215 | | | |
| 53 | ∞ | 1.0000 | 1.51633 | 64.14 | S-BSL7 |
| 54 | ∞ | 16.0149 | | | |

TABLE 30

Example 8

| | WIDE | MIDDLE | TELE |
|---|---|---|---|
| Zr | 1.0 | 3.1 | 9.7 |
| f | 50.7 | 157.9 | 492.0 |
| FNo. | 6.00 | 5.97 | 6.07 |
| ω (°) | 9.4 | 3.0 | 1.0 |
| DD[14] | 34.7767 | 78.1325 | 101.1073 |
| DD[22] | 105.3581 | 47.1239 | 0.4124 |
| DD[321] | 2.7005 | 17.5790 | 41.3157 |

TABLE 31

Example 8

| | |
|---|---|
| TL | 404.3 |
| f1 | 211.5 |
| f2 | −29.5 |
| f3 | 54.8 |
| f4 | −102.3 |
| f31 | 122.9 |

TABLE 32

Example 8

| | |
|---|---|
| Bfd | 27.70 |
| Bf_1300 | 27.17 |
| Bf_1426 | 27.09 |
| Bf_1450 | 27.08 |
| Bf_1450 | 27.08 |
| Bf_1460 | 27.07 |
| Bf_1530 | 27.01 |
| Bf_1550 | 27.00 |
| Bf_1570 | 26.98 |
| Bf_1651 | 26.90 |
| Bf_1653 | 26.90 |
| Bf_1696 | 26.86 |
| Bf_1725 | 26.82 |
| Bf_1750 | 26.79 |
| Bf_1870 | 26.63 |
| Bf_1940 | 26.52 |
| Bf_1970 | 26.47 |
| Bf_2050 | 26.32 |
| Bf_2120 | 26.18 |
| Bf_2325 | 25.65 |

TABLE 33

Example 8

| Sn | 15 | 23 | 28 | 29 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 5.0980967E−07 | −3.6254106E−07 | 2.7620064E−08 | 4.0035834E−08 |

TABLE 33-continued

Example 8

| Sn | 15 | 23 | 28 | 29 |
|---|---|---|---|---|
| A5 | 3.9354495E−08 | 2.6623449E−08 | 3.3526579E−09 | 1.5772142E−09 |
| A6 | 1.0412285E−09 | −2.2257738E−09 | 7.4784262E−11 | −1.7344856E−11 |
| A7 | −1.9997382E−10 | −3.3960366E−11 | 8.4531316E−12 | −5.0345885E−12 |
| A8 | −9.4648998E−12 | 2.4268412E−11 | −9.7518030E−14 | −1.7312973E−13 |
| A9 | −2.5972049E−13 | −7.3961321E−13 | −1.5074665E−15 | −2.8389625E−14 |
| A10 | 2.4539895E−14 | −1.9870087E−13 | −3.2432776E−15 | −1.3449759E−15 |
| A11 | −1.6904717E−15 | 1.4336488E−14 | 3.9350245E−18 | −4.4415276E−17 |
| A12 | 1.3807177E−16 | −4.0413029E−16 | −1.8218984E−18 | 4.7709027E−18 |
| A13 | 8.3359638E−18 | −5.2764647E−17 | 2.8708095E−19 | −1.1006639E−18 |
| A14 | 3.1707623E−18 | 3.3780403E−18 | −2.9820760E−21 | 2.7403645E−20 |
| A15 | 1.0306301E−19 | 2.9926023E−19 | −1.9442888E−22 | 8.1467527E−22 |
| A16 | 1.0230861E−21 | −2.4625367E−21 | 4.9252408E−23 | 9.3189571E−23 |
| A17 | 4.7576761E−22 | −5.1499025E−22 | 2.9501141E−24 | −1.2920571E−23 |
| A18 | −6.2958213E−23 | 2.1118404E−24 | 3.9341402E−25 | −2.9772750E−25 |
| A19 | −5.1708229E−24 | 1.3211718E−24 | −4.5746494E−26 | 4.0466074E−26 |
| A20 | −2.2723346E−25 | −2.4251436E−25 | −4.5071150E−27 | 2.0372667E−27 |

EXAMPLE 9

Figure 18:
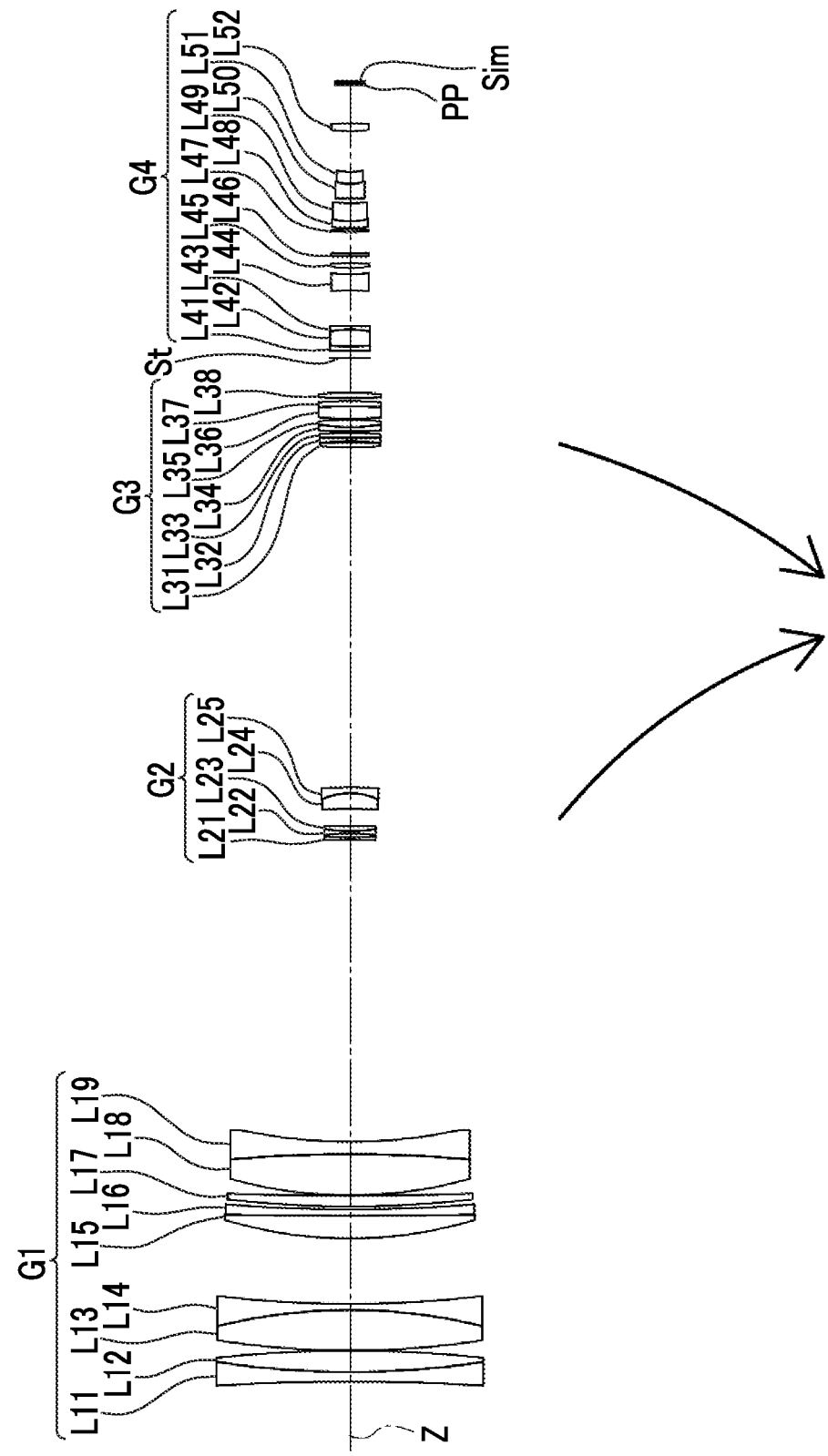
FIG. 18 is a cross-sectional view of a configuration of a variable magnification optical system of Example 9 of the present disclosure and a diagram illustrating a movement trajectory.
Figure 19:
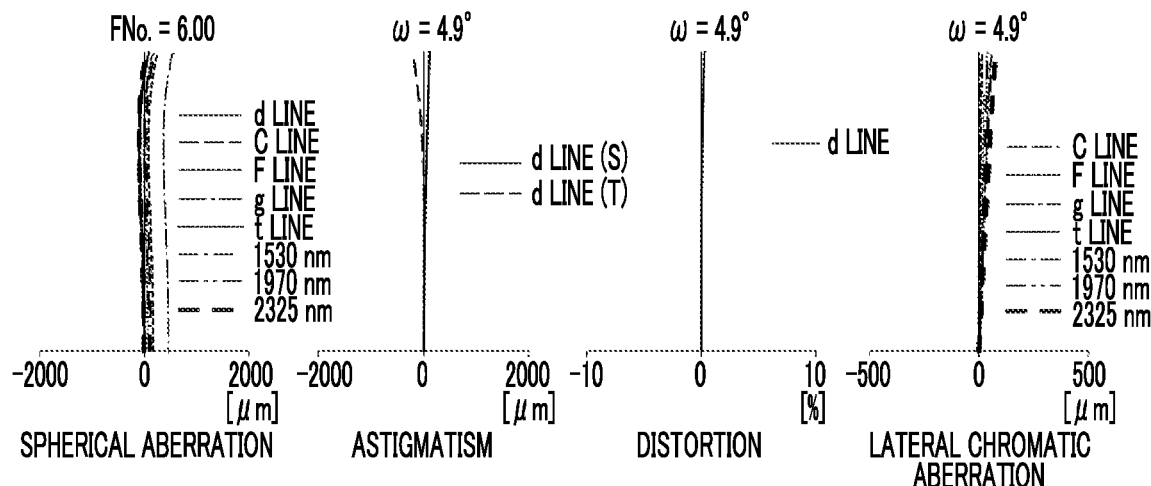
FIG. 19 is each aberration diagram of the variable magnification optical system of Example 9 of the present disclosure.
Figure 19:
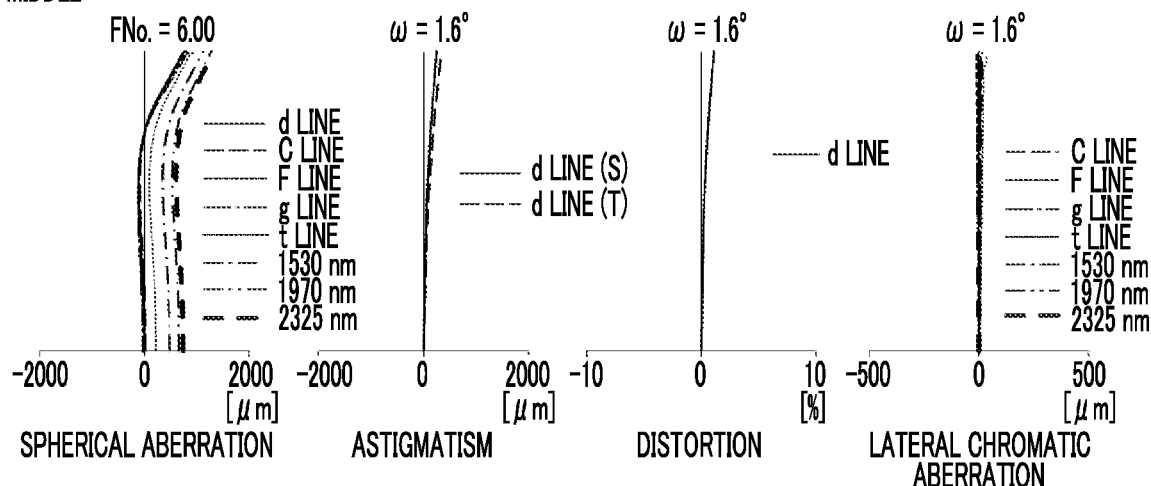
Figure 19:
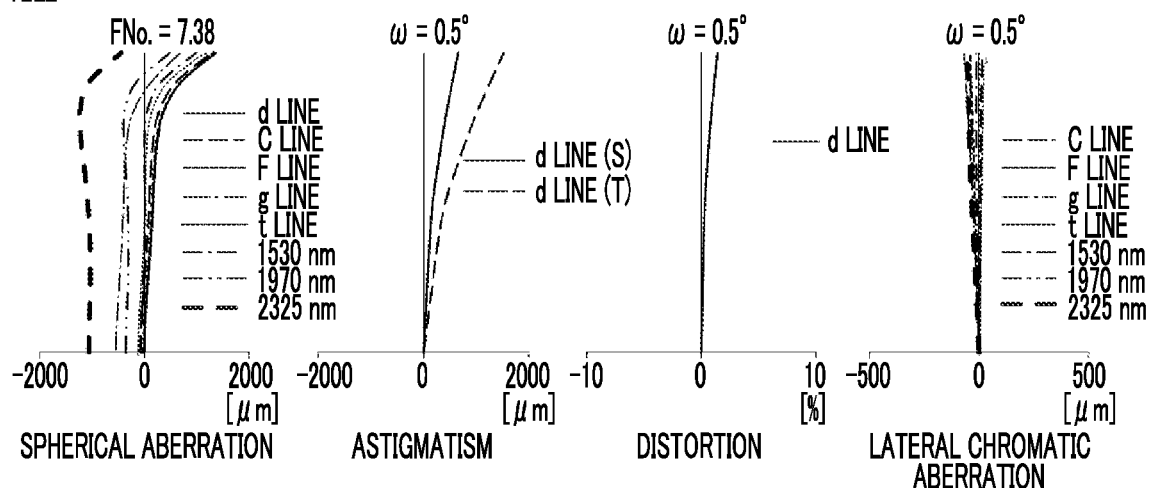

A configuration of a variable magnification optical system of Example 9 and a movement trajectory are illustrated in FIG. 18. The variable magnification optical system of Example 9 consists of, in order from the object side to the image side, the first lens group G1 having a positive refractive power, the second lens group G2 having a negative refractive power, the third lens group G3 having a positive refractive power, the aperture stop St, and the fourth lens group G4 having a positive refractive power. During zooming, the first lens group G1, the aperture stop St, and the fourth lens group G4 are fixed with respect to the image plane Sim, and the second lens group G2 and the third lens group G3 are moved along the optical axis Z by changing an interval between each other. The first lens group G1 consists of the lenses L11 to L19. The second lens group G2 consists of the lenses L21 to L25. The third lens group G3 consists of lenses L31 to L38. The fourth lens group G4 consists of the lenses L41 to L52. For the variable magnification optical system of Example 9, basic lens data is shown in Table 34A and Table 34B, and specifications and a variable surface interval are shown in Table 35. Various data are shown in Table 36 and Table 37, and aspherical coefficients are shown in Table 38. Each aberration diagram is illustrated in FIG. 19. All materials shown in Table 34A and Table 34B are manufactured by OHARA INC.

TABLE 34A

Example 9

| Sn | R | D | nd | ν | Material |
|---|---|---|---|---|---|
| 1 | −1299.9288 | 5.4651 | 1.51823 | 58.90 | S-NSL3 |
| 2 | 520.2595 | 12.1240 | 1.61800 | 63.33 | S-PHM52 |
| 3 | −742.7481 | 0.1202 | | | |
| 4 | 519.4882 | 23.0365 | 1.43875 | 94.66 | S-FPL55 |
| 5 | −326.6357 | 3.5001 | 1.48749 | 70.24 | S-FSL5 |
| 6 | 672.4794 | 37.2054 | | | |
| 7 | 254.9073 | 13.0281 | 1.43875 | 94.66 | S-FPL55 |
| 8 | 5040.7140 | 3.5006 | 1.80518 | 25.42 | S-TIH6 |
| 9 | 892.7001 | 1.7076 | | | |
| 10 | 635.6594 | 6.1193 | 1.51633 | 64.14 | S-BSL7 |
| 11 | 2165.8524 | 0.2400 | | | |
| 12 | 265.3663 | 23.3458 | 1.49700 | 81.54 | S-FPL51 |
| 13 | −810.9531 | 7.1048 | 1.53775 | 74.70 | S-FPM3 |
| 14 | 307.0444 | DD[14] | | | |
| *15 | −429.2186 | 1.2002 | 1.85400 | 40.38 | L-LAH85V |
| 16 | 129.9770 | 2.3109 | | | |
| 17 | −121.6688 | 1.4913 | 1.95375 | 32.32 | S-LAH98 |
| 18 | 100.1965 | 2.7567 | 1.85478 | 24.80 | S-NBH56 |

TABLE 34A-continued

Example 9

| Sn | R | D | nd | ν | Material |
|---|---|---|---|---|---|
| 19 | 1831.4008 | 9.7567 | | | |
| 20 | −431.7438 | 9.1027 | 1.85896 | 22.73 | S-NPH5 |
| 21 | −37.3032 | 3.1873 | 1.89190 | 37.13 | S-LAH92 |
| 22 | −309.0675 | DD[22] | | | |
| *23 | 212.4151 | 2.7112 | 1.49700 | 81.54 | S-FPL51 |
| 24 | −236.3700 | 0.9211 | | | |
| 25 | −145.7015 | 1.8817 | 1.69895 | 30.13 | S-TIM35 |
| 26 | 22396.8310 | 2.8139 | 1.85896 | 22.73 | S-NPH5 |
| 27 | −190.6770 | 0.8900 | | | |
| 28 | 466.2306 | 2.3477 | 1.85478 | 24.80 | S-NBH56 |
| 29 | 105.3843 | 4.0406 | 1.43875 | 94.66 | S-FPL55 |
| 30 | −214.2560 | 0.6602 | | | |
| 31 | 190.2479 | 7.1483 | 1.43875 | 94.66 | S-FPL55 |
| 32 | −300.0746 | 2.8862 | 1.85150 | 40.78 | S-LAH89 |
| 33 | −261.4437 | 2.0634 | | | |
| *34 | 4401.4516 | 2.5777 | 1.49700 | 81.54 | S-FPL51 |
| *35 | −217.1293 | DD[35] | | | |

TABLE 34B

Example 9

| Sn | R | D | nd | ν | Material |
|---|---|---|---|---|---|
| 36 (St) | ∞ | 4.1638 | | | |
| 37 | 742.1533 | 2.4835 | 1.48749 | 70.24 | S-FSL5 |
| 38 | 133.8453 | 9.6930 | 1.51742 | 52.43 | S-NSL36 |
| 39 | −52.3794 | 1.8597 | 1.65100 | 56.24 | S-LAL54Q |
| 40 | −1717.1431 | 20.3558 | | | |
| 41 | −108.1406 | 9.0979 | 1.48749 | 70.24 | S-FSL5 |
| 42 | 67.7056 | 3.6877 | | | |
| 43 | 74.4811 | 2.6689 | 1.90525 | 35.04 | S-LAH93 |
| 44 | −351.6126 | 3.8807 | | | |
| 45 | −696.9155 | 1.6354 | 1.69895 | 30.13 | S-TIM35 |
| 46 | 160.8667 | 12.2086 | | | |
| 47 | 99.6203 | 1.5997 | 1.90525 | 35.04 | S-LAH93 |
| 48 | −147.7203 | 0.9948 | | | |
| 49 | 411.1244 | 3.4828 | 1.48749 | 70.24 | S-FSL5 |
| 50 | 37.0932 | 10.3867 | 1.51633 | 64.14 | S-BSL7 |
| 51 | 78.6743 | 2.7742 | | | |
| 52 | 657.0130 | 8.1219 | 1.89286 | 20.36 | S-NPH4 |
| 53 | 21.2140 | 6.8479 | 1.53775 | 74.70 | S-FPM3 |
| 54 | 28.0470 | 23.2316 | | | |
| 55 | 76.9234 | 4.3834 | 1.95375 | 32.32 | S-LAH98 |
| 56 | −114.5347 | 22.0000 | | | |
| 57 | ∞ | 1.0000 | 1.51633 | 64.14 | S-BSL7 |
| 58 | ∞ | 1.1107 | | | |

TABLE 35

Example 9

|  | WIDE | MIDDLE | TELE |
|---|---|---|---|
| Zr | 1.0 | 3.2 | 10.0 |
| f | 96.8 | 306.0 | 967.6 |
| FNo. | 6.00 | 6.00 | 7.38 |
| ω (°) | 4.9 | 1.6 | 0.5 |

TABLE 35-continued

Example 9

|  | WIDE | MIDDLE | TELE |
|---|---|---|---|
| DD[14] | 171.2020 | 242.3067 | 279.7517 |
| DD[22] | 193.5093 | 92.3017 | 5.7895 |
| DD[35] | 19.3042 | 49.4071 | 98.4743 |

TABLE 36

Example 9

| TL | 738.9 |
|---|---|
| f1 | 449.3 |
| f2 | −56.3 |
| f3 | 97.6 |
| f4 | 126.0 |
| f31 | 225.6 |

TABLE 37

Example 9

| Bfd | 23.77 |
|---|---|
| Bf_1300 | 23.70 |
| Bf_1426 | 23.71 |
| Bf_1450 | 23.71 |
| Bf_1450 | 23.71 |
| Bf_1460 | 23.71 |
| Bf_1530 | 23.71 |
| Bf_1550 | 23.70 |
| Bf_1570 | 23.70 |
| Bf_1651 | 23.68 |
| Bf_1653 | 23.67 |
| Bf_1696 | 23.66 |
| Bf_1725 | 23.64 |
| Bf_1750 | 23.63 |

TABLE 37-continued

Example 9

| Bf_1870 | 23.53 |
|---|---|
| Bf_1940 | 23.46 |
| Bf_1970 | 23.42 |
| Bf_2050 | 23.31 |
| Bf_2120 | 23.19 |
| Bf_2325 | 22.72 |

TABLE 38

Example 9

| Sn | 15 | 23 | 34 | 35 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 7.0516760E−08 | −7.0754361E−08 | 1.8783771E−08 | −1.2117220E−08 |
| A5 | 5.4541983E−09 | 1.7030419E−09 | 4.1564839E−10 | 3.5636600E−10 |
| A6 | 4.3287789E−11 | −7.9077820E−11 | −5.7557058E−11 | 8.6492791E−12 |
| A7 | 4.9902716E−12 | 9.1682810E−13 | −2.6203141E−12 | 1.8653297E−12 |
| A8 | 6.2976350E−13 | 1.8011224E−13 | −4.1892332E−14 | 1.1833179E−13 |
| A9 | −7.3826284E−15 | −2.9025238E−15 | −7.0832786E−16 | −1.2444811E−15 |
| A10 | 8.1564405E−16 | −4.0209634E−16 | 2.6296518E−17 | 2.5381464E−16 |
| A11 | −3.9276133E−17 | 1.7920865E−17 | 2.4660632E−18 | 5.0038403E−19 |
| A12 | 4.9147017E−18 | −9.5332577E−20 | 3.3901988E−19 | 2.6784816E−19 |
| A13 | 1.0315866E−19 | −1.9318605E−20 | −5.8760109E−21 | 1.7605145E−20 |
| A14 | 1.7563470E−20 | 3.3805520E−21 | 2.2437206E−22 | 9.7806439E−22 |
| A15 | −2.5443780E−21 | 4.2572553E−23 | −7.1075932E−23 | 3.5475728E−26 |
| A16 | −2.5998307E−22 | 2.6296369E−24 | 2.5735439E−24 | 2.4913822E−24 |
| A17 | −6.4558227E−24 | 2.5772532E−25 | 3.7672757E−25 | 2.3633082E−25 |
| A18 | 2.8484283E−25 | −4.3858631E−26 | 1.3316362E−26 | 1.0328971E−26 |
| A19 | 1.4588159E−26 | 5.6920768E−28 | 2.9858390E−28 | −1.8255105E−28 |
| A20 | 7.9514005E−28 | 3.9372417E−29 | 7.4352778E−30 | −2.2370745E−29 |

EXAMPLE 10

Figure 20:
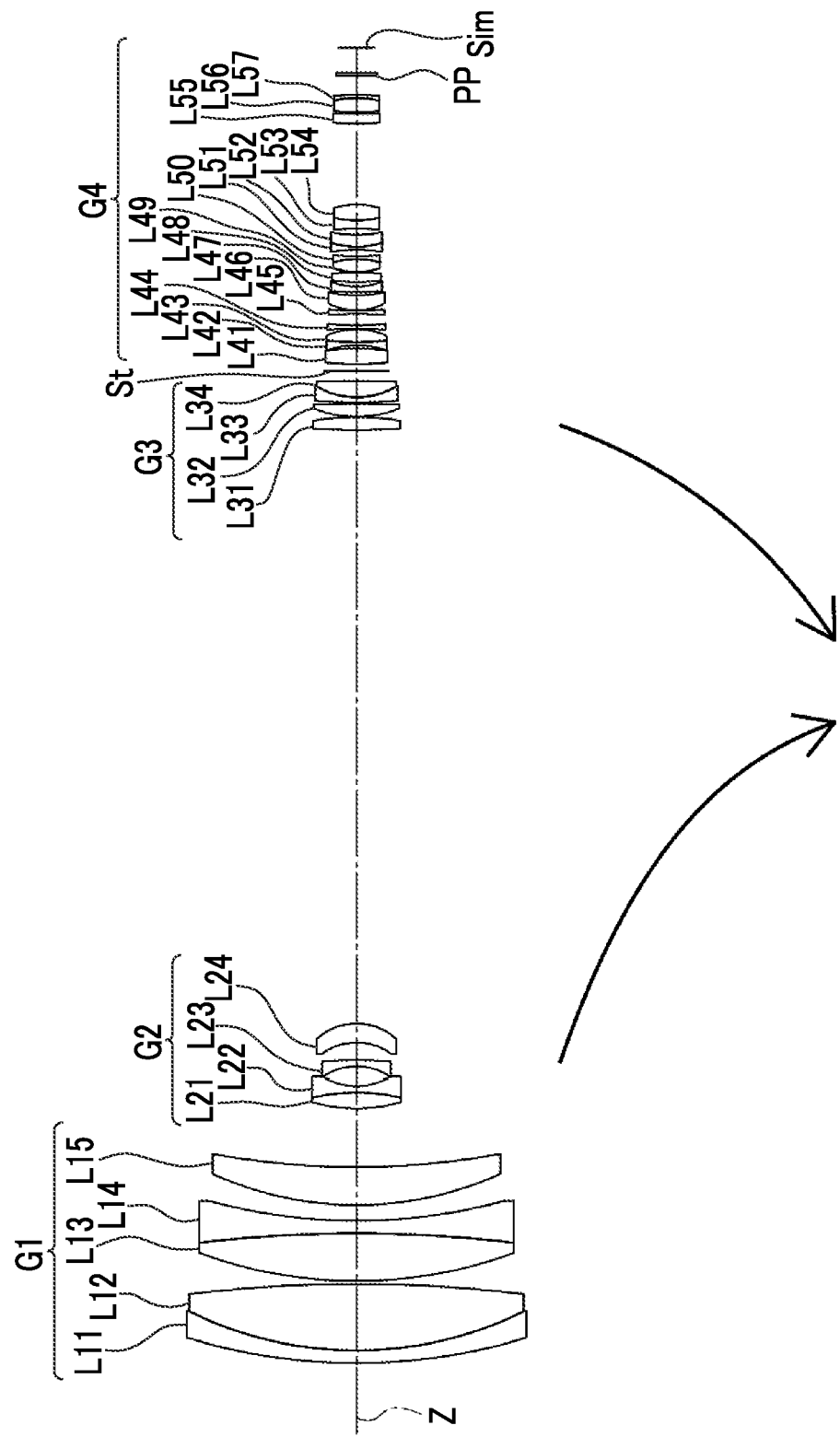
FIG. 20 is a cross-sectional view of a configuration of a variable magnification optical system of Example 10 of the present disclosure and a diagram illustrating a movement trajectory.
Figure 21:
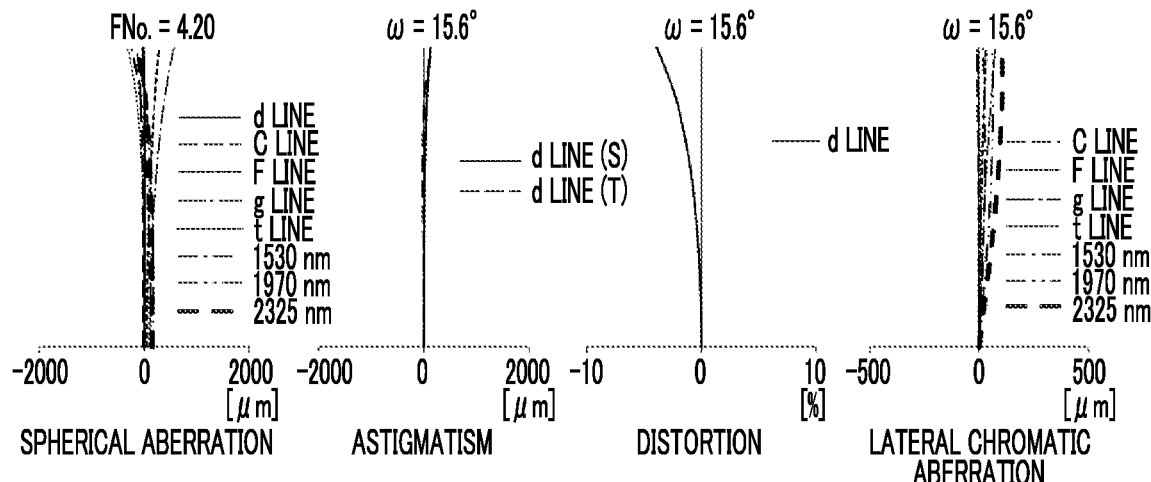
FIG. 21 is each aberration diagram of the variable magnification optical system of Example 10 of the present disclosure.
Figure 21:
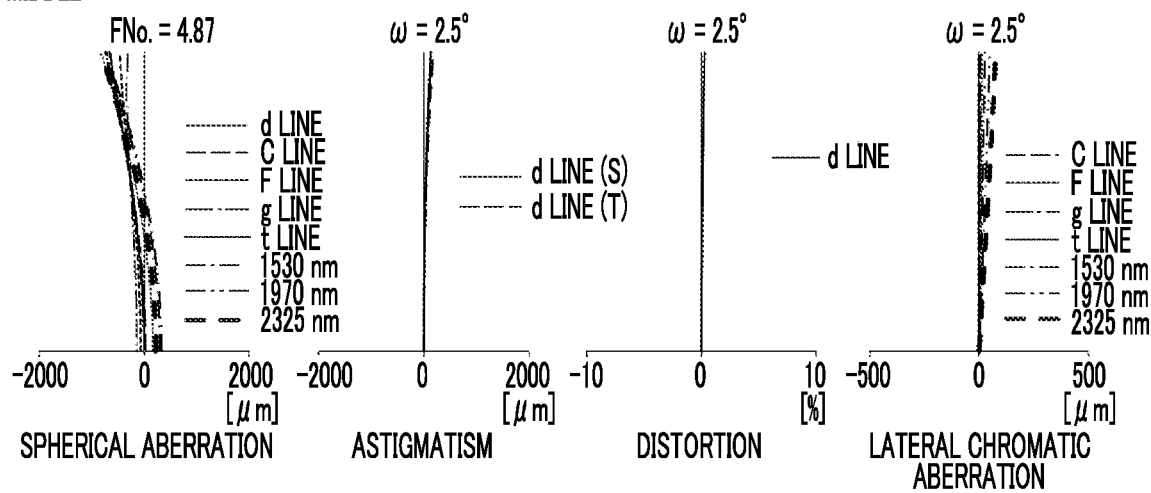
Figure 21:
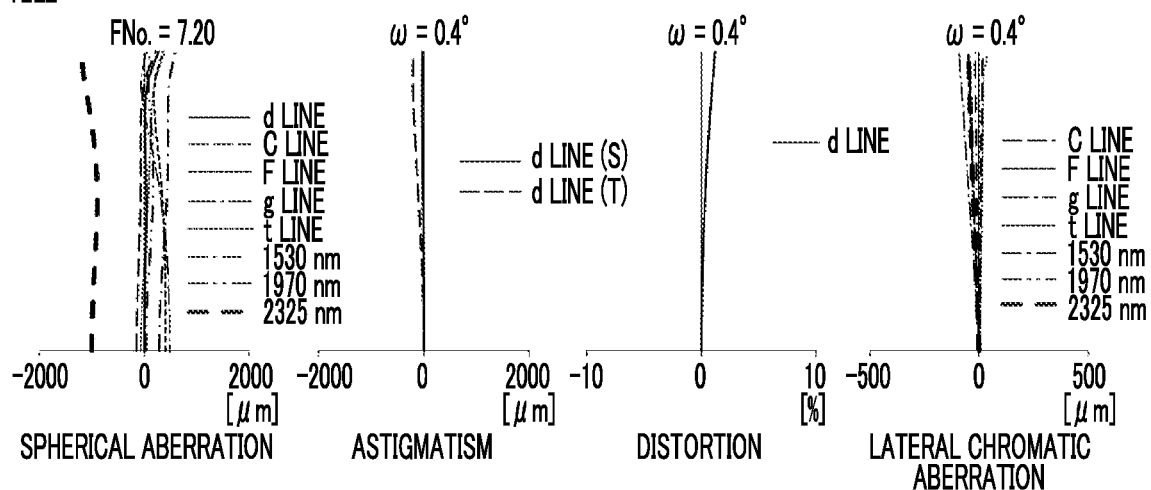

A configuration of a variable magnification optical system of Example 10 and a movement trajectory are illustrated in FIG. 20. The variable magnification optical system of Example 10 consists of, in order from the object side to the image side, the first lens group G1 having a positive refractive power, the second lens group G2 having a negative refractive power, the third lens group G3 having a positive refractive power, the aperture stop St, and the fourth lens group G4 having a positive refractive power. During zooming, the first lens group G1, the aperture stop St, and the fourth lens group G4 are fixed with respect to the image plane Sim, and the second lens group G2 and the third lens group G3 are moved along the optical axis Z by changing an interval between each other. The first lens group G1 consists of the lenses L11 to L15. The second lens group G2 consists of the lenses L21 to L24. The third lens group G3 consists of the lenses L31 to L34. The fourth lens group G4 consists of the lenses L41 to L57. For the variable magnification optical system of Example 10, basic lens data is shown in Table 39A and Table 39B, and specifications and a variable surface interval are shown in Table 40. Various data are shown in Table 41 and Table 42, and each aberration diagram is illustrated in FIG. 21. All materials shown in Table 39A and Table 39B are manufactured by OHARA INC.

TABLE 39A

Example 10

| Sn | R | D | nd | ν | Material |
|---|---|---|---|---|---|
| 1 | 191.6339 | 4.0000 | 1.51633 | 64.14 | S-BSL7 |
| 2 | 125.0115 | 21.0000 | 1.49700 | 81.54 | S-FPL51 |

TABLE 39A-continued

Example 10

| Sn | R | D | nd | ν | Material |
|---|---|---|---|---|---|
| 3 | −462.8619 | 1.0000 | | | |
| 4 | 151.1321 | 15.0000 | 1.49700 | 81.54 | S-FPL51 |
| 5 | −448.9555 | 4.0000 | 1.79952 | 42.22 | S-LAH52 |
| 6 | 182.6560 | 5.0000 | | | |
| 7 | 114.9032 | 12.0000 | 1.49700 | 81.54 | S-FPL51 |
| 8 | 260.6024 | DD[8] | | | |
| 9 | 53.6145 | 5.0000 | 1.96300 | 24.11 | S-TIH57 |
| 10 | −60.8515 | 2.0100 | 1.80610 | 40.93 | S-LAH53 |
| 11 | 21.6485 | 6.0000 | | | |
| 12 | −19.3151 | 2.0000 | 1.71300 | 53.87 | S-LAL8 |
| 13 | −128.5992 | 5.5000 | | | |
| 14 | −18.6876 | 6.0000 | 1.67270 | 32.10 | S-TIM25 |
| 15 | −19.1916 | DD[15] | | | |
| 16 | 254.6938 | 4.0000 | 1.49700 | 81.54 | S-FPL51 |
| 17 | −91.9227 | 0.2000 | | | |
| 18 | 38.3915 | 4.0000 | 1.49700 | 81.54 | S-FPL51 |
| 19 | −684.7849 | 0.5000 | | | |
| 20 | 175.5845 | 1.6350 | 1.80400 | 46.58 | S-LAH65V |
| 21 | 25.2763 | 5.0100 | 1.53775 | 74.70 | S-FPM3 |
| 22 | −604.0159 | DD[22] | | | |

TABLE 39B

Example 10

| Sn | R | D | nd | ν | Material |
|---|---|---|---|---|---|
| 23 (St) | ∞ | 1.8731 | | | |
| 24 | 84.5130 | 5.0000 | 1.74400 | 44.79 | S-LAM2 |
| 25 | −61.3409 | 1.0000 | | | |
| 26 | −28.6458 | 1.0000 | 1.83400 | 37.21 | S-LAH60V |
| 27 | 105.0826 | 4.0100 | 1.51742 | 52.43 | S-NSL36 |
| 28 | −23.3224 | 0.2000 | | | |
| 29 | −118.9121 | 1.0000 | 1.69680 | 55.53 | S-LAL14 |
| 30 | 73.8902 | 3.6522 | | | |
| 31 | −160.2887 | 1.0000 | 1.69680 | 55.53 | S-LAL14 |
| 32 | 74.5836 | 0.2000 | | | |
| 33 | 19.6292 | 4.6950 | 1.80518 | 25.42 | S-TIH6 |
| 34 | 39.6811 | 1.0000 | | | |
| 35 | 87.2130 | 1.7764 | 1.60311 | 60.64 | S-BSM14 |
| 36 | 21.1995 | 1.5000 | | | |
| 37 | 73.7321 | 3.0465 | 1.64850 | 53.02 | S-BSM71 |
| 38 | −59.7021 | 0.1000 | | | |
| 39 | 22.7123 | 4.0000 | 1.54814 | 45.78 | S-TIL1 |
| 40 | −28.5331 | 1.0000 | 1.84666 | 23.78 | S-TIH53 |
| 41 | 120.0457 | 2.0000 | | | |
| 42 | −42.6905 | 1.0000 | 1.80400 | 46.53 | S-LAH65VS |
| 43 | 27.5997 | 3.7239 | 1.80440 | 39.59 | S-LAH63 |
| 44 | 39.4151 | 2.0000 | | | |
| 45 | −52.7430 | 2.5430 | 1.75500 | 52.32 | S-YGH51 |
| 46 | 28.1567 | 5.0100 | 1.59551 | 39.24 | S-TIM8 |
| 47 | −23.3379 | 25.5624 | | | |
| 48 | 65.9854 | 3.0000 | 1.84666 | 23.78 | S-TIH53 |
| 49 | 174.2359 | 0.7000 | | | |
| 50 | 91.9800 | 4.5000 | 1.51633 | 64.14 | S-BSL7 |
| 51 | −28.1669 | 1.0000 | 1.84666 | 23.78 | S-TIH53 |
| 52 | −62.7438 | 6.0000 | | | |
| 53 | ∞ | 1.0000 | 1.51633 | 64.14 | S-BSL7 |
| 54 | ∞ | 7.9214 | | | |

TABLE 40

Example 10

| | WIDE | MIDDLE | TELE |
|---|---|---|---|
| Zr | 1.0 | 6.2 | 38.0 |
| f | 20.6 | 126.8 | 782.0 |
| FNo. | 4.20 | 4.87 | 7.20 |
| ω (°) | 15.6 | 2.5 | 0.4 |
| DD[8] | 18.5649 | 103.2171 | 133.1145 |
| DD[15] | 187.7800 | 79.3964 | 0.9006 |
| DD[22] | 3.2639 | 26.9953 | 75.5937 |

TABLE 41

Example 10

| TL | 415.1 |
|---|---|
| f1 | 224.1 |
| f2 | −28.3 |
| f3 | 61.2 |
| f4 | 112.0 |
| f31 | 136.4 |

TABLE 42

Example 10

| Bfd | 14.58 |
|---|---|
| Bf_1300 | 14.75 |
| Bf_1426 | 14.83 |
| Bf_1450 | 14.85 |
| Bf_1450 | 14.85 |
| Bf_1460 | 14.85 |
| Bf_1530 | 14.88 |
| Bf_1550 | 14.88 |
| Bf_1570 | 14.88 |
| Bf_1651 | 14.89 |
| Bf_1653 | 14.89 |
| Bf_1696 | 14.88 |
| Bf_1725 | 14.87 |
| Bf_1750 | 14.86 |
| Bf_1870 | 14.76 |
| Bf_1940 | 14.67 |
| Bf_1970 | 14.63 |
| Bf_2050 | 14.48 |
| Bf_2120 | 14.31 |
| Bf_2325 | 13.59 |

EXAMPLE 11

Figure 22:
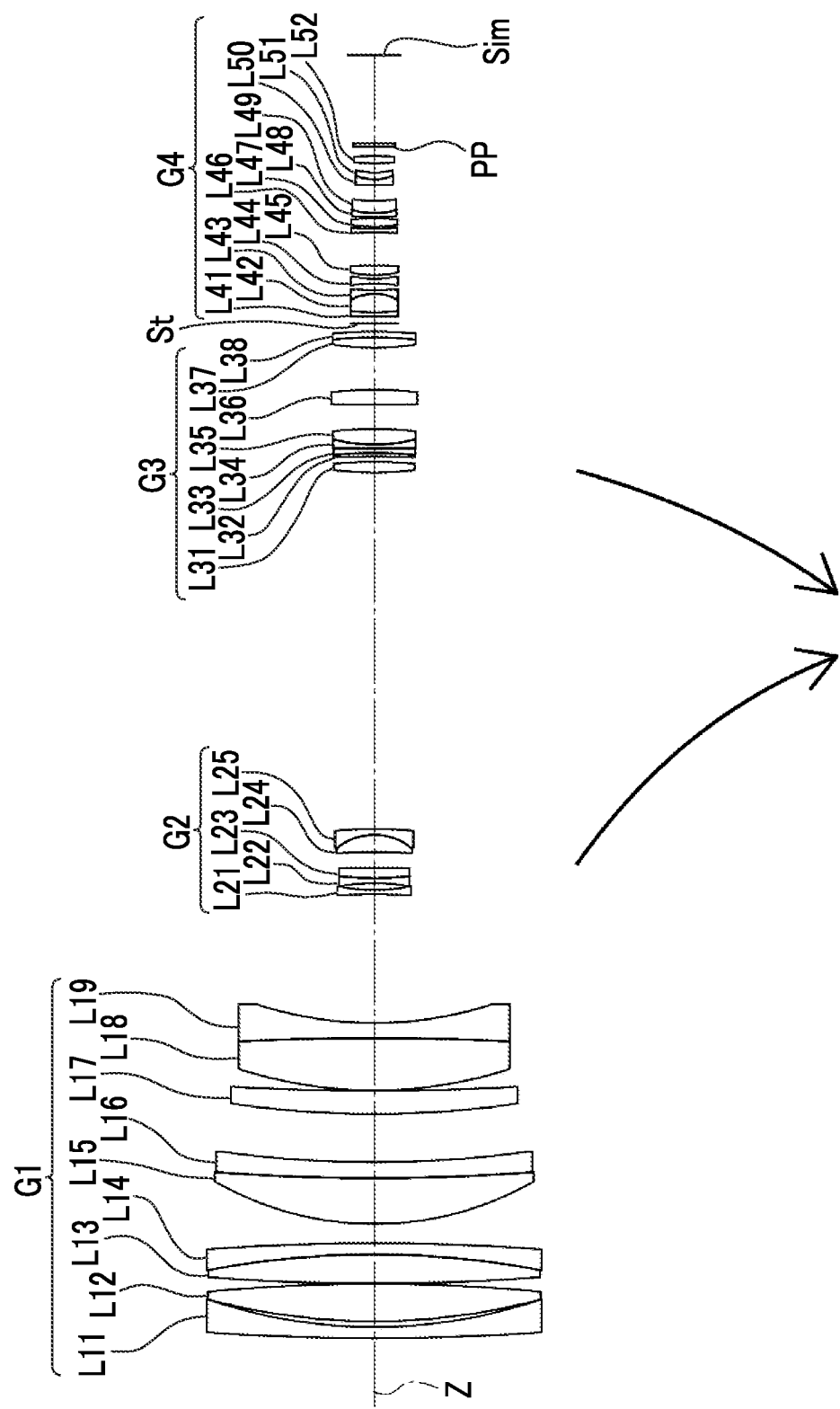
FIG. 22 is a cross-sectional view of a configuration of a variable magnification optical system of Example 11 of the present disclosure and a diagram illustrating a movement trajectory.
Figure 23:
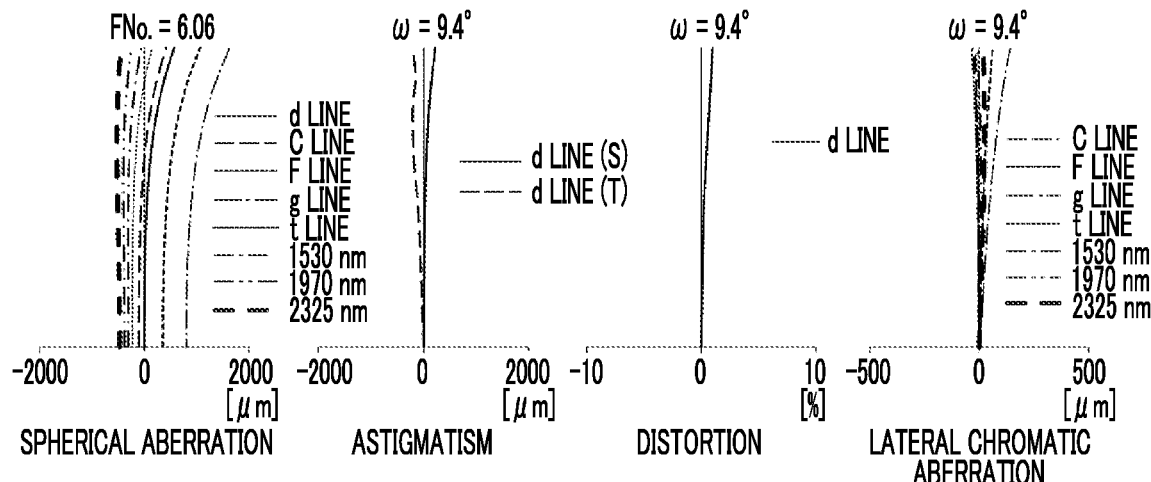
FIG. 23 is each aberration diagram of the variable magnification optical system of Example 11 of the present disclosure.
Figure 23:
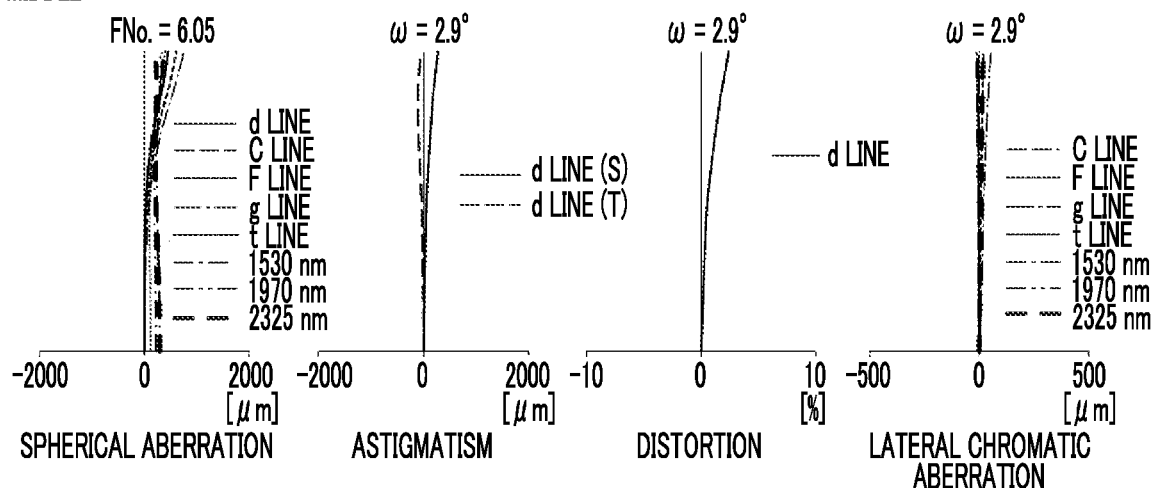
Figure 23:
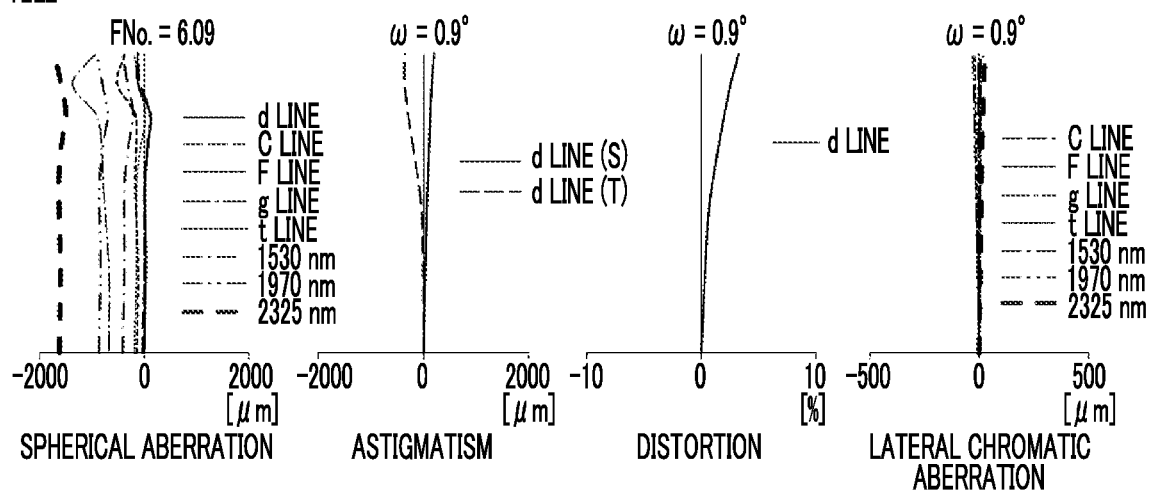

A configuration of a variable magnification optical system of Example 11 and a movement trajectory are illustrated in FIG. 22. The variable magnification optical system of Example 11 consists of, in order from the object side to the image side, the first lens group G1 having a positive refractive power, the second lens group G2 having a negative refractive power, the third lens group G3 having a positive refractive power, the aperture stop St, and the fourth lens group G4 having a negative refractive power. During zooming, the first lens group G1, the aperture stop St, and the fourth lens group G4 are fixed with respect to the image plane Sim, and the second lens group G2 and the third lens group G3 are moved along the optical axis Z by changing an interval between each other. The first lens group G1 consists of the lenses L11 to L19. The second lens group G2 consists of the lenses L21 to L25. The third lens group G3 consists of the lenses L31 to L38. The fourth lens group G4 consists of the lenses L41 to L52. For the variable magnification optical system of Example 11, basic lens data is shown in Table 43A and Table 43B, and specifications and a variable surface interval are shown in Table 44. Various data are shown in Table 45 and Table 46, and aspherical coefficients are shown in Table 47. Each aberration diagram is illustrated in FIG. 23. All materials shown in Table 43A and Table 43B except CAF2 are manufactured by OHARA INC.

TABLE 43A

Example 11

| Sn | R | D | nd | ν | Material |
|---|---|---|---|---|---|
| 1 | 780.6949 | 3.5006 | 1.48749 | 70.24 | S-FSL5 |
| 2 | 167.9672 | 1.8019 | | | |
| 3 | 210.0960 | 11.6780 | 1.43387 | 95.18 | CAF2 |
| 4 | −571.0053 | 0.1201 | | | |
| 5 | 728.3125 | 9.0432 | 1.43875 | 94.66 | S-FPL55 |
| 6 | −290.1276 | 3.5003 | 1.62041 | 60.29 | S-BSM16 |
| 7 | −762.8468 | 6.0681 | | | |
| 8 | 104.5906 | 14.2928 | 1.43875 | 94.66 | S-FPL55 |
| 9 | 706.4555 | 5.0001 | 1.89286 | 20.36 | S-NPH4 |
| 10 | 369.1015 | 15.0045 | | | |
| 11 | 319.2933 | 7.2701 | 1.53172 | 48.84 | S-TIL6 |
| 12 | 837.9342 | 0.1200 | | | |
| 13 | 143.7060 | 15.9983 | 1.43875 | 94.66 | S-FPL55 |
| 14 | −920.1831 | 4.7346 | 1.49700 | 81.54 | S-FPL51 |
| 15 | 123.9324 | DD[15] | | | |
| *16 | −268.0411 | 1.3796 | 1.86100 | 37.10 | L-LAH94 |
| 17 | 56.3165 | 2.1199 | | | |
| 18 | −66.1664 | 1.6227 | 1.95375 | 32.32 | S-LAH98 |
| 19 | 113.6831 | 3.1564 | 1.80518 | 25.42 | S-TIH6 |
| 20 | −1429.4895 | 4.9726 | | | |
| 21 | −196.9681 | 5.3329 | 1.85896 | 22.73 | S-NPH5 |
| 22 | −19.1552 | 1.9060 | 1.89190 | 37.13 | S-LAH92 |
| 23 | −123.7732 | DD[23] | | | |
| *24 | 99.3590 | 3.3394 | 1.49700 | 81.54 | S-FPL51 |
| 25 | −147.8514 | 1.6356 | | | |
| 26 | −303.8434 | 1.2140 | 1.90525 | 35.04 | S-LAH93 |
| 27 | −110.1444 | 1.2286 | 1.48749 | 70.24 | S-FSL5 |
| 28 | −1862.4500 | 0.1245 | | | |
| 29 | 361.8522 | 1.2022 | 1.80000 | 29.84 | S-NBH55 |
| 30 | 52.6867 | 4.8065 | 1.43875 | 94.66 | S-FPL55 |
| 31 | −132.5238 | 7.5335 | | | |
| *32 | 401.8606 | 4.7669 | 1.49700 | 81.54 | S-FPL51 |
| *33 | −123.3489 | 12.8515 | | | |
| 34 | 89.8462 | 3.2365 | 1.43875 | 94.66 | S-FPL55 |
| 35 | −115.9391 | 1.7777 | 1.85150 | 40.78 | S-LAH89 |
| 36 | −131.5321 | DD[36] | | | |

TABLE 43B

Example 11

| Sn | R | D | nd | ν | Material |
|---|---|---|---|---|---|
| 37 (St) | ∞ | 2.0819 | | | |
| 38 | 576.5156 | 1.3168 | 1.58913 | 61.13 | S-BAL35 |
| 39 | 73.6208 | 5.7750 | 1.49700 | 81.54 | S-FPL51 |
| 40 | −14.8048 | 1.2146 | 1.51742 | 52.43 | S-NSL36 |
| 41 | 158.6220 | 2.0686 | | | |
| 42 | −35.8355 | 1.4496 | 1.49700 | 81.54 | S-FPL51 |
| 43 | 38.5875 | 1.1226 | | | |
| 44 | 35.1050 | 2.9739 | 1.90525 | 35.04 | S-LAH93 |
| 45 | −206.0747 | 10.3076 | | | |
| 46 | −165.8903 | 1.2229 | 1.62588 | 35.70 | S-TIM1 |
| 47 | 88.6506 | 0.6595 | | | |
| 48 | 56.8519 | 2.5149 | 1.85150 | 40.78 | S-LAH89 |
| 49 | −82.7460 | 0.4935 | | | |
| 50 | 118.6771 | 1.2062 | 1.49700 | 81.54 | S-FPL51 |
| 51 | 26.9993 | 3.8086 | 1.54814 | 45.78 | S-TIL1 |
| 52 | 44.2398 | 4.9455 | | | |
| 53 | 178.5228 | 1.6865 | 1.96300 | 24.11 | S-TIH57 |
| 54 | 13.3859 | 2.1759 | 1.53775 | 74.70 | S-FPM3 |
| 55 | 23.0068 | 2.9431 | | | |

TABLE 43B-continued

Example 11

| Sn | R | D | nd | ν | Material |
|---|---|---|---|---|---|
| 56 | 99.4121 | 2.1917 | 1.90366 | 31.34 | S-LAH95 |
| 57 | −77.8706 | 3.0000 | | | |
| 58 | ∞ | 1.0000 | 1.51633 | 64.14 | S-BSL7 |
| 59 | ∞ | 27.6162 | | | |

TABLE 44

Example 11

| | WIDE | MIDDLE | TELE |
|---|---|---|---|
| Zr | 1.0 | 3.2 | 10.0 |
| f | 50.4 | 159.4 | 504.2 |
| FNo. | 6.06 | 6.05 | 6.09 |
| ω (°) | 9.4 | 2.9 | 0.9 |
| DD[15] | 40.1224 | 85.7736 | 109.8310 |
| DD[23] | 111.2468 | 49.8882 | 0.4674 |
| DD[36] | 2.6194 | 18.3268 | 43.6902 |

TABLE 45

Example 11

| TL | 399.8 |
|---|---|
| f1 | 229.9 |
| f2 | −31.3 |
| f3 | 56.4 |
| f4 | −67.7 |
| f31 | 120.1 |

TABLE 46

Example 11

| Bfd | 31.28 |
|---|---|
| Bf_1300 | 30.98 |
| Bf_1426 | 30.93 |
| Bf_1450 | 30.92 |
| Bf_1450 | 30.92 |
| Bf_1460 | 30.91 |
| Bf_1530 | 30.87 |
| Bf_1550 | 30.86 |
| Bf_1570 | 30.85 |
| Bf_1651 | 30.79 |
| Bf_1653 | 30.78 |
| Bf_1696 | 30.75 |
| Bf_1725 | 30.72 |
| Bf_1750 | 30.70 |
| Bf_1870 | 30.56 |
| Bf_1940 | 30.46 |
| Bf_1970 | 30.42 |
| Bf_2050 | 30.29 |
| Bf_2120 | 30.15 |
| Bf_2325 | 29.66 |

TABLE 47

Example 11

| Sn | 16 | 24 | 32 | 33 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 5.7994375E−07 | −3.6845628E−07 | 1.1826809E−07 | −9.2366048E−08 |
| A5 | 4.5904615E−08 | 1.4952370E−08 | −4.8693622E−10 | 4.3255797E−10 |
| A6 | 1.4942507E−09 | −2.6330068E−09 | −9.4793161E−11 | −1.1228624E−10 |
| A7 | −1.7205480E−10 | −2.0298003E−11 | −2.3695337E−11 | −3.8296919E−12 |
| A8 | −1.1956181E−11 | 2.4900263E−11 | −3.5004056E−13 | −4.2267579E−13 |
| A9 | −2.1686788E−15 | −5.2164561E−13 | 8.3598728E−15 | −3.3399811E−14 |
| A10 | −1.0396394E−14 | −1.8925408E−13 | −1.8355821E−15 | −2.3463878E−15 |
| A11 | −4.1574507E−15 | 1.4967448E−14 | −2.8096441E−19 | −3.4679353E−16 |
| A12 | 4.9817817E−17 | −3.5722677E−16 | 9.3253704E−18 | −3.8687863E−17 |
| A13 | −8.5599684E−19 | −5.5751607E−17 | −1.6625421E−18 | −9.5112175E−19 |
| A14 | 1.9934546E−18 | 3.4061664E−18 | 8.7558461E−20 | −1.3121730E−19 |
| A15 | 1.4970972E−19 | 2.8624358E−19 | 1.3403886E−21 | −9.8168169E−21 |
| A16 | 1.3048840E−22 | −4.4928114E−21 | 4.0090607E−22 | 5.6606804E−22 |
| A17 | 6.5186940E−22 | −6.6686421E−22 | 2.5784633E−23 | 1.3278361E−24 |
| A18 | −4.8717666E−23 | −7.8121018E−24 | 3.0624425E−25 | 4.6261726E−26 |
| A19 | 3.4890952E−24 | 1.8841217E−24 | −4.0851136E−25 | −1.1410085E−25 |
| A20 | 4.4394243E−26 | −2.7127052E−25 | −1.3345348E−26 | 7.9865098E−27 |

Table 48 and Table 49 show corresponding values of Conditional Expression (1) of the variable magnification optical systems of Examples 1 to 11. Here, a symbol of "Bf_numerical value" used in Table 4 and the like is used as "BfIR" of Conditional Expression (1).

TABLE 48

|  | Example 1 | Example 2 | Example 3 | Example 4 | Example 5 | Example 6 |
|---|---|---|---|---|---|---|
| (Bfd − Bf_1300)/ft | −0.00036 | −0.00023 | −0.00013 | −0.00020 | −0.00023 | −0.00024 |
| (Bfd − Bf_1426)/ft | −0.00050 | −0.00031 | −0.00022 | −0.00025 | −0.00029 | −0.00030 |
| (Bfd − Bf_1450)/ft | −0.00053 | −0.00032 | −0.00024 | −0.00026 | −0.00030 | −0.00031 |
| (Bfd − Bf_1450)/ft | −0.00053 | −0.00032 | −0.00024 | −0.00026 | −0.00030 | −0.00031 |
| (Bfd − Bf_1460)/ft | −0.00054 | −0.00033 | −0.00024 | −0.00026 | −0.00030 | −0.00031 |
| (Bfd − Bf_1530)/ft | −0.00059 | −0.00035 | −0.00027 | −0.00027 | −0.00031 | −0.00032 |
| (Bfd − Bf_1550)/ft | −0.00060 | −0.00035 | −0.00028 | −0.00027 | −0.00031 | −0.00032 |
| (Bfd − Bf_1570)/ft | −0.00061 | −0.00036 | −0.00028 | −0.00027 | −0.00031 | −0.00032 |
| (Bfd − Bf_1651)/ft | −0.00063 | −0.00035 | −0.00029 | −0.00024 | −0.00029 | −0.00030 |
| (Bfd − Bf_1653)/ft | −0.00063 | −0.00035 | −0.00029 | −0.00024 | −0.00029 | −0.00030 |
| (Bfd − Bf_1696)/ft | −0.00063 | −0.00034 | −0.00028 | −0.00022 | −0.00027 | −0.00027 |
| (Bfd − Bf_1725)/ft | −0.00062 | −0.00033 | −0.00027 | −0.00020 | −0.00025 | −0.00025 |
| (Bfd − Bf_1750)/ft | −0.00061 | −0.00032 | −0.00026 | −0.00018 | −0.00023 | −0.00023 |
| (Bfd − Bf_1870)/ft | −0.00051 | −0.00021 | −0.00027 | −0.00005 | −0.00010 | −0.00010 |
| (Bfd − Bf_1940)/ft | −0.00041 | −0.00011 | −0.00009 | 0.00007 | 0.00001 | 0.00002 |
| (Bfd − Bf_1970)/ft | −0.00035 | −0.00006 | −0.00004 | 0.00013 | 0.00007 | 0.00008 |
| (Bfd − Bf_2050)/ft | −0.00016 | 0.00010 | 0.00010 | 0.00031 | 0.00025 | 0.00026 |
| (Bfd − Bf_2120)/ft | 0.00006 | 0.00027 | 0.00026 | 0.00050 | 0.00044 | 0.00045 |
| (Bfd − Bf_2325)/ft | 0.00101 | 0.00100 | 0.00093 | 0.00128 | 0.00118 | 0.00121 |

TABLE 49

|  | Example 7 | Example 8 | Example 9 | Example 10 | Example 11 |
|---|---|---|---|---|---|
| (Bfd − Bf_1300)/ft | −0.00040 | 0.00106 | 0.00007 | −0.00022 | 0.00058 |
| (Bfd − Bf_1426)/ft | −0.00049 | 0.00122 | 0.00006 | −0.00032 | 0.00069 |
| (Bfd − Bf_1450)/ft | −0.00050 | 0.00126 | 0.00006 | −0.00034 | 0.00071 |
| (Bfd − Bf_1450)/ft | −0.00050 | 0.00126 | 0.00006 | −0.00034 | 0.00071 |
| (Bfd − Bf_1460)/ft | −0.00050 | 0.00127 | 0.00006 | −0.00035 | 0.00072 |
| (Bfd − Bf_1530)/ft | −0.00051 | 0.00138 | 0.00007 | −0.00038 | 0.00080 |
| (Bfd − Bf_1550)/ft | −0.00051 | 0.00142 | 0.00007 | −0.00038 | 0.00083 |
| (Bfd − Bf_1570)/ft | −0.00050 | 0.00145 | 0.00007 | −0.00039 | 0.00085 |
| (Bfd − Bf_1651)/ft | −0.00045 | 0.00161 | 0.00010 | −0.00039 | 0.00097 |
| (Bfd − Bf_1653)/ft | −0.00045 | 0.00161 | 0.00010 | −0.00039 | 0.00097 |
| (Bfd − Bf_1696)/ft | −0.00040 | 0.00171 | 0.00012 | −0.00038 | 0.00105 |
| (Bfd − Bf_1725)/ft | −0.00036 | 0.00177 | 0.00013 | −0.00037 | 0.00110 |
| (Bfd − Bf_1750)/ft | −0.00032 | 0.00183 | 0.00015 | −0.00035 | 0.00115 |
| (Bfd − Bf_1870)/ft | −0.00006 | 0.00216 | 0.00024 | −0.00023 | 0.00142 |
| (Bfd − Bf_1940)/ft | 0.00015 | 0.00239 | 0.00032 | −0.00012 | 0.00161 |

TABLE 49-continued

|  | Example 7 | Example 8 | Example 9 | Example 10 | Example 11 |
|---|---|---|---|---|---|
| (Bfd − Bf_1970)/ft | 0.00026 | 0.00249 | 0.00036 | −0.00006 | 0.00170 |
| (Bfd − Bf_2050)/ft | 0.00058 | 0.00279 | 0.00047 | 0.00013 | 0.00196 |
| (Bfd − Bf_2120)/ft | 0.00092 | 0.00309 | 0.00060 | 0.00035 | 0.00223 |
| (Bfd − Bf_2325)/ft | 0.00220 | 0.00416 | 0.00109 | 0.00127 | 0.00320 |

Table 50 and Table 51 show corresponding values of Conditional Expressions (2) to (31) of the variable magnification optical systems of Examples 1 to 11.

TABLE 50

| Expression Number | | Example 1 | Example 2 | Example 3 | Example 4 | Example 5 | Example 6 |
|---|---|---|---|---|---|---|---|
| (2) | θ1ave | 2.0 | 2.0 | 2.1 | 2.0 | 2.1 | 2.1 |
| (3) | θ1Pave − θ1Nave | 0.0 | 0.1 | 0.1 | 0.2 | 0.0 | 0.0 |
| (4) | θ3ave | 2.0 | 1.9 | 1.9 | 1.9 | 1.9 | 1.9 |
| (5) | ft/TL | 1.9 | 2.1 | 3.0 | 3.0 | 3.6 | 3.6 |
| (6) | θ1ave/θ2ave | 1.2 | 1.0 | 1.1 | 1.0 | 1.1 | 1.1 |
| (7) | θ3ave/θ2ave | 1.2 | 1.0 | 1.0 | 1.0 | 1.0 | 1.0 |
| (8) | ν1ave | 70.2 | 75.6 | 75.3 | 75.8 | 81.5 | 81.5 |
| (9) | θ4ave | 1.7 | 1.9 | 1.9 | 1.9 | 1.8 | 1.9 |
| (10) | θ2ave | 1.7 | 2.0 | 1.9 | 1.9 | 1.9 | 1.9 |
| (11) | θ1Pave | 2.0 | 2.1 | 2.1 | 2.1 | 2.1 | 2.1 |
| (12) | θ1Nave | 2.0 | 2.0 | 2.1 | 1.9 | 2.1 | 2.1 |
| (13) | θ2Pave − θ2Nave | −0.6 | −0.3 | −0.5 | −0.2 | −0.2 | −0.2 |
| (14) | θ3Pave − θ3Nave | 0.2 | 0.3 | 0.3 | 0.3 | 0.3 | 0.3 |
| (15) | θ4Pave − θ4Nave | −0.1 | 0.1 | 0.0 | −0.5 | −0.4 | 0.0 |
| (16) | ν1Pave − ν1Nave | 28.4 | 34.3 | 29.4 | 33.7 | 27.6 | 27.6 |
| (17) | ν2Pave − ν2Nave | −23.7 | −18.8 | −23.9 | −15.5 | −15.5 | −15.5 |
| (18) | ν3Pave − ν3Nave | 32.7 | 38.8 | 28.5 | 30.1 | 30.1 | 30.1 |
| (19) | ν2ave | 42.3 | 55.0 | 54.2 | 53.1 | 53.1 | 53.1 |
| (20) | ν3ave | 71.1 | 62.4 | 62.4 | 63.1 | 63.1 | 63.1 |
| (21) | ν4ave | 44.9 | 57.1 | 56.9 | 56.0 | 53.0 | 56.0 |
| (22) | θ2Pave | 1.4 | 1.8 | 1.6 | 1.8 | 1.8 | 1.8 |
| (23) | θ2Nave | 1.9 | 2.0 | 2.1 | 2.0 | 2.0 | 2.0 |
| (24) | θ4Pave | 1.7 | 1.9 | 1.9 | 1.4 | 1.5 | 1.9 |
| (25) | ft/f1 | 4.5 | 3.9 | 4.7 | 5.0 | 4.9 | 4.9 |
| (26) | ft/f1Pmax | 4.6 | 2.9 | 6.7 | 5.0 | 6.1 | 6.6 |
| (27) | f2/fw | −1.3 | −1.9 | −1.4 | −1.3 | −0.6 | −0.6 |
| (28) | f2Nmax/fw | −1.0 | −2.6 | −2.6 | −1.3 | −0.5 | −0.5 |
| (29) | f1/f2 | −6.7 | −7.6 | −8.9 | −8.8 | −9.6 | −9.8 |
| (30) | f3/f2 | −2.5 | −2.2 | −2.0 | −1.8 | −1.4 | −1.4 |
| (31) | TL/f31 | 2.8 | 4.3 | 5.1 | 4.8 | 6.9 | 5.6 |

TABLE 51

| Expression Number | | Example 7 | Example 8 | Example 9 | Example 10 | Example 11 |
|---|---|---|---|---|---|---|
| (2) | θ1ave | 2.1 | 2.0 | 2.1 | 2.0 | 2.0 |
| (3) | θ1Pave − θ1Nave | −0.1 | 0.0 | 0.2 | 0.0 | 0.0 |
| (4) | θ3ave | 1.9 | 1.8 | 1.7 | 2.0 | 1.9 |
| (5) | ft/TL | 4.4 | 1.2 | 1.3 | 1.9 | 1.3 |
| (6) | θ1ave/θ2ave | 1.2 | 1.5 | 1.5 | 1.3 | 1.4 |
| (7) | θ3ave/θ2ave | 1.1 | 1.3 | 1.2 | 1.2 | 1.4 |
| (8) | ν1ave | 76.7 | 71.0 | 69.7 | 70.2 | 73.4 |
| (9) | θ4ave | 1.9 | 1.9 | 1.9 | 1.7 | 1.8 |
| (10) | θ2ave | 1.8 | 1.4 | 1.4 | 1.6 | 1.4 |
| (11) | θ1Pave | 2.1 | 2.0 | 2.1 | 2.0 | 2.0 |
| (12) | θ1Nave | 2.2 | 2.0 | 2.0 | 2.0 | 2.0 |
| (13) | θ2Pave − θ2Nave | −0.1 | −0.1 | −0.2 | −0.5 | −0.2 |
| (14) | θ3Pave − θ3Nave | 0.3 | 0.6 | 0.5 | 0.2 | 0.1 |
| (15) | θ4Pave − θ4Nave | 0.0 | −0.4 | −0.3 | −0.1 | −0.1 |
| (16) | ν1Pave − ν1Nave | 36.4 | 25.3 | 22.4 | 28.4 | 27.5 |
| (17) | ν2Pave − ν2Nave | −17.7 | −9.8 | −12.8 | −19.3 | −11.4 |
| (18) | ν3Pave − ν3Nave | 31.5 | 49.9 | 41.9 | 32.7 | 30.5 |
| (19) | ν2ave | 52.1 | 30.0 | 31.5 | 37.8 | 30.9 |
| (20) | ν3ave | 63.6 | 67.0 | 58.9 | 71.1 | 66.0 |
| (21) | ν4ave | 61.1 | 49.3 | 51.9 | 44.9 | 54.6 |
| (22) | θ2Pave | 1.8 | 1.3 | 1.3 | 1.4 | 1.3 |

TABLE 51-continued

| Expression Number | | Example 7 | Example 8 | Example 9 | Example 10 | Example 11 |
|---|---|---|---|---|---|---|
| (23) | θ2Nave | 1.9 | 1.4 | 1.5 | 1.9 | 1.5 |
| (24) | θ4Pave | 1.9 | 1.7 | 1.8 | 1.7 | 1.7 |
| (25) | ft/f1 | 5.7 | 2.3 | 2.2 | 3.5 | 2.2 |
| (26) | ft/f1Pmax | 8.5 | 2.8 | 2.4 | 3.9 | 1.8 |
| (27) | f2/fw | −0.8 | −0.6 | −0.6 | −1.4 | −0.6 |
| (28) | f2Nmax/fw | −0.7 | −0.5 | −0.5 | −1.0 | −0.5 |
| (29) | f1/f2 | −11.6 | −7.2 | −8.0 | −7.9 | −7.3 |
| (30) | f3/f2 | −1.5 | −1.9 | −1.7 | −2.2 | −1.8 |
| (31) | TL/f31 | 6.9 | 3.3 | 3.3 | 3.0 | 3.3 |

As is perceived from the above data, in the variable magnification optical systems of Examples 1 to 11, an increase in size of the lens system is suppressed, and various types of aberration are favorably corrected across a wide wavelength range of the visible range to the SWIR range. High optical characteristics are implemented.

Figure 24:
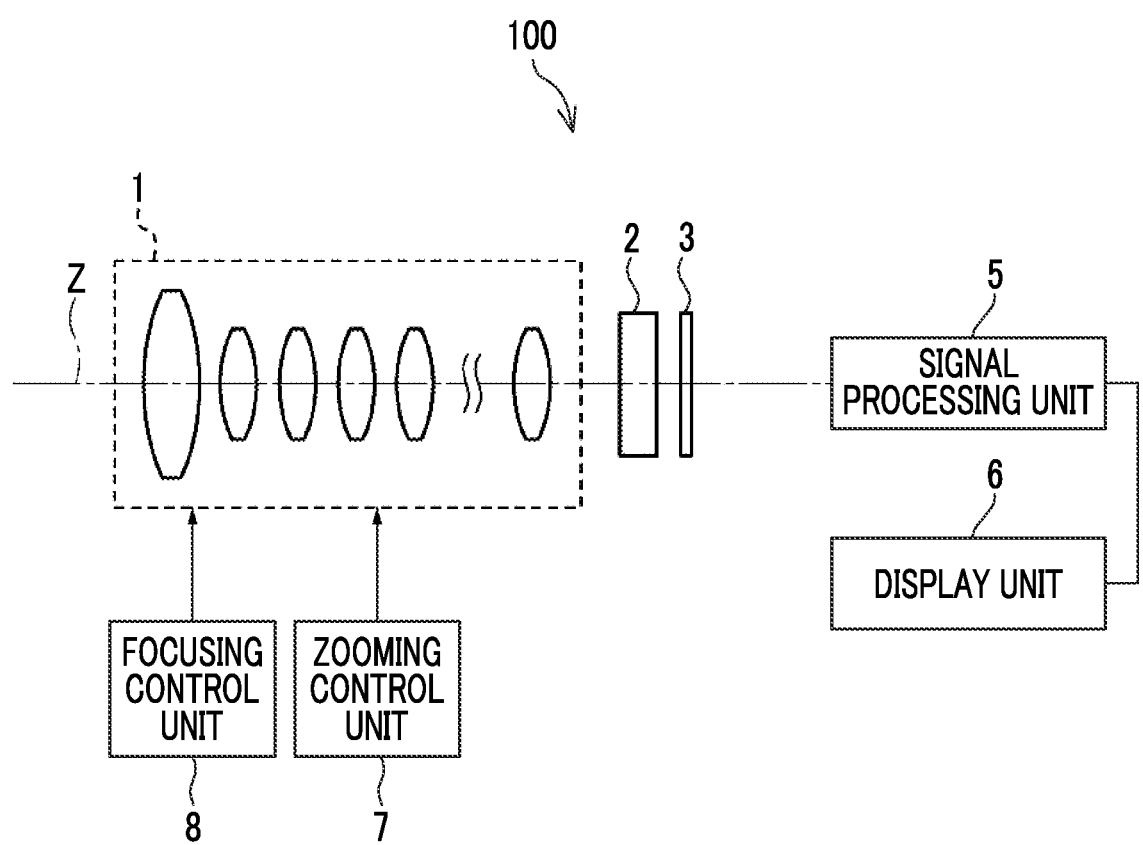
FIG. 24 is a schematic configuration diagram of an imaging apparatus according to one embodiment of the present disclosure.

Next, an imaging apparatus according to the embodiment of the present disclosure will be described. As one example of the imaging apparatus of the embodiment of the present disclosure, FIG. 24 illustrates a schematic configuration diagram of an imaging apparatus 100 using the variable magnification optical system 1 according to the embodiment of the present disclosure. For example, examples of the imaging apparatus 100 include a monitoring camera, a broadcasting camera, a movie imaging camera, a video camera, and a digital camera.

The imaging apparatus 100 comprises the variable magnification optical system 1, a filter 2 that is arranged on the image side of the variable magnification optical system 1, and an imaging element 3 that is arranged on the image side of the filter 2. In FIG. 24, a plurality of lenses comprised in the variable magnification optical system 1 are schematically illustrated.

The imaging element 3 converts an optical image formed by the variable magnification optical system 1 into an electric signal. For example, a charge coupled device (CCD) or a complementary metal oxide semiconductor (CMOS) can be used as the imaging element 3. The imaging element 3 is arranged such that an imaging surface of the imaging element 3 matches the image plane of the variable magnification optical system 1.

The imaging apparatus 100 also comprises a signal processing unit 5 that performs calculation processing on an output signal from the imaging element 3, a display unit 6 that displays an image formed by the signal processing unit 5, a zooming control unit 7 that controls zooming of the variable magnification optical system 1, and a focusing control unit 8 that controls focusing of the variable magnification optical system 1.

While only one imaging element 3 is illustrated in FIG. 24, the imaging apparatus 100 may be configured to comprise a plurality of imaging elements. The imaging apparatus 100 may be configured to perform imaging using separate imaging elements by causing light to branch for each wavelength by inserting a spectral prism and/or a dichroic mirror at any location on the optical axis of the optical system. The imaging apparatus 100 may be an imaging apparatus in which an InGaAs detector having sensitivity to the visible range to the SWIR range and a CMOS or the like are combined, or may be an imaging apparatus in which an element converting light in the SWIR range into light in the visible range and a CMOS or the like are combined.

While the technology of the present disclosure is described above using the embodiment and the examples, the technology of the present disclosure is not limited to the embodiment and the examples and can be subjected to various modifications. For example, the radius of curvature, the surface interval, the refractive index, the Abbe number, the partial dispersion ratio, and the aspherical coefficients of each lens are not limited to values illustrated in each of the examples and may have other values.

The magnification is also not limited to values of the examples. The technology of the present disclosure can also be applied to a variable magnification optical system that has a higher magnification or a lower magnification than the examples. While the aberration diagrams of the examples illustrate a range of g line (wavelength of 435.83 nm) to a wavelength of 2325 nm, the technology of the present disclosure is not limited to this wavelength range and can also be applied to a variable magnification optical system of which a wavelength range is enlarged or reduced.

The imaging apparatus according to the embodiment of the present disclosure is not limited to a camera supporting the visible range and the SWIR range. The technology of the present disclosure can also be applied to a visible range camera, an SWIR range camera, a multispectral camera, a hyperspectral camera, and a thermographic camera.

What is claimed is:

1. A variable magnification optical system consisting of, in order from an object side to an image side:
    a first lens group;
    a second lens group; and
    a subsequent lens group,
    wherein all intervals between adjacent lens groups are changed during changing magnification, and
    in a case where a d-line back focus in an air-conversion distance of the variable magnification optical system at a telephoto end is denoted by Bfd, a back focus in any one wavelength from a wavelength of 1300 nm to a wavelength of 2325.42 nm in the air-conversion distance of the variable magnification optical system at the telephoto end is denoted by BfIR, a d-line focal length of the variable magnification optical system at the telephoto end is denoted by ft, a refractive index in F line is denoted by nF, a refractive index in C line is denoted by nC, a refractive index in a wavelength of 1970.09 nm is denoted by n1970, and a partial dispersion ratio θ is defined as θ=(nC−n1970)/(nF−nC) for each lens of all lens groups, and an average of θ of all lenses of the first lens group is denoted by θ1ave, Conditional Expressions (1) and (2) are satisfied, which are represented by $$-0.0022 < (Bfd - BfIR)/ft \quad (1)$$

$$1.3 < \theta1ave \quad (2).$$

2. The variable magnification optical system according to claim 1,
wherein in a case where a sum of Bfd and a distance on an optical axis from a lens surface of the variable magnification optical system closest to the object side to a lens surface of the variable magnification optical system closest to the image side at the telephoto end is denoted by TL, Conditional Expression (5) is satisfied, which is represented by $$0.3 < ft/TL \tag{5}$$

3. The variable magnification optical system according to claim 1,
wherein the variable magnification optical system comprises only four lens groups consisting of the first lens group, the second lens group, a third lens group, and a fourth lens group in order from the object side to the image side, as the lens groups, and
the first lens group has a positive refractive power, the second lens group has a negative refractive power, the third lens group has a positive refractive power, and the fourth lens group has a positive or negative refractive power.

4. The variable magnification optical system according to claim 1,
wherein in a case where an average of θ of all lenses of the first lens group is denoted by θ1ave, and an average of θ of all lenses of the second lens group is denoted by θ2ave, Conditional Expression (6) is satisfied, which is represented by $$0.3 < \theta1ave/\theta2ave < 2 \tag{6}$$

5. The variable magnification optical system according to claim 1,
wherein the variable magnification optical system comprises the first lens group, the second lens group, a third lens group, and a fourth lens group consecutively in order from the object side to the image side, as the lens groups, and
in a case where an average of θ of all lenses of the third lens group is denoted by θ3ave, and an average of θ of all lenses of the second lens group is denoted by θ2ave, Conditional Expression (7) is satisfied, which is represented by $$0.3 < \theta3ave/\theta2ave < 2 \tag{7}$$

6. The variable magnification optical system according to claim 1,
wherein in a case where a d-line refractive index for each lens of all lens groups is denoted by nd, an Abbe number ν is defined as ν=(nd−1)/(nF−nC), and an average of ν of all lenses of the first lens group is denoted by ν1ave, Conditional Expression (8) is satisfied, which is represented by $$50 < \nu1ave \tag{8}$$

7. The variable magnification optical system according to claim 1,
wherein the variable magnification optical system comprises the first lens group, the second lens group, a third lens group, and a fourth lens group consecutively in order from the object side to the image side, as the lens groups, and
in a case where an average of θ of all lenses of the fourth lens group is denoted by θ4ave, Conditional Expression (9) is satisfied, which is represented by $$1.3 < \theta4ave \tag{9}$$

8. The variable magnification optical system according to claim 1,
wherein in a case where an average of θ of all lenses of the second lens group is denoted by θ2ave, Conditional Expression (10) is satisfied, which is represented by $$1.2 < \theta2ave \tag{10}$$

9. The variable magnification optical system according to claim 1,
wherein in a case where an average of θ of all positive lenses of the first lens group is denoted by θ1Pave, Conditional Expression (11) is satisfied, which is represented by $$1.6 < \theta1Pave < 2.3 \tag{11}$$

10. The variable magnification optical system according to claim 1,
wherein in a case where an average of θ of all negative lenses of the first lens group is denoted by θ1Nave, Conditional Expression (12) is satisfied, which is represented by $$\theta1Nave < 2.3 \tag{12}$$

11. The variable magnification optical system according to claim 1,
wherein in a case where an average of θ of all positive lenses of the second lens group is denoted by θ2Pave, and an average of θ of all negative lenses of the second lens group is denoted by θ2Nave, Conditional Expression (13) is satisfied, which is represented by $$2 < \theta2Pave - \theta2Nave \tag{13}$$

12. The variable magnification optical system according to claim 1,
wherein the variable magnification optical system comprises the first lens group, the second lens group, a third lens group, and a fourth lens group consecutively in order from the object side to the image side, as the lens groups, and
in a case where an average of θ of all positive lenses of the third lens group is denoted by θ3Pave, and an average of θ of all negative lenses of the third lens group is denoted by θ3Nave, Conditional Expression (14) is satisfied, which is represented by $$\theta3Pave - \theta3Nave < 2 \tag{14}$$

13. The variable magnification optical system according to claim 1,
wherein the variable magnification optical system comprises the first lens group, the second lens group, a third lens group, and a fourth lens group consecutively in order from the object side to the image side, as the lens groups, and
in a case where an average of θ of all positive lenses of the fourth lens group is denoted by θ4Pave, and an average of θ of all negative lenses of the fourth lens group is denoted by θ4Nave, Conditional Expression (15) is satisfied, which is represented by $$-2 < \theta4Pave - \theta4Nave < 2 \tag{15}$$

14. The variable magnification optical system according to claim 1,
wherein in a case where a d-line refractive index is denoted by nd, and an Abbe number ν is defined as ν=(nd−1)/(nF−nC) for each lens of all lens groups, an average of ν of all positive lenses of the first lens group is denoted by ν1Pave, and an average of ν of all negative lenses of the first lens group is denoted by ν1Nave, Conditional Expression (16) is satisfied, which is represented by $$15 < \nu1Pave - \nu1Nave \quad (16).$$

15. An imaging apparatus comprising:
    the variable magnification optical system according to claim 1.

16. A variable magnification optical system consisting of, in order from an object side to an image side:
    a first lens group;
    a second lens group; and
    a subsequent lens group,
    wherein all intervals between adjacent lens groups are changed during changing magnification, and
    in a case where a d-line back focus in an air-conversion distance of the variable magnification optical system at a telephoto end is denoted by Bfd, a back focus in any one wavelength from a wavelength of 1300 nm to a wavelength of 2325.42 nm in the air-conversion distance of the variable magnification optical system at the telephoto end is denoted by BfIR, a d-line focal length of the variable magnification optical system at the telephoto end is denoted by ft, a refractive index in F line is denoted by nF, a refractive index in C line is denoted by nC, a refractive index in a wavelength of 1970.09 nm is denoted by n1970, and a partial dispersion ratio θ is defined as θ=(nC−n1970)/(nF−nC) for each lens of all lens groups, an average of θ of all positive lenses of the first lens group is denoted by θ1Pave, and an average of θ of all negative lenses of the first lens group is denoted by θ1Nave, Conditional Expressions (1) and (3) are satisfied, which are represented by $$-0.0022 < (Bfd - BfIR)/ft \quad (1)$$

$$-0.8 < \theta1Pave - \theta1Nave < 0.8 \quad (3).$$

17. An imaging apparatus comprising:
    the variable magnification optical system according to claim 16.

* * * * *